(12) United States Patent
Peitrucha, Jr. et al.

(10) Patent No.: US 7,516,103 B1
(45) Date of Patent: Apr. 7, 2009

(54) METHOD AND APPARATUS FOR FACILITATING ELECTRONIC ACQUISITION AND MAINTENANCE OF GOODS AND SERVICES VIA THE INTERNET

(75) Inventors: Stanislaus Peitrucha, Jr., Houston, TX (US); Brian W. Nenninger, Houston, TX (US); Kenneth L. Myers, Houston, TX (US); Matthew T. Shedlick, Centerville, VA (US); Scott L. Radziewicz, Houston, TX (US); Andre M. Austin, Tomball, TX (US); Julie Hae-Jung Youm, New York, NY (US); James R. Rowan, Houston, TX (US); Rick D. Tully, Houston, TX (US); Arnaud Lucas, Houston, TX (US); Albert J. Blanchard, Houston, TX (US); Robert M. Bragg, Houston, TX (US); Miguel J. Gutierrez, Houston, TX (US); James P. Moskosky, Key Biscayne, FL (US); John W. Meyers, Houston, TX (US)

(73) Assignee: WhiteFence, Inc., Houston, TX (US)

( * ) Notice: Subject to any disclaimer, the term of this patent is extended or adjusted under 35 U.S.C. 154(b) by 198 days.

(21) Appl. No.: 09/803,545

(22) Filed: Mar. 9, 2001

(51) Int. Cl.
*G06Q 30/00* (2006.01)
(52) U.S. Cl. .......................................... 705/56
(58) Field of Classification Search ................... 705/26, 705/27
See application file for complete search history.

(56) References Cited

U.S. PATENT DOCUMENTS 6,141,666 A * 10/2000 Tobin .......................... 715/513
6,801,226 B1 * 10/2004 Daughtrey ................... 715/763

(Continued)

OTHER PUBLICATIONS

Letstalk.com website printout, archived at web.archive.org Feb. 29, 2000.*

(Continued)

*Primary Examiner*—Ronald Laneau
(74) *Attorney, Agent, or Firm*—Dilworth Paxson LLP; John W. Goldschmidt, Jr.; Philip J. Foret

(57) ABSTRACT

Internet acquisition of goods and services from multiple service providers is facilitated in a uniform, automated manner. Online service account facilitation systems and methods are contemplated that allow for intuitive, uniformly-structured representations of service offerings; straightforward, yet flexible, definition of service product markets; advantageous status designations for market offerings; flexible start date restriction rules; context sensitive information request forms, dynamic price determination on interactive comparison forms; flexible restriction rules for selection combinations of plans, packages, and features; creation of customized data elements; a powerfully advantageous ordering process; a discontinuation process; an inter-dependent order resolution feature; a hierarchical customization scheme; and/or centralized two-way communication between customers and service providers. In one embodiment, tenants of business or residential properties, may connect and disconnect utilities and/or purchase other goods and services electronically via the Internet from various service providers when moving into the property.

53 Claims, 55 Drawing Sheets

U.S. PATENT DOCUMENTS

| | | | | |
|---|---|---|---|---|
| 6,965,868 B1 * | 11/2005 | Bednarek | ............... | 705/9 |
| 7,178,720 B1 * | 2/2007 | Strubbe et al. | ............... | 235/375 |
| 7,188,085 B2 * | 3/2007 | Pelletier | ............... | 705/50 |
| 7,419,094 B2 * | 9/2008 | Grear et al. | ............... | 235/380 |
| 2001/0044743 A1 * | 11/2001 | McKinley et al. | ............... | 705/14 |
| 2002/0077930 A1 * | 6/2002 | Trubey et al. | ............... | 705/26 |
| 2003/0036949 A1 * | 2/2003 | Kaddeche et al. | ............... | 705/14 |
| 2004/0015405 A1 * | 1/2004 | Cloutier et al. | ............... | 705/26 |
| 2004/0039679 A1 * | 2/2004 | Norton et al. | ............... | 705/37 |
| 2008/0171556 A1 * | 7/2008 | Carter | ............... | 455/456.1 |

OTHER PUBLICATIONS

Wirelessadvisor website printout, archived at web.archive.org Feb. 29, 2000.*

"Aetna Offers On-line Benefits", Insurance Networking & Data Management, Jan. 1998.* getconnected.com website printout, archived at web.archive.org Aug. 15, 2000.*

* cited by examiner

| QLookColor | | | |
|---|---|---|---|
| defaultAltTextFla | | | ◇ |
| defaultTextFlag | | | ◇ |
| name | | | ◇ |
| old | 🔑 | 🔒 | |
| rgb | | | ◇ |

(B)——toQLookFont→

| QLookFont | | | |
|---|---|---|---|
| alternateFontFac | | | ◇ |
| defaultFlag | | | ◇ |
| fontFamily | | | ◇ |
| name | | | ◇ |
| old | 🔑 | 🔒 | |
| primaryFontFace | | | ◇ |

*FIG. 5C*

CELLULAR PHONE
SELECT EITHER OR BOTH OF THE SERVICE PLANS AND CLICK THE "COMPARE" BUTTON.

| | | FREE CALLING AREA | MONTHLY RATES | MONTHLY MINUTES | ADDITIONAL MINUTES | |
|---|---|---|---|---|---|---|
| BASIC SERVICE | | | | | | |
| ELECTRICITY | PRIMECO WIRELESS | | | | | |
| LOCAL TELEPHONE | | | | | | |
| LONG DISTANCE TELEPHONE ■ | PRIMECO CALLING PLAN | STATE | $35-55 | 500-1000 | .30 | ⎫ |
| CABLE/SATELLITE ■ | PRIMECO NOW PLUS CALLING PLAN | NATIONAL | $25-150 | 200-2200 | .10-.35 | ⎭ 710 |

ADDITIONAL SERVICES
HIGH SPEED INTERNET ACCESS
BOTTLED WATER DELIVERY
RENTER'S INSURANCE
APPLIANCE RENTAL
INTERSTATE MOVERS
FURNITURE RENTAL
ELECTRONICS RENTAL
CELLULAR PHONE
MAID SERVICES
NEWSPAPER DELIVERY
DRY CLEANING
LOCAL MOVERS
HEALTH CLUBS
DIAL-UP INTERNET ACCESS
SELF STORAGE
SECURITY MONITORING
GROCERY DELIVERY
TOLL TAGS
RESTAURANT DELIVERY
DISCONNECTS
ACCOUNT SUMMARY
LOGOUT (COMPARE)   (SKIP)

HOW TO USE   BEST PRICE GUARANTEE   CREDIT CARD GUARANTEE   PRIVACY AND SECURITY
TERMS OF USE   FAQ   FEEDBACK   MY PROFILE

FIG. 10

CELLULAR PHONE — 620
MAKE YOUR DESIRED SELECTION(S). THEN CLICK THE "ORDER" BUTTON BELOW YOUR SELECTION(S) TO PROCEED TO THE ORDER PAGE.

PROVIDERS | PLANS | COMPARISON

BASIC SERVICES
ELECTRICITY
LOCAL TELEPHONE
LONG DISTANCE TELEPHONE
CABLE/SATELLITE

ADDITIONAL SERVICES
HIGH SPEED INTERNET ACCESS
BOTTLED WATER DELIVERY
RENTERS INSURANCE
APPLIANCE RENTAL
INTERSTATE MOVERS
FURNITURE RENTAL
ELECTRONICS RENTAL
CELLULAR PHONE
MAID SERVICES
NEWSPAPER DELIVERY
DRY CLEANING
LOCAL MOVERS
HEALTH CLUBS
DIAL-UP INTERNET ACCESS
SELF STORAGE
SECURITY MONITORING
GROCERY DELIVERY
TOLL TAGS
RESTAURANT DELIVERY

DISCONNECTS

ACCOUNT SUMMARY

LOGOUT

SERVICE PLANS — 810

PRIMECO WIRELESS — 680
PRIMECO CALLING PLAN
THE PRIMECO CALLING PLANS INCLUDE STATEWIDE LONG DISTANCE, CALL WAITING, VOICE MAIL, VOICE MAIL NOTIFICATION, CALLER ID, CALL WAITING ID, AND CALL LOG.

| | |
|---|---|
| ACTIVATION FEE: | NONE |
| CONTRACT: — 812 | NONE |
| LD/MIN: | .07 |
| ROAMING/MIN: | .15-.39 |
| ROUNDED TO: | MIN. |

DISCOUNTED PACKAGES ($/MONTH) — 820

◇ PRIMECO 500    $34.99
INCLUDES 500 ANYTIME MINUTES.
.30 EACH ADDITIONAL MINUTE.

◇ PRIMECO 750    $44.99
INCLUDES 750 ANYTIME MINUTES.
.30 EACH ADDITIONAL MINUTE.

◇ PRIMECO 1000    $54.99
INCLUDES 1000 ANYTIME MINUTES.
.30 EACH ADDITIONAL MINUTE.

PRIMECO WIRELESS — 680
PRIMECO NOW PLUS CALLING PLAN
THE PRIMECO NOW PLUS CALLING PLANS INCLUDE NATIONWIDE LONG DISTANCE, CALL WAITING, VOICE MAIL, VOICE MAIL NOTIFICATION, CALLER ID, CALL WAITING ID, 3-WAY CALLING, AND CALL LOG.

| | |
|---|---|
| ACTIVATION FEE: | NONE |
| CONTRACT: — 814 | NONE |
| LD/MIN: | NONE |
| ROAMING/MIN: | .15-.39 |
| ROUNDED TO: | MIN. |

◇ PRIMECO NOW 200 PLUS    $24.99
INCLUDES 200 ANYTIME MINUTES.
.35 EACH ADDITIONAL MINUTE.

◇ PRIMECO NOW 350 PLUS    $39.99
INCLUDES 350 ANYTIME MINUTES.
.30 EACH ADDITIONAL MINUTE.

◇ PRIMECO NOW 500 PLUS    $49.99
INCLUDES 500 ANYTIME MINUTES.
.30 EACH ADDITIONAL MINUTE.

◇ PRIMECO NOW 650 PLUS    $64.99
INCLUDES 650 ANYTIME MINUTES.
.25 EACH ADDITIONAL MINUTE.

◇ PRIMECO NOW 1200 PLUS    $99.99
INCLUDES 1200 ANYTIME MINUTES.
.25 EACH ADDITIONAL MINUTE.

◇ PRIMECO NOW 2000 PLUS    $149.99
INCLUDES 2000 ANYTIME MINUTES.
.10 EACH ADDITIONAL MINUTE.

*FIG. 11A-1*

ADDITIONAL FEATURES ($/MONTH ADDED TO DISCOUNTED PACKAGE) — 830
HANDLING CALLS

| | | |
|---|---|---|
| ☐ CALL WAITING | INCLUDED | INCLUDED |
| ☐ VOICE MAIL | INCLUDED | INCLUDED |
| ☐ VOICE MAIL PLUS | N/A | N/A |
| ☐ TEXT MESSAGING | $9.95 | $9.95 |
| ☐ MESSAGING PLUS | N/A | N/A |

IDENTIFYING THE CALLER

| | | |
|---|---|---|
| ☐ CALLER ID | INCLUDED | INCLUDED |
| ☐ CALL WAITING ID | INCLUDED | INCLUDED |

FORWARDING CALLS

| | | |
|---|---|---|
| ☐ CALL FORWARDING | $1.00 | $1.00 |
| ☐ BUSY/NO ANSWER C.F. | N/A | N/A |

CONFERENCE CALLING

| | | |
|---|---|---|
| ☐ THREE-WAY CALLING | $1.00 | INCLUDED |

ADDITIONAL MINUTES

| | | |
|---|---|---|
| ☐ 100 OFF-PEAK | N/A | $5.00 |
| ☐ 250 OFF-PEAK | N/A | N/A |
| ☐ 300 OFF-PEAK | N/A | $10.00 |
| ☐ 500 OFF-PEAK | $5.00 | N/A |
| ☐ 1000 OFF-PEAK | $10.00 | $20.00 |

CELLULAR SERVICES

| | | |
|---|---|---|
| ☐ ROADSIDE ASST. | $3.00 | $3.00 |
| ☐ ONLINE | N/A | N/A |
| ☐ ONLINE PLUS | N/A | N/A |
| ☐ DETAILED BILLING | $1.50 | $1.50 |
| ☐ MAINTENANCE | $4.95 | $4.95 |

OPTIONAL FEATURES ($/MONTH UNLESS MARKED WITH *)

| | | | | |
|---|---|---|---|---|
| ☐ QUALCOMM 1960 | $39.00* | ☐ | QUALCOMM 1960 | $39.00* |
| ☑ NOKIA 6185 | $119.00* | ☑ | NOKIA 6185 | $119.00* |
| ☐ AUDIOVOX PCX-3500XL | $129.00* | ☐ | AUDIOVOX PCX-3500XL | $129.00* |
| ☐ 750 WEEKEND MINUTES | $7.50 | | | |

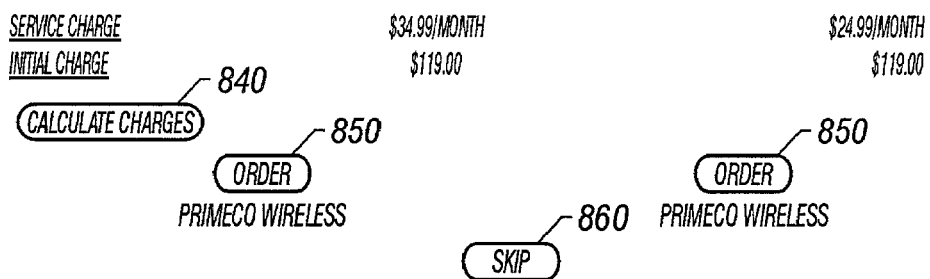

SERVICE CHARGE $34.99/MONTH $24.99/MONTH
INITIAL CHARGE $119.00 $119.00

*FIG. 11A-2*

ACCOUNTS | PROVIDERS | PLANS | COMPARISON | ORDER

CELLULAR PHONE

REVIEW YOUR SELECTIONS, FILL IN ALL REQUIRED INFORMATION AND CLICK THE "SUBMIT" BUTTON TO PLACE YOUR ORDER BY CLICKING THE "SAVE" BUTTON. YOU CAN HOLD YOUR ORDER INFORMATION AND RETURN LATER TO THIS SERVICE CATEGORY TO SUBMIT.

[BASIC SERVICE]

ELECTRICITY
LOCAL TELEPHONE
LONG DISTANCE TELEPHONE
CABLE/SATELLITE

[ADDITIONAL SERVICES]

HIGH SPEED INTERNET ACCESS
BOTTLED WATER DELIVERY
RENTER'S INSURANCE
APPLIANCE RENTAL
INTERSTATE MOVERS
FURNITURE RENTAL
ELECTRONICS RENTAL
CELLULAR PHONE
MAID SERVICES
NEWSPAPER DELIVERY
DRY CLEANING
LOCAL MOVERS
HEALTH CLUBS
DIAL-UP INTERNET ACCESS
SELF STORAGE
SECURITY MONITORING
GROCERY DELIVERY
TOLL TAGS
RESTAURANT DELIVERY

[DISCONNECTS]
[ACCOUNT SUMMARY]
[LOGOUT]

} 910

PRIMECO WIRELESS
SERVICE PLAN: PRIMECO CALLING PLAN
DISCOUNTED PACKAGE: PRIMECO 500
ADDITIONAL FEATURES: NOKIA 6185
SERVICE CHARGE: $34.99/MONTH (EXCLUDING TAXES AND GOVERNMENTAL SURCHARGES, IF ANY)
INITIAL CHARGE: $119.00 (EXCLUDING TAXES AND GOVERNMENTAL SURCHARGES, IF ANY)

} 920

ACTIVATION INSTRUCTIONS WILL BE INCLUDED WITH THE SHIPMENT OF YOUR PHONE. SERVICE CHARGES COMMENCE UPON ACTIVATION.

SHIP PHONE TO: ▷ [3233 MCCUE #300, TX. 77056 ▽] (ADD)
PRIOR ADDRESS: ▷ 11 ELM STREET, HOUSTON, TX. 77098 (EDIT)
SSN: ▷ [595]-[12]-[2121]
IDENTIFICATION: ▷ DRIVER'S LICENSE: ▷ [TX ▽] #: [513330014011] (DELETE)
EMPLOYER NAME: ▷ [QCORPS RESIDENTIAL, INC.]
BILL TO: ▷ [JAN BRADY: 3233 MCCUE #300, TX. 77056 ▽] (ADD)
PAYMENT METHOD: ▷ [WELL FARGO VISA: XXXXXXXXXXXX6019 ▽]

930 — FIELDS MARKED WITH ▷ ARE REQUIRED. — 950
(SUBMIT) (SAVE) (SKIP)
       940

HOW TO USE  BEST PRICE GUARANTEE  CREDIT CARD GUARANTEE  PRIVACY AND SECURITY  TERMS OF USE  FAQ  FEEDBACK  MY PROFILE

FIG. 12

[BASIC SERVICE]
ELECTRICITY
LOCAL TELEPHONE
LONG DISTANCE TELEPHONE
CABLE/SATELLITE

[ADDITIONAL SERVICES]
HIGH SPEED INTERNET ACCESS
BOTTLED WATER DELIVERY
RENTERS INSURANCE
APPLIANCE RENTAL
INTERSTATE MOVERS
FURNITURE RENTAL
ELECTRONICS RENTAL
CELLULAR PHONE
MAID SERVICES
NEWSPAPER DELIVERY
DRY CLEANING
LOCAL MOVERS
HEALTH CLUBS
DIAL-UP INTERNET ACCESS
SELF STORAGE
SECURITY MONITORING
GROCERY DELIVERY
TOLL TAGS
RESTAURANT DELIVERY

[DISCONNECTS]
[ACCOUNT SUMMARY]
[LOGOUT]

DISCONNECTS

DISCONNECT SERVICE FROM ACCOUNTS INITIATED ON THIS SITE — 1010
YOU MAY DISCONNECT SERVICES FROM PROVIDER ACCOUNTS THAT YOU HAVE INITIATED USING THIS SITE. IF YOU HAVE ACTIVE ACCOUNT CHOOSE ONE FROM THE LIST AND CLICK THE "SELECT" BUTTON.

YOU DO NOT HAVE ANY ACTIVE ACCOUNTS.

DISCONNECT SERVICE FROM OTHER ACCOUNTS — 1020
YOU MAY ALSO BE ABLE TO DISCONNECT SERVICES THAT YOU HAVE NOT INITIATED THROUGH THIS SITE. IF YOU HAVE INPUT ADDRESS THIS SYSTEM, CHOOSE OF YOUR CURRENT OR PRIOR ADDRESSES FROM THE DROP DOWN MENU AND CLICK THE "SELECT" BUTTON.

ADDRESS: [1 MAIN ST #1000, TX. 77041 ▼]  (SELECT) — 1025

CURRENT DISCONNECTS — 1030
REVIEW THE STATUS OF OUR DISCONNECT ORDERS BELOW. SAVED DISCONNECT INFORMATION MAY BE EDITED AND SUBMITTED BY CLICKING "EDIT/SUBMIT". IF YOUR ORDER HAS BEEN SUBMITTED, YOUR SERVICE PROVIDER WILL FULFILL THIS DISCONNECT ORDER. IF YOU ORDER IS PENDING, YOU MAY CANCEL THIS ORDER BY CLICKING "CANCEL". YOU MAY DISCONNECT EXISTING ACCOUNTS BY CHOOSING THE ACCOUNT CATEGORY FROM THE MENU AND CLICKING THE "DISCONNECT" LINK ON THAT PAGE.

YOU DO NOT HAVE ANY DISCONNECT ORDERS (SKIP)

HOW TO USE   BEST PRICE GUARANTEE   CREDIT CARD GUARANTEE   PRIVACY AND SECURITY   TERMS OF USE   FAQ   FEEDBACK   MY PROFILE

*FIG. 13*

BASIC SERVICE
ELECTRICITY
LOCAL TELEPHONE
LONG DISTANCE TELEPHONE
CABLE/SATELLITE

ADDITIONAL SERVICES
HIGH SPEED INTERNET ACCESS
BOTTLED WATER DELIVERY
RENTERS INSURANCE
APPLIANCE RENTAL
INTERSTATE MOVERS
FURNITURE RENTAL
ELECTRONICS RENTAL
CELLULAR PHONE
MAID SERVICES
NEWSPAPER DELIVERY
DRY CLEANING
LOCAL MOVERS
HEALTH CLUBS
DIAL-UP INTERNET ACCESS
SELF STORAGE
SECURITY MONITORING
GROCERY DELIVERY
TOLL TAGS
RESTAURANT DELIVERY

DISCONNECTS

ACCOUNT SUMMARY

LOGOUT

MY PROFILE
GENERAL INFORMATION — 1110

MY PROFILE DISPLAYS ALL INFORMATION ENTERED ABOUT YOU ON THIS SITE. GENERAL INFORMATION MAY BE ENTERED AND EDITED ONLY BY YOU AND OUR LEASING SPECIALISTS, EXCEPT FOR YOUR NAME AND SERVICE ADDRESS, WHICH MAY ONLY BE ENTERED AND EDITED BY OUR LEASING SPECIALISTS. ALL OTHER INFORMATION MAY ONLY BE ENTERED AND EDITED BY YOU. YOU ARE ENCOURAGED TO REVIEW OUR PRIVACY AND SECURITY STATEMENT REGARDING THE USE AND DISSEMINATION OF THIS INFORMATION. YOUR EDITS TO MY PROFILE MAY UPDATE INFORMATION CONTAINED IN PENDING ORDERS, AS WELL AS SAVED ORDER INFORMATION. ACCORDINGLY, BE VERY CAREFUL NOT TO DELETE ANY INFORMATION THAT IS REQUIRED FOR SERVICE PROVIDERS TO FULFILL PENDING ORDERS.

NAME: JULIE YOUM
SERVICE ADDRESS: 3233 MCCUE #1000
HOUSTON, TX. 77056 — 1115
EMAIL ADDRESS: JULIE@QCORPS.COM
PRIOR ADDRESS: 180 WEST END #AAA
NEW YORK, NY. 10023
EVENING PHONE: (713) 555-1212
DAY PHONE:
PHONE (CELL): (123) 456-6789
OTHER ADDRESSES:
ACCOUNT ID: JULIEYOUM (CHANGE)

PASSWORD: ********** (CHANGE)

BILLING ADDRESSES — 1120
EMAIL: JULIE@QCORPS.COM
U.S. MAIL: MISS JULIE YOUM : 1 MAIN ST, #1000, TEST STREET32, HOLLYWOOD, TX 77041
SOMECOUNTY COUNTY

PERSONAL INFORMATION — 1130
SOCIAL SECURITY NUMBER: 123-45-6789
DATE OF BIRTH: OCTOBER 07, 1977
MOTHER'S MAIDEN NAME: MOUNTAINDEW
BIRTH CITY:

IDENTIFICATION INFORMATION — 1140
DRIVER'S LICENSE: NY:10023

FINANCIAL INSTITUTION ACCOUNT INFORMATION — 1150
NONE

CREDIT CARD INFORMATION — 1160
QCORPS VISA: XXXXXXXXXXXX1111

HOW TO USE  BEST PRICE GUARANTEE  CREDIT CARD GUARANTEE  PRIVACY AND SECURITY  TERMS OF USE  FAQ  FEEDBACK  MY PROFILE

FIG. 14

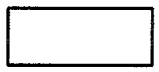

MY PROFILE
GENERAL INFORMATION
SOME OR ALL OF THIS INFORMATION WILL BE REQUIRED BY SERVICE PROVIDERS TO PROCESS YOUR ORDER(S). YOU MAY EDIT THIS INFORMATION AT ANY TIME. YOUR EDITS MAY UPDATE INFORMATION CONTAINED IN PENDING ORDERS AS WELL AS ANY SAVED ORDER INFORMATION ACCORDINGLY, BE CAREFUL NOT TO DELETE ANY INFORMATION REQUIRED TO PROCESS PENDING ORDERS.

BASIC SERVICE
ELECTRICITY
LOCAL TELEPHONE
LONG DISTANCE TELEPHONE
CABLE/SATELLITE

ADDITIONAL SERVICES
HIGH SPEED INTERNET ACCESS
BOTTLED WATER DELIVERY
RENTERS INSURANCE
APPLIANCE RENTAL
INTERSTATE MOVERS
FURNITURE RENTAL
ELECTRONICS RENTAL
CELLULAR PHONE
MAID SERVICES
NEWSPAPER DELIVERY
DRY CLEANING
LOCAL MOVERS
HEALTH CLUBS
DIAL-UP INTERNET ACCESS
SELF STORAGE
SECURITY MONITORING
GROCERY DELIVERY
TOLL TAGS
RESTAURANT DELIVERY

DISCONNECTS
ACCOUNT SUMMARY
LOGOUT

PRIOR ADDRESS:
STREET: 180 WEST END   APT/SUITE: AAA
CITY/STATE/ZIP: NEW YORK  NY  10023
EVENING PHONE: (713) 555 1212
DAY PHONE: (   )
EMAIL ADDRESS: JULIE@QCORPS.COM

☑ PLEASE NOTIFY ME WHEN SERVICE REQUEST ARE UPDATED

☐ PLEASE DO NOT NOTIFY ME WHEN NEW FEATURES, PRODUCT, SERVICES, SPECIALS, OR SERVICE PROVIDERS BECOME AVAILABLE.

☐ PLEASE DO NOT NOTIFY ME REGARDING SURVEYS, CONTESTS, SWEEPSTAKES OR SIMILAR PROMOTIONS.

☐ PLEASE DO NOT PROVIDE MY EMAIL ADDRESS OR PERSONALLY IDENTIFIABLE INFORMATION TO SERVICE PROVIDERS WITH WHOM I HAVE NOT ORDERED OR REQUESTED INFORMATION ABOUT SERVICE PRODUCTS.

ADDITIONAL CONTACTS: PHONE (CELL): ▷ (123) 456 6789   (DELETE)

OTHER ADDRESSES:

FIELDS MARKED WITH ▷ ARE REQUIRED.

(SAVE) (CANCEL)

HOW TO USE   BEST PRICE GUARANTEE   CREDIT CARD GUARANTEE   PRIVACY AND SECURITY   TERMS OF USE   FAQ   FEEDBACK   MY PROFILE

FIG. 15

ACCOUNT SUMMARY
PRINTER FRIENDLY REPORT

BASIC SERVICE

ELECTRICITY
LOCAL TELEPHONE
LONG DISTANCE TELEPHONE
CABLE/SATELLITE

JULIE YOUM
ADDRESS: PROVIDENCE UPTOWN
3233 MCCUE # 1000
HOUSTON, TX 77056

ACCOUNT ID: JULIEYOUM
DATE/TIME: DEC 06, 2000
09:20:10 PM

ADDITIONAL SERVICES

HIGH SPEED INTERNET ACCESS
BOTTLED WATER DELIVERY
RENTERS INSURANCE
APPLIANCE RENTAL
INTERSTATE MOVERS
FURNITURE RENTAL
ELECTRONICS RENTAL
CELLULAR PHONE
MAID SERVICES
NEWSPAPER DELIVERY
DRY CLEANING
LOCAL MOVERS
HEALTH CLUBS
DIAL-UP INTERNET ACCESS
SELF STORAGE
SECURITY MONITORING
GROCERY DELIVERY
TOLL TAGS
RESTAURANT DELIVERY

THIS ACCOUNT SUMMARY LISTS ALL OF THE SERVICES AND PRODUCTS ORDERED THROUGH THIS SITE, AS WELL AS ORDER INFORMATION FOR YOUR FURTHER CONSIDERATION. WE HOPE YOU ENJOYED THIS SERVICE BROUGHT TO YOU BY WWW.TCRESIDENTIAL.COM AND QCORP RESIDENTIAL, INC.

ELECTRICITY: RELIANT ENERGY - HL&P
STATUS: ORDER INFORMATION HAS BEEN SAVED. THIS ORDER HAS NOT BEEN SUBMITTED.
EDIT/SUBMIT CANCEL
ORDER NUMBER: SP1000057
SERVICE PLAN: BALANCED BILLING
BILL TO:
PAYMENT METHOD: CHECK

LOCAL TELEPHONE: AT&T
STATUS: ORDER INFORMATION HAS BEEN SAVED. THIS ORDER HAS NOT BEEN SUBMITTED.
EDIT/SUBMIT CANCEL
ORDER NUMBER: SP1000173
CUSTOMER SERVICE:
SERVICE PLAN: LOCAL SERVICE
DISCOUNTED PACKAGE: 3 FEATURE PACK WITH:
CALL WAITING CALLER ID - NAME AND NUMBER THREE-WAY
ADDITIONAL FEATURES: NONE SELECTED
START DATE: MON 06 NOV 2000
BILL TO:
PAYMENT METHOD: CHECK

DISCONNECTS

ACCOUNT SUMMARY

LOGOUT

LOCAL TELEPHONE: SOUTHWESTERN BELL
STATUS: ORDER INFORMATION HAS BEEN SAVED. THIS ORDER HAS NOT BEEN SUBMITTED.
EDIT/SUBMIT CANCEL
ORDER NUMBER: SP1000171
SERVICE PLAN: BASIC LOCAL
DISCOUNTED PACKAGE: PHONE SOLUTION
ADDITIONAL FEATURES: CALL WAITING ID ENHANCED
START DATE: THU 02 NOV 2000
BILL TO:
PAYMENT METHOD: CHECK

LOCAL TELEPHONE: MCI WORLDCOM
NO REQUESTS FOR THIS ACCOUNT
DELETE

FIG. 16

LONG DISTANCE TELEPHONE: MCI WORLDCOM

STATUS: ORDER INFORMATION HAS BEEN SAVED. THIS ORDER HAS NOT BEEN SUBMITTED.
EDIT/SUBMIT CANCEL
ORDER NUMBER: SP1000337
SERVICE PLAN: MCI ONE NET SAVINGS
ADDITIONAL FEATURES: NONE SELECTED
START DATE: SAT 04 NOV 2000
BILL TO:
PAYMENT METHOD:

CABLE/SATELLITE: TIME WARNER DIGITAL

NO REQUESTS FOR THIS ACCOUNT
DELETE

HIGH SPEED INTERNET ACCESS: TIME WARNER DIGITAL

NO REQUESTS FOR THIS ACCOUNT
DELETE

HIGH SPEED INTERNET ACCESS: VERIZON

STATUS: ORDER INFORMATION HAS BEEN SAVED. THIS ORDER HAS NOT BEEN SUBMITTED.
EDIT/SUBMIT CANCEL
ORDER NUMBER: SP1000177
SERVICE PLAN: PLATINUM
ADDITIONAL FEATURES: NONE SELECTED
REQUESTED APPT: THU 23 NOV 2000 8AM-NOON
BILL TO:
PAYMENT METHOD:

HIGH SPEED INTERNET ACCESS: PDQ.NET

NO REQUESTS FOR THIS ACCOUNT
DELETE

RENTERS INSURANCE: BALBOA LIFE & CASUALTY

STATUS: ORDER INFORMATION HAS BEEN SAVED. THIS ORDER HAS NOT BEEN SUBMITTED.
EDIT/SUBMIT CANCEL
ORDER NUMBER: SP1000128
CUSTOMER SERVICE:
COVERAGE PLAN: BASIC RENTERS INSURANCE
COVERAGE AMOUNT: $30,000 PERSONAL PROPERTY LIMIT
START DATE: WED 01 NOV 2000
BILL TO:
PAYMENT METHOD:

INTERSTATE MOVERS: BELTMANN NORTH AMERICAN VAN LINES
NO REQUESTS FOR THIS ACCOUNT
DELETE

FIG. 17

HOW TO USE  BEST PRICE GUARANTEE  CREDIT CARD GUARANTEE  PRIVACY AND SECURITY  TERMS OF USE  FAQ  FEEDBACK  MY PROFILE

⊙ SOUTHWESTERN BELL    [MARKETS]  [OFFERINGS]  [LOGOUT]

DEFINE UNIQUE MARKETS
OFFERINGS IN THE QCORPS SYSTEM ARE LIMITED TO, AND DEFINED BY, A SPECIFIED COVERAGE AREA. A COVERAGE AREA CAN BE ALL INCLUSIVE OR AS LIMITED AS AN INDIVIDUAL APARTMENT COMPLEX. NOTE THAT THE COLUMNS ARE ADDITIVE IN NATURE (E.G. TO CREATE A MARKET THAT INCLUDES ALL OF TEXAS AND ONE COUNTY IN OKLAHOMA, YOU WOULD SELECT TEXAS IN THE STATE COLUMN AND ENTER THE APPLICABLE OKLAHOMA COUNTY IN THE COUNTY, STATE COLUMN.).

MARKET NAME    MARKET STATUS
[HOUSTON]      [OPEN ▽]
   ↖1902        ↖1904
EDIT MARKET BY:  STATE (A)   COUNTY, STATE (B)   ZIP CODE (C)   PROPERTY (D)
                  ↖1906         ↖1908              ↖1910          ↖1912
WHEN A USER CLICKS ON ONE OF THE ABOVE, THE FOLLOWING IS DISPLAYED ON THIS PAGE:
(A) LIST OF ALL STATES IN 4 COLUMNS WITH CHECK BOXES FOR SELECTION
(B) 15 ROWS FOR ENTRY W/ "ADD ROWS" BUTTON FOR ADDITIONAL ENTRIES (SEE LOCATIONS FOR SIMILAR LAYOUT)
(C) 15 ROWS FOR ENTRY W/ "ADD ROWS" BUTTON FOR ADDITIONAL ENTRIES (SEE LOCATIONS FOR SIMILAR LAYOUT)
   -ALSO ENABLES USERS TO ENTER ZIP CODES IN RANGES:   [77001]  THROUGH  [77081]
(D) PROPERTY ASSIGNMENTS PAGE                            ↖1914            ↖1916

[SAVE]  [CANCEL]
 ↖1918

RULES:
1) COLUMNS ARE ADDITIVE IN NATURE
2) RIGHT WINS OVER LEFT FOR REGION OVERLAPS (SPECIFICITY)
3) NO TWO MARKETS CAN HAVE THE SAME ENTRIES IN ANY COLUMN (I.E., MARKETS ARE MUTUALLY EXCLUSIVE)

FIG. 19A

⊙ SOUTHWESTERN BELL                    [MARKETS]  [OFFERINGS]    [LOGOUT]

PROPERTY ASSIGNMENTS
THIS SECTION IS USED TO ASSIGN PROPERTIES TO A UNIQUE REGION ON A PROPERTY SPECIFIC BASIS. TO GENERATE A LIST OF PROPERTIES, ENTER YOUR SEARCH CRITERIA IN THE FIELDS PROVIDED BELOW, THEN CLICK "GENERATE LIST OF PROPERTIES".

⎧                                                                1920                                    ⎫
INCLUDE:    NAME ◁▷   STREET ◁▷   CITY ◁▷   STATE ◁▷   COUNTY ◁▷   ZIP ◁▷   MARKET ◁▷
            [ALL]     [ALL]       [ALL]     [ALL]      [ALL]       [ALL]    [ALL]
                               ↑                                       ↑         ↑
                        NOTE: ALL OR TYPE IN CRITERIA

1922 ─[GENERATE LIST OF PROPERTIES]

☐ PARK        2212 MAIN   HOUSTON   TX   HARRIS   77081   MARKET 1
☐ GREEN       2213 MAIN   HOUSTON   TX   HARRIS   77081   MARKET 2
☐ CREOLE      2214 MAIN   HOUSTON   TX   HARRIS   77081   MARKET 3
☐ PROVIDENCE  2215 MAIN   HOUSTON   TX   HARRIS   77081   MARKET 4
☐ MERRYWOOD   2216 MAIN   HOUSTON   TX   HARRIS   77801   MARKET 5
☐ TRESTLES    2217 MAIN   HOUSTON   TX   HARRIS   77801   HOUSTON
1924

1926 ─ ASSIGN SELECTED PROPERTIES TO:  [HOUSTON ▷]
                                         1928

NOTE: WHEN A USER ENTERS THIS SECTION FROM THE "DEFINE MARKETS" SECTION, THIS NOTION DOES NOT EXIST.

1930 ─[SAVE]   [CANCEL]

HOW TO USE   SECURITY STATEMENT   OPERATING GUIDELINES   FAQ   CONTACT QCORPS   USER PROFILE

FIG. 19B

| PSRSVersionEntry | | | |
|---|---|---|---|
| dateCreated | | 🔒 | ◇ |
| old | 🗝 | 🔒 | |
| oldCollection | | 🔒 | |
| oldParent | | 🔒 | |
| oldRequestSpec | | 🔒 | |
| versionComment | | 🔒 | ◇ |
| versionID | | 🔒 | ◇ |
| _PSRSVersionEntry_Timeinterval | | ≫ | |
| toChildEntries | | ≫ | ◇ |
| toCurrentTimeintervals | | ≫ | ◇ |
| toParentEntry | | > | ◇ |
| toProviderSystemRequestSpec | | > | ◇ |
| toVersionCollection | | > | ◇ |

FIG. 20D

MCIWORLDCOM

(WORK IN PROGRESS ●)
(SEARCH TRANSACTIONS ☺)  ORDER REQUEST FORM

REQUESTED SERVICE ADDRESS:
1313 MOCKINGBIRD LANE, #418
HOUSTON, TEXAS 77056

BILLING/CONTACT INFORMATION:
MR. JACK B. QUICK, JR.
1313 MOCKINGBIRD LANE, #418
HOUSTON, TEXAS 77056
(281) 555-6369
(713) 216-6300
(713) 882-1555
JBQUICK@XNET.COM
JBQUICK@AOL.COM

PRIOR SERVICE INFORMATION:
MR. JACK B. QUICK, JR.
1701 HERMANN DRIVE
HOUSTON, TEXAS 77056

ORDER:

PLAN(S):
    Z2817  BASIC LOCAL
PACKAGE(S):
    P3209  THE BASICS
FEATURE(S):
    P1701  CALL WAITING
    P3205  CALLER ID ENHANCED
    P3228  CALL BLOCKING
    P3400  CALL RETURN

PAYMENT APPROACH:

METHOD:    CREDIT CARD

ACCOUNT:    MR. JACK B. QUICK, JR.
                  AMERICAN EXPRESS
                  3728 4586 9789 EXP. 03/02

SERVICE ACTIVATION: 8/13/00

TRANSFER EXISTING NUMBER: (281) 398-1215

LISTED IN PHONE BOOK AND DIRECTORY ASSISTANCE: YES

NAME TO BE LISTED: JACK AND JANE QUICK

OMIT ADDRESS: NO

GENERATE RESPONSE ╱—2210

FIG. 22

QCORPS COMMUNICATOR ARCHITECTURE

| | | GRAPHIC USER INTERFACE | | | |
|---|---|---|---|---|---|
| GUI | MULTI-SERVICE DESKTOP | INTEGRATED HELP | ADVANCED CONFIGURATION SCREENS | LOG HISTORY | ORDER MANAGEMENT SCREENS | CUSTOMIZABLE |
| | | INTERNAL PROCESSING ENGINE | | | |
| IPE | DATABASE HANDLING | DELIVERY MECHANISM | LOG HANDLING | SECURE NETWORK COMMUNICATIONS | DISK CACHE | FILE BACKUP MECHANISM |
| | SECURITY SAFETY | APPLICATION UTILITIES | EVENT NOTIFICATION UTILITIES | GENERAL FILE HANDLING | XML PARSING ENGINE | SCHEDULING |
| | | EXTERNAL CONNECTION LAYER | | | |
| | | INFORMATION RECEIVING SYSTEM | | INFORMATION RESPONDING SYSTEM | |
| ECL | | COMMUNICATION PROTOCOLS | | | |
| | HTTPS | FTP | HTTP | TCP/IP | PARTNER SPECIFIC | *PARTNER SYSTEM PROCESSING TO STAGING AREA |
| | | STAGING AREA | | | |
| | RDBMS ADAPTERS JDBC | XML | ASCII | HTML | AUTO RESPOND | PARTNER SPECIFIC | XML | ASCII | HTML | PARTNER SPECIFIC |
| PIS | | PARTNER INFORMATION SYSTEMS | | | |

*FIG. 34*

METHOD AND APPARATUS FOR FACILITATING ELECTRONIC ACQUISITION AND MAINTENANCE OF GOODS AND SERVICES VIA THE INTERNET

CROSS-REFERENCE TO RELATED APPLICATIONS

Not applicable.

BACKGROUND OF THE INVENTION

1. Field of Invention

This invention relates to a method and apparatus for electronic acquisition and maintenance of goods and services via the Internet. More particularly, the present invention relates to a method and apparatus for customer acquisition and maintenance of goods and services from a plurality of service providers networked to an order facilitation service.

2. Background of the Invention

Many people recognize the benefits of "one-stop shopping", such as may be found at a convenience store or shopping mall. The benefits may include reduced travel and improved ease of comparison. Merchants that offer one-stop shopping may consequently provide enhanced customer satisfaction and acquire more customers relative to merchants that do not offer one-stop shopping. Despite the recognized benefits of one-stop shopping, there exist circumstances where it is not offered. One such circumstance is services for new tenants.

Tenants of various types of properties, whether business or residential, whether multi-business, multi-family, single-business or single-family, from time to time, relocate or move from one property to another. Such relocations may involve worldwide moves, interstate moves, intrastate moves or local moves. Regardless of the geographical bounds of the move, upon relocating tenants frequently engage in a substantial effort to acquire utility services such as electricity and telephone services. The foregoing effort is further increased by the fact that tenants must also disconnect services and utilities at their previous address. Tenants must also contact many financial institutions, such as banks, credit card issuers and investment institutions, to inform them regarding their change of address. Typically, tenants contact each service provider individually to arrange for acquisition of services. Generally, this effort involves numerous telephone calls with substantial wait times and lengthy interviews with representatives of each service provider. Furthermore, many service providers are unavailable during evenings, weekends and holidays.

There has been very limited "automated" help available to relocating tenants. Some companies offer a service whereby tenants can register all of their credit cards with such companies. When a tenant moves, he or she contacts the company with whom the tenant is registered, and the company will contact all card issuers of the tenant and inform them of the tenant's change of address. While such a service provides some assistance to a relocating tenant, it is limited to address changes and furthermore, it is limited to a particular type of service provider, namely credit card issuers or financial institutions. There are also some online services, such as move-.com, that provide limited assistance. Typically, the extent of the assistance involves providing a link to the service provider's Internet web site or sending a very basic communication, such as email, to the service provider to inform them the tenant has moved or that the tenant needs a particular utility. At that point, each service provider makes contact with the tenant, which generally, takes the form of traditional contact via a telephone call to the tenant. Similarly, tenants routinely acquire various goods and services that vary with the property type. For example, a business tenant usually needs office-supply on a regular basis and a residential tenant may need dry cleaning services. Regardless of the product or service needed, tenants frequently need easy access to such products and services. Typically, tenants contact each service provider individually to arrange for acquisition of the goods and services. Furthermore, there is no easy way to shop and compare such goods and services and be able to automatically and immediately place orders with the selected service provider, all from one common place. Tenants may have to contact numerous service providers individually, take notes, compare them later and finally call back the selected provider and place an order. While some online services enable comparison of products and services, such online merchants do not provide integration of the acquisition process in the manner and with the efficiencies of the present invention.

The above-described prior art methods and systems for acquisition and maintenance of goods and services by property tenants are inefficient. Accordingly, it would be desirable to provide a method and system which provides the benefits of one stop shopping in a uniform, integrated structure that eliminates inefficiencies of the prior art methods.

BRIEF SUMMARY OF THE INVENTION

The present invention solves the problems faced by the prior art methods and systems. The present invention provides a method and apparatus for acquisition and maintenance via the Internet of goods and services from multiple service providers in a uniform, automated and integrated manner. In the preferred embodiment of the present invention, property tenants, such as residents of single or multi-family properties, may connect and disconnect utilities and/or purchase other goods and services electronically via the Internet from various service providers prior to moving in, upon moving in, and after moving in to the property. The utility and advantages of the present invention make it a highly desirable and commercially practicable mechanism for easy, quick and efficient acquisition and maintenance of goods and services by property tenants from a plurality of service providers.

The present invention particularly contemplates an online service for facilitating provision of services to customers. The online service preferably comprises a network, and at least one computer coupled to the network. The computer interacts with service provider, brand partners, and customers, via the network to maintain a database of service provider accounts, brand partner accounts, and customer accounts. The service providers enter service products in the database for access by customers, the brand partners enter customization elements in the database, and customers enter personal information in the database. The computer presents a list of service products to a customer customized in accordance with customization elements of a brand partner associated with the customer, and customized in accordance with an address associated with the customer. The customer may then provide order information to the computer, which then directs the order information to the appropriate service providers and updates the customer's account to reflect the orders. The computer may further receive communications from the service providers regarding specific orders, and update the customer account database to reflect the communications.

The present invention further contemplates a method of selling a service product, comprising: (a) generating in multiple service categories representations of multiple service products; (b) providing an interactive display of one or more of the representations within a service category to a customer; and (c) displaying an order form in response to customer actuation of an order icon. The service product representation includes a plan component, a package component, and a feature component. The interactive display includes selection icons adjacent corresponding plans, packages, and features specified by the service product representations, and includes an order icon for each displayed service product representation.

The present invention further contemplates systems and methods that allow for straightforward, yet flexible, definition of service product markets; advantageous status designations for market offerings; flexible start date restriction rules; context sensitive information request forms, dynamic price determination on interactive comparison forms; flexible restriction rules for selection combinations of plans, packages, and features; creation of customized data elements; a powerfully advantageous ordering process; a discontinuation process; an inter-dependent order resolution feature; a hierarchical customization scheme; and/or centralized two-way communication between customers and service providers.

BRIEF DESCRIPTION OF THE DRAWINGS

A better understanding of the present invention can be obtained when the following detailed description of the preferred embodiment is considered in conjunction with the following drawings:

FIG. 10 illustrates the selection of plans in service offerings by customers.

FIG. 12 illustrates the recap of selected plans, packages and features by customers and the entry of related additional information by customers.

FIG. 13 illustrates the disconnection of services by customers.

FIG. 14 illustrates the customers' profile information.

FIG. 15 illustrates the interface customers use to update general information.

FIGS. 16 and 17 illustrate a sample report showing a customer's account summary.

FIGS. 19(a) and 19(b) show illustrative interface screens that may be used to define markets for service provider offerings.

FIG. 22 illustrates a sample order displayed after service provider clicks on the URL link in email order notification.

FIG. 34 shows a detailed architecture of one communicator embodiment.

Figure 1:
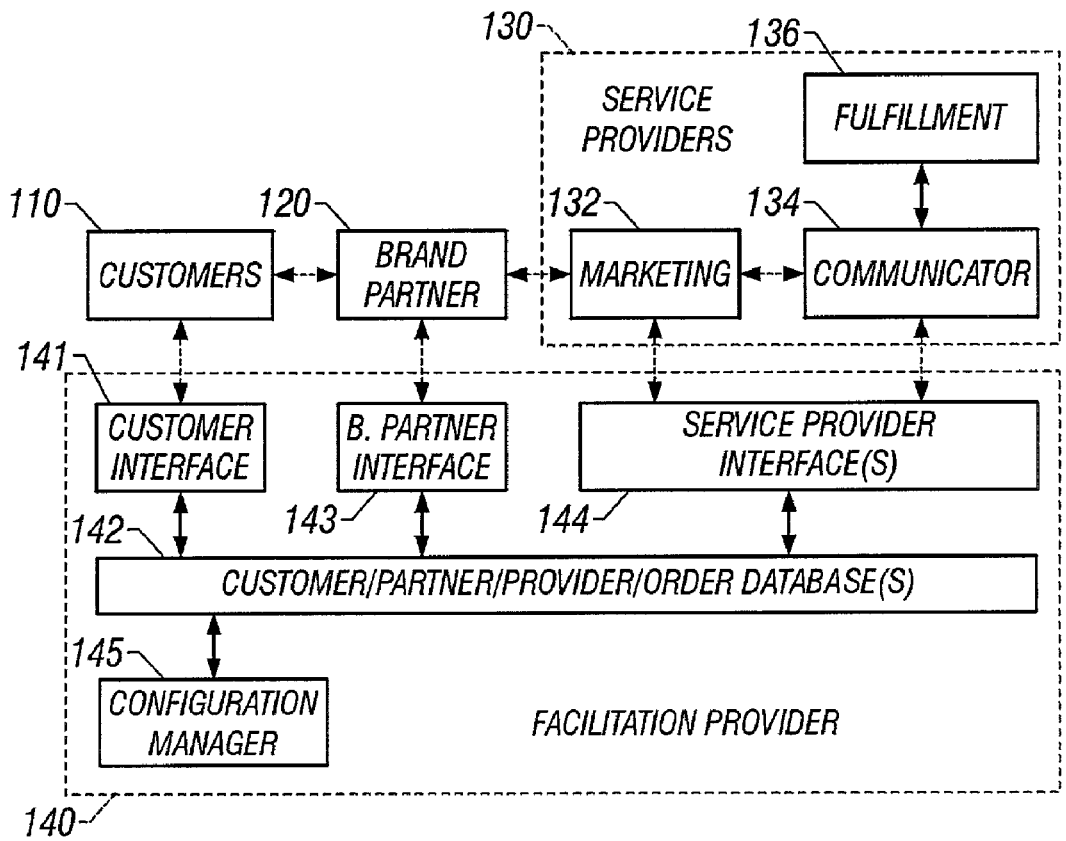
FIG. 1 is a system block diagram of a preferred embodiment showing the relationships and the flow of information between customers, brand partners, service providers and the facilitation provider.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF A PREFERRED EMBODIMENT

Turning now to the figures, FIG. 1 shows a block diagram of a preferred embodiment. Customers 110 may establish an acquaintance or business relationship with a brand partner 120. Brand partner 120 is one of many persons or commercial entities that employ the services of facilitation provider 140, and brand partner 120 informs customers 110 of the facilitation provider's availability for their use in securing the offerings of service providers 130.

As an example, consider the scenario in which new residents (customers 110) enter into a lease agreement with an apartment complex (brand provider 120). The residents will typically need to establish various utilities and services (e.g., water, gas, electric, local and long distance telephone, mobile telephone, cable, mail delivery) at their new address, and discontinue those utilities and services at their previous address. The apartment complex can establish an account for the residents with facilitation provider 140, whereby the residents can establish and discontinue their utilities and services in one convenient setting.

The facilitation provider 140 takes any necessary information from the customers 110 and electronically communicates orders to the appropriate service providers 130. The service providers 130 enter the orders into their normal order stream and establish, modify, or discontinue their services to the customers 110. The format and architecture of the system is designed to sharply reduce the effort required by the customers 110, significantly reduce the resources required by the service providers 130, and improve the marketability of the brand provider 120.

In the example given above, residents can secure their necessary utilities and services in less than ten minutes, as opposed to the normal requirement of two to four hours for contacting each service provider individually, enduring the hold interval, and repeatedly providing much of the same information to a customer service representative. Service providers typically can substantially reduce the effort expended by customer representatives because the order information is automatically provided in a standard format and representatives do not have to hand-key the information. (Indeed, service providers who choose to use the communicator application can entirely eliminate intervention by customer service representatives.) The apartment complex can advertise the facilitation service as one of their amenities, because it permits easy acquisition and maintenance of available services by their residents. Further, the available services have an incentive to competitively price their offerings for residents because the facilitation service provides for easy comparison of available service provider offerings, or alternatively, the service providers can negotiate with the apartment complex for exclusive access to the residents.

FIG. 1 shows that the service provider 130 may include a marketing department 132, a fulfillment department 136, and optionally a communicator application 134. The optional communicator application 134 preferably runs on the service provider's internal computer network to communicate with one or more of the file sources provided by the facilitation provider 140. The communicator 134, which is described in greater detail below, can be run anywhere (e.g., service provider, facilitation provider, independent third party site) to effectuate the transfer of files between the facilitation provider and the service provider.

As will be described in more detail below, the communicator 134 retrieves orders placed by the customers 110, and updates each order with status information and any communications that the fulfillment department may wish to send to the customer. The communicator 134 preferably is a versatile application which can be configured by the marketing department 132 and used by the fulfillment department 136 in a variety of ways. The fulfillment department 136 may optionally use software provided by the facilitation provider 130 or may use internally customized software to interface with the communicator application 134. As the use of the communicator application 134 is optional, the marketing department 132 may alternatively configure the facilitation provider 140 to send emails or faxes of orders to the fulfillment department 136 if the service provider 130 prefers to handle orders manually. In addition, the fulfillment department 136 may use standard web-based software to access the interface 144 via the Internet to process orders.

The facilitation provider 140 preferably executes a set of applications on a reliable computer network. The applications include a customer interface 141, one or more databases 142, a brand partner interface 143, a service provider interface 144, and a configuration manager 145.

Each of the interfaces 141, 143 and 144, is preferably presented to the corresponding users in the form of a sequence of web pages, which the customers 110, brand partners 120, and marketing department 132 can access via the Internet. Customers 110, in particular, may access a web page for the brand partner 120 over the Internet that includes a link to the customized customer interface 141. Selecting the link causes the customer's web browser (or other web-compatible software application) to access the customer interface 141 to communicate with database 142. Alternatively, the customers 110 may steer their web-software directly to the interface 141. As yet another option, a voice-activated browser may be used by one or more of the users to select particular options available via interfaces 141, 143 and/or 144.

Brand partners 120 and service providers 130 wishing to take advantage of the facilitation provider's services may enter into an engagement agreement with the facilitation provider 140. The facilitation provider 140 uses the configuration manager 145 to create accounts for the brand partners and service providers in the database(s) 142. The service providers 130 can then access their accounts via service provider interface 144 to specify their goods or services. The brand partners 120 can access their accounts via brand partner interface 143 to create customer accounts. Customers 110 can access their accounts via customer interface 141.

Service providers 130 use interface 144 to setup and register service offerings. As part of the setup and registration process for service offerings, service providers 130 provide detailed information regarding utilities, products or services that will be offered to customers 110. This detailed information may include custom-tailored, mutually exclusive "markets" in which the products or services are available.

In the present application, the term "service providers" is used in a very broad sense to include, without limitation, all entities such as merchants, individuals and businesses, whether for profit or not for profit, which can provide or sell any services, utilities, products, goods and anything else that may be offered to customers 110. Service providers 130 incorporates the foregoing definition. Similarly, the term "service categories" is used in a very broad sense and includes, without limitation, any categories of services, utilities, products, goods and anything else that may be offered to customers 110 by service providers 130. By way of illustration, examples of service categories include local telephone service, long distance telephone service, electricity, gas, cable television, satellite television, Internet access services, cleaners, groceries, insurance, furniture rental, bottled water, maid service, newspaper and magazine delivery, pet food and pet related services, prescription drug services, delivery services, transportation services, food services, and anything else that a service provider may provide to customer 110. Furthermore, the term "service" itself is used in a very broad sense and includes, without limitation, any services, utilities, products, goods and anything else that may be offered to customers 110 by service providers 130.

Brand partners 120 use brand provider interface 143 to customize the customer interface 141, set up employee accounts, and to set up customer accounts. The customization of customer interface 141 includes selecting a color scheme, selecting a banner identifying the brand partner, selecting which service categories will be available to their customers 110, and selecting which service providers 130 may offer their services to the customers 110 under each service category. The brand partners may choose to select a logo for display, a marketing image (such as a picture of the building where the brand partner is housed), a layout template, and other customization elements such as, e.g., color, font, display text, that help create a unique "feel" that the brand partners wish to be associated with. As customers 110 enter into relationships with the brand partner 120, the brand partners use interface 143 to set up access accounts for the customers. Note that the brand partners 120 may set up multiple accounts. For example, property managers may wish to set up a different customer interface and selection of services for each of multiple apartment complexes under their management.

By way of example and without limitation, brand partners may be property managers, landlords, real estate agents, universities, the Armed Forces, relocation specialists, movers, web portals, search engine sites, other web sites, corporations, and service providers.

Customers 110 use interface 141 to select categories of services they desire, to compare service providers within those categories, and to place an order for establishment or discontinuance of services from selected service providers. Once a customer 110 decides to place an order with a service provider 130, facilitation provider 140 sends an electronic notification of the order to the service provider. The service provider 130 processes the order and preferably sends an electronic response back to the facilitation provider 140. (Of course, the service provider 130 may also contact customer 100 directly via traditional mechanisms, such as a telephone, in response to the order.) Customers 110 can access their facilitation provider account at will to view the status of their orders and any associated communications received from the service providers 130.

In this manner, customers 110 enter into agreements with service providers 130 to receive services, including utilities, and to purchase various goods. As part of the various agreements in place between customers 110, brand partners 120, service providers 130 and facilitation provider 140, certain financial incentives are in place and accordingly certain monetary payments may be made between the foregoing parties.

Figure 2:
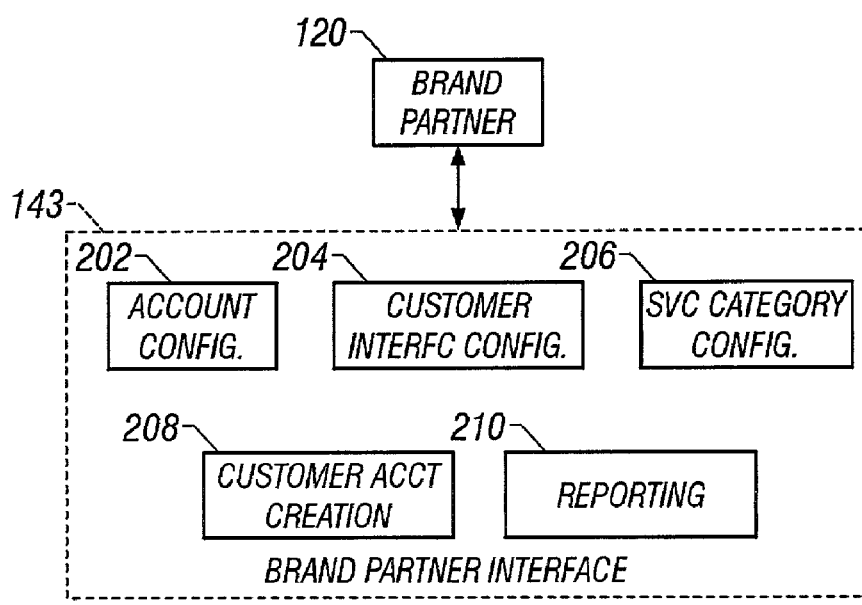
FIG. 2 is a block diagram illustrating the various activities of brand partners with respect to the facilitation provider.

As stated above, brand partners 120 preferably must engage in certain activities before customers 110 can access facilitation provider 140 to purchase goods and services offered by service providers 130. Referring now to FIG. 2, brand partners 120 may set up (or have set up for them) various administrative and brand partner accounts 202 on facilitation provider 140. Brand partners 120 may also make certain selections 204 to customize customer interfaces 141, and may make selections 206 regarding what service categories will be available to customers 110 and which service providers 130 may offer their services to the customers 110 under each service category. Once the foregoing activities have been completed, brand partners 120 may then engage in customer registration 208. There are a number of reporting options 210 for brand partners 120 to help track and analyze the various transactions and activities.

In the preferred embodiment of the present invention, all of the foregoing activities by brand partners 120 are performed by accessing computer applications that reside on facilitation provider's computer network. However, as one of ordinary skill in the art will appreciate, such applications may be located on a single web server or distributed across different computer networks. Further the physical location of the computer executing the applications may vary and may be at multiple locations, e.g. at a central location of the facilitation provider and/or at the brand partner's site.

Figure 3:
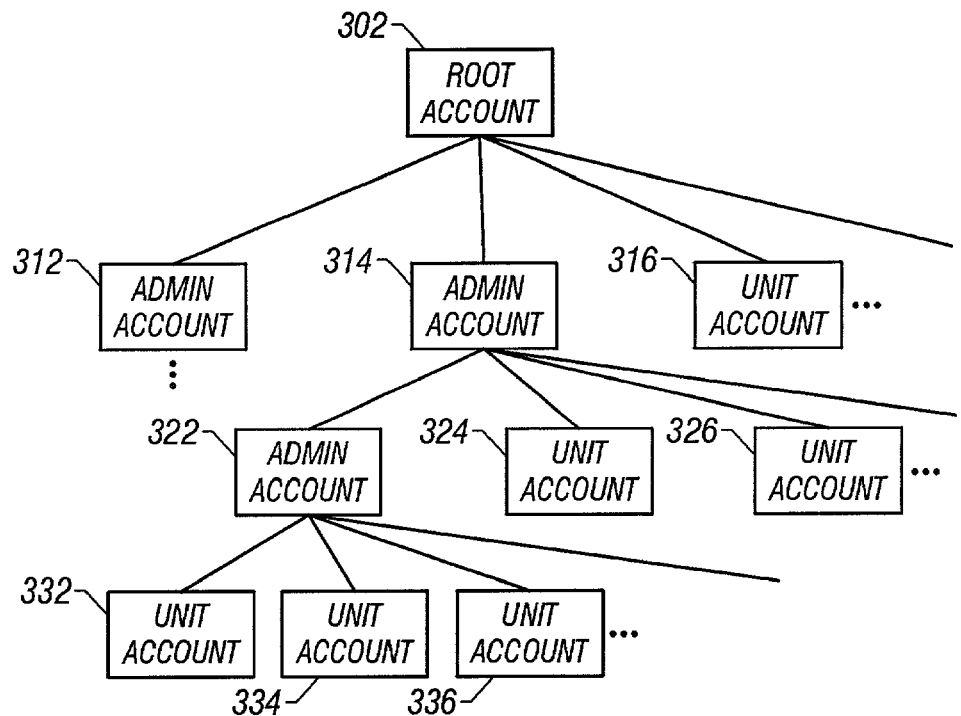
FIG. 3 is a block diagram illustrating the configuration relationships of brand partners.

Brand partners 120 may set up administrative and unit brand partner accounts 210. Generally, brand partner accounts that are configured as administrative accounts do not engage in customer registration activities, whereas brand partner accounts configured as unit accounts do engage in customer registration activities, and may also engage in administrative activities. Referring now to FIG. 3, a root account 302 is created by facilitation provider 140 using configuration manager 145. The facilitation provider accessing the root account can create multiple brand partner accounts 31x.

In the exemplary embodiment of FIG. 3, the facilitation provider has created two administrative accounts 312, 314, and a unit account 316. The brand partner assigned to administrative account 314 has in turn created an administrative account 322 and two unit accounts 324, 326. This might be desirable for a parent company wishing to establish accounts for each of its subsidiaries. Each of these subsidiaries may in turn be parent companies wishing to create accounts for each of its sub-subsidiaries. In FIG. 3, the subsidiary brand partner assigned to administrative account 322 has created three unit accounts 332, 334, 336. Employees assigned to unit account 334 can register various customer accounts for the customers they serve.

The foregoing results in an account structure having a tree-like form. Each administrative account has some control over the configuration options made available to those accounts below it, and may optionally be subjected to restrictions imposed by accounts above it. Further, each account reports to the accounts above it.

In the preferred embodiment of the present invention, the foregoing organization of brand partners, along with the related data structure which facilitates the foregoing relationships, enables higher-level administrative brand partners 31x to set up global rules or limitations which are automatically inherited by subordinate administrative and unit brand partners 32x. In the hierarchy of relationships between the two types of brand partners, the facilitation provider's database is configured as the parent 302 of all administrative and unit brand partners (numbered as 312 through 336 in FIG. 3). Therefore, the parent account 302 contains all of the rules and limitations, which are then filtered down to all administrative and unit brand partners (312-336). By way of illustration, the rules and limitations include such things as the master list of all service categories and service providers that are available for selection by all brand partners 120.

Such rules and limitations preferably govern the manner in which the subordinate administrative and unit brand partners (312-336) conduct the business of configuring customer interfaces and making goods and services available to customers 110. For example, subordinate brand partner accounts 32xare limited to the particular service categories and service providers selected by higher-level administrative brand partner 314. Similarly, the selections made by administrative brand partner 322 are imposed upon unit brand partners 332, 334 and 336. In this manner, and in accordance with the preferred embodiment, each administrative brand partner can further filter rules and limitations down to lower-level administrative brand partners and unit brand partners. Parent accounts may choose to set up their selections as defaults which can be overridden by subordinate accounts.

In setting up unit brand partners, brand partners 120 provide certain required data elements to facilitation provider 140 regarding the customers (e.g., residents of an apartment complex) that will be managed by the unit brand partner. For example, in the case of an apartment complex, such required data elements may include the physical address of each building in the apartment complex and valid unit numbers for each building in the apartment complex. Brand partners 120 also set up facilitation provider access accounts for employees or representatives of the administrative brand partner and any subordinate brand partners. The setup of access accounts includes the generation of a unique user name and an associated password for each representative or employee. Such access accounts enable the employees or representatives to access facilitation provider 140 and to engage in the various setup, registration and maintenance activities associated with the use of facilitation provider 140 and its related functionality.

Referring back to FIG. 2, brand partners may make certain selections relating to their customization 204 of the customer interface as part of the brand partner setup and registration process. In the preferred embodiment of the present invention, facilitation provider 140 contains web-based applications that are executed by brand partners 120 to setup a customized web site for customer access. As one of ordinary skill in the art will appreciate, such web-based applications contain web site templates that allow customization of various elements of the templates whereby a custom look and feel is created for each web site. The elements which may be customized by (or on behalf of) brand partners 120 may include, among others, web site colors, banners, images, general text, and fonts. This process is also referred to as "private labeling" of web sites. The private labeling process permits brand partners 120 to present a custom web site interface to their customers 110, while all of the functionality and computer applications which run behind the scenes are uniform standards provided by facilitation provider 140. Therefore, brand partners do not have to develop, at great expense and time, their own Internet web-based applications to interface with facilitation provider 140.

Customers 110 may access the custom web site interface 141 on facilitation provider 140 through links established in a separate brand provider web site, or customers 110 may directly access the Internet web site of facilitation provider 140. In each case the customer's unique user name and password will identify the particular unit brand partner under which the customer is registered. Thus, the appropriate custom web site features and selections will be displayed by facilitation provider 140 to the customer 110.

The setup and registration process for brand partners 120 allows brand partners to make certain selections 206 regarding what service categories will be available to their customers 110 and which service providers 130 may offer their goods and services to the customers 110 under each service category. In the preferred embodiment of the present invention, facilitation provider 140 contains web-based applications that are executed by brand partners 120 to perform the service category configuration 206. As noted above in the discussion of FIG. 3, the facilitation provider's database provides a list of all valid service categories and service providers that are available to all brand partners 120. Typically, each administrative brand partner decides what service categories will be available to each unit brand partner that is subordinate to the administrative brand partner. Once service category selections are made, the administrative brand partner may select which service providers will be available to the customer 110 for providing goods and services under each particular service category. Of course, this service category configuration may be left up to the unit brand partners. As previously defined, the range of service categories and the variety of service providers are unlimited.

Once brand partners 120 have completed all of the necessary setup and registration procedures, unit brand partners enter into relationships with customers 110 (e.g. leases with residents). Upon entering into a relationship with a customer 110, unit brand partners access web-based applications on facilitation provider 140 to perform customer registration 208. In order to register a customer 110, unit brand partners provide certain basic data elements to facilitation provider 140. Such data elements may, for example, include the customer's name, address and apartment number. Unit brand partners may provide other information relating to the customer 110, such as telephone numbers, email address, and other contact information. The facilitation provider 140 then creates a customer account for the newly registered customer 110 by creating a new database record and generating a unique username and password for each new customer. The customer accounts enable the new customers to access the customer interface 141 of facilitation provider 140.

Figure 5A:
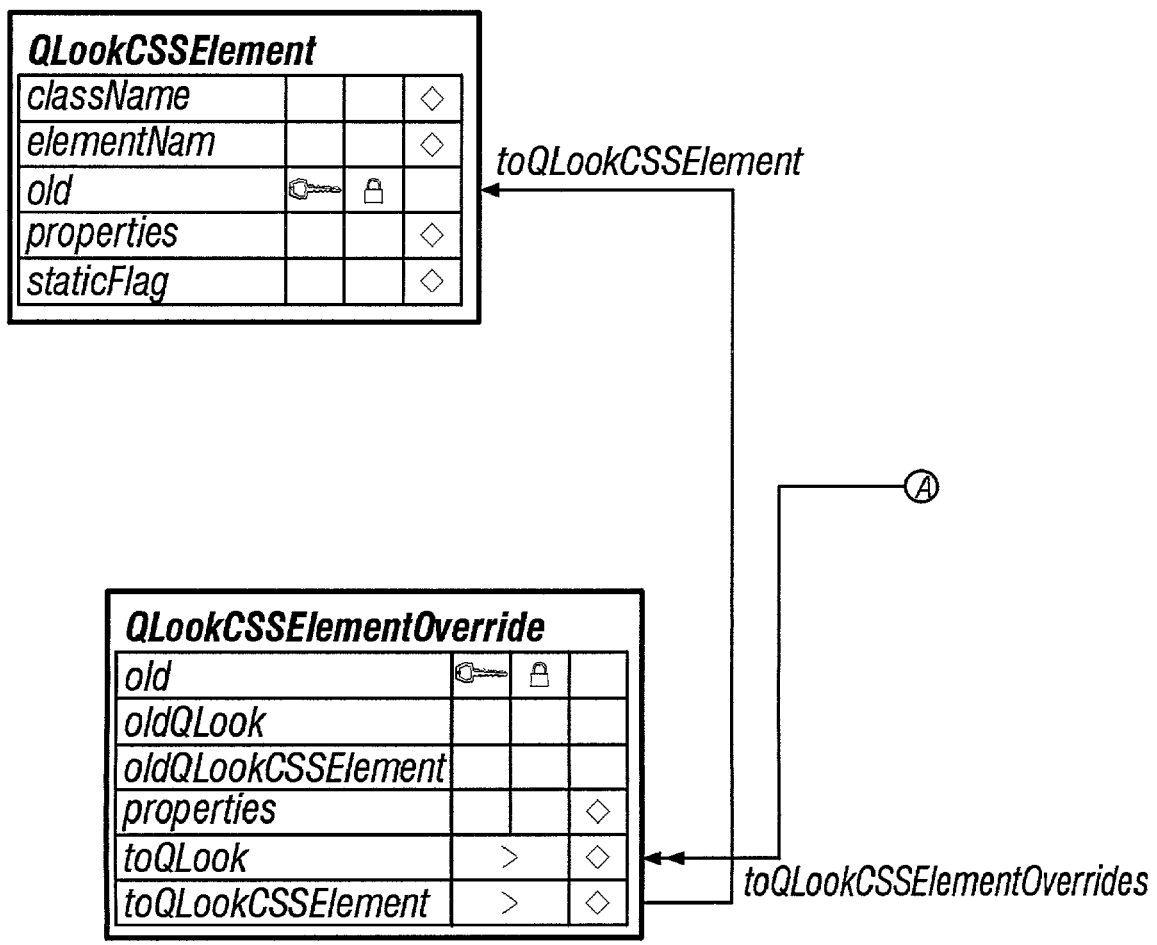
Figure 5B:
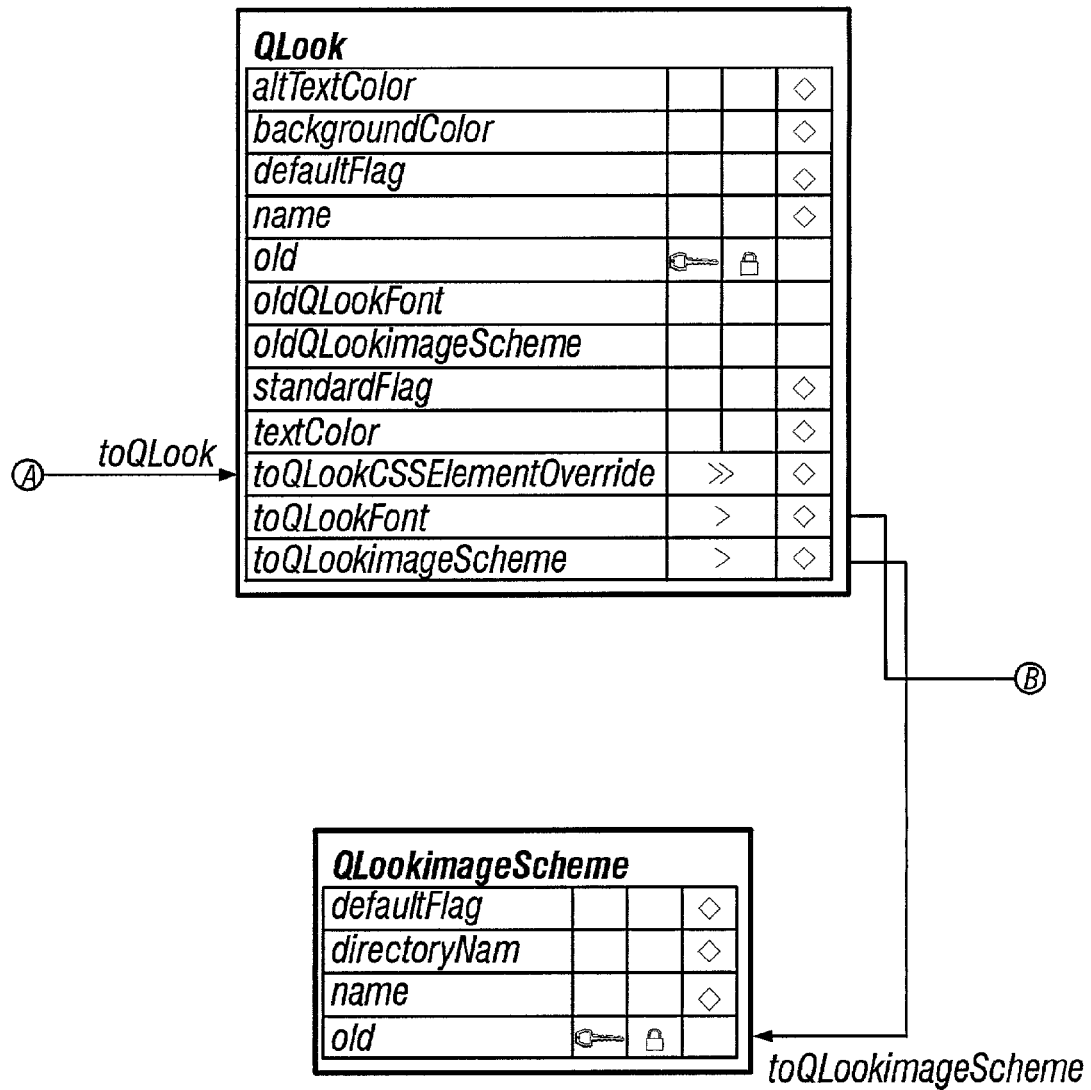
Figure 6A:
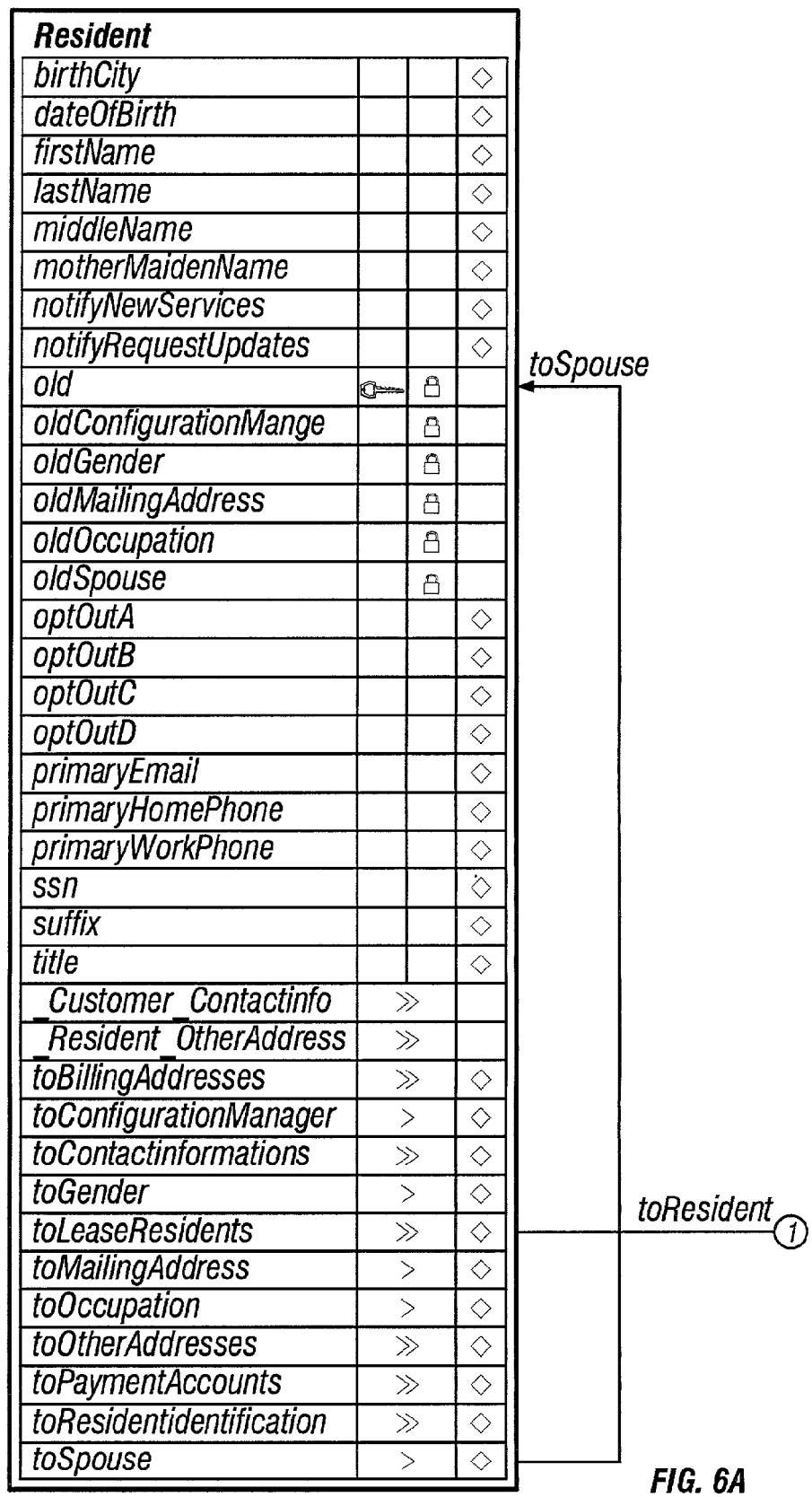
FIG. 6 illustrates the data elements and their relationships in a data type definition format as used in the preferred embodiment relating to customers.
Figure 6B:
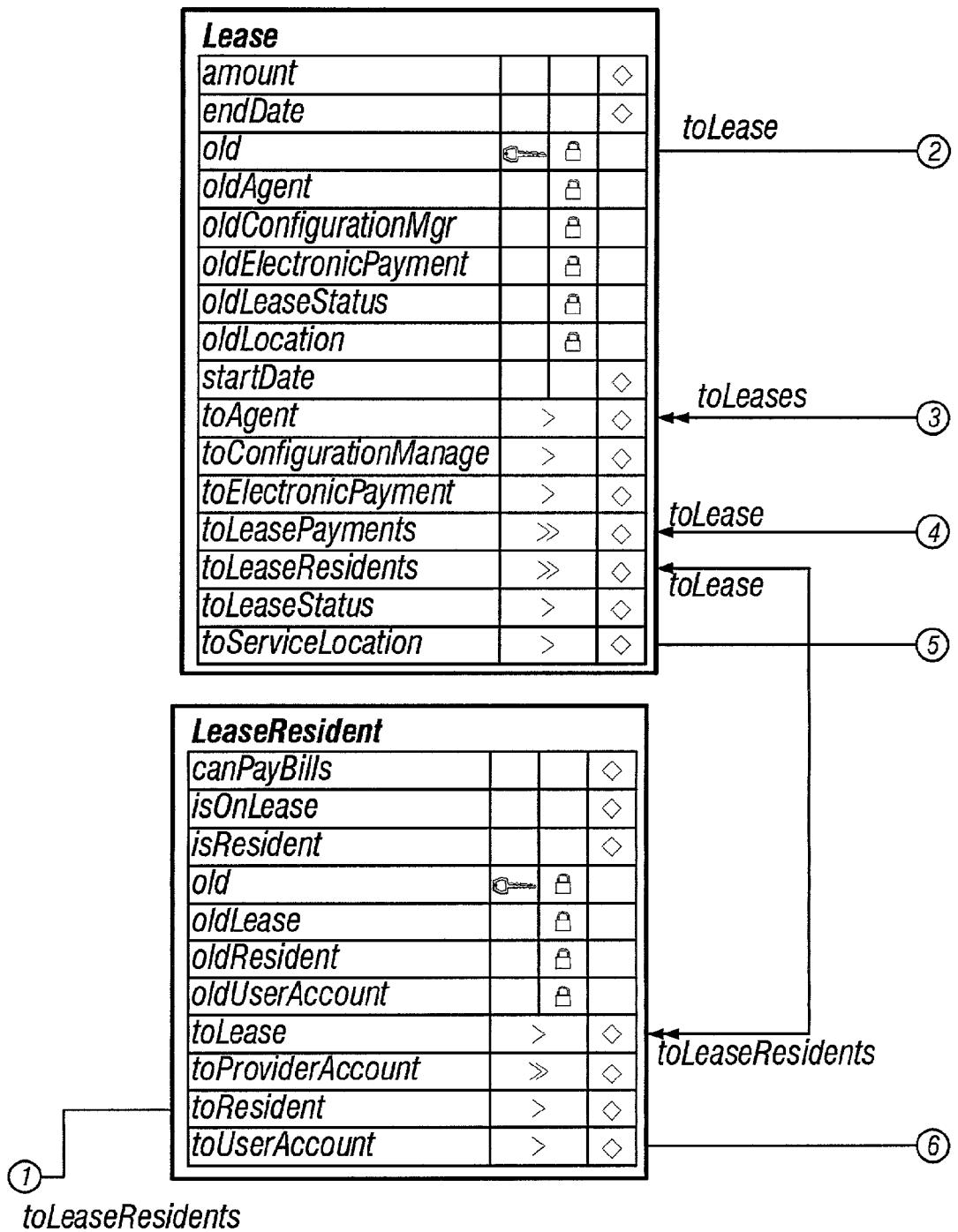
Figure 6C:
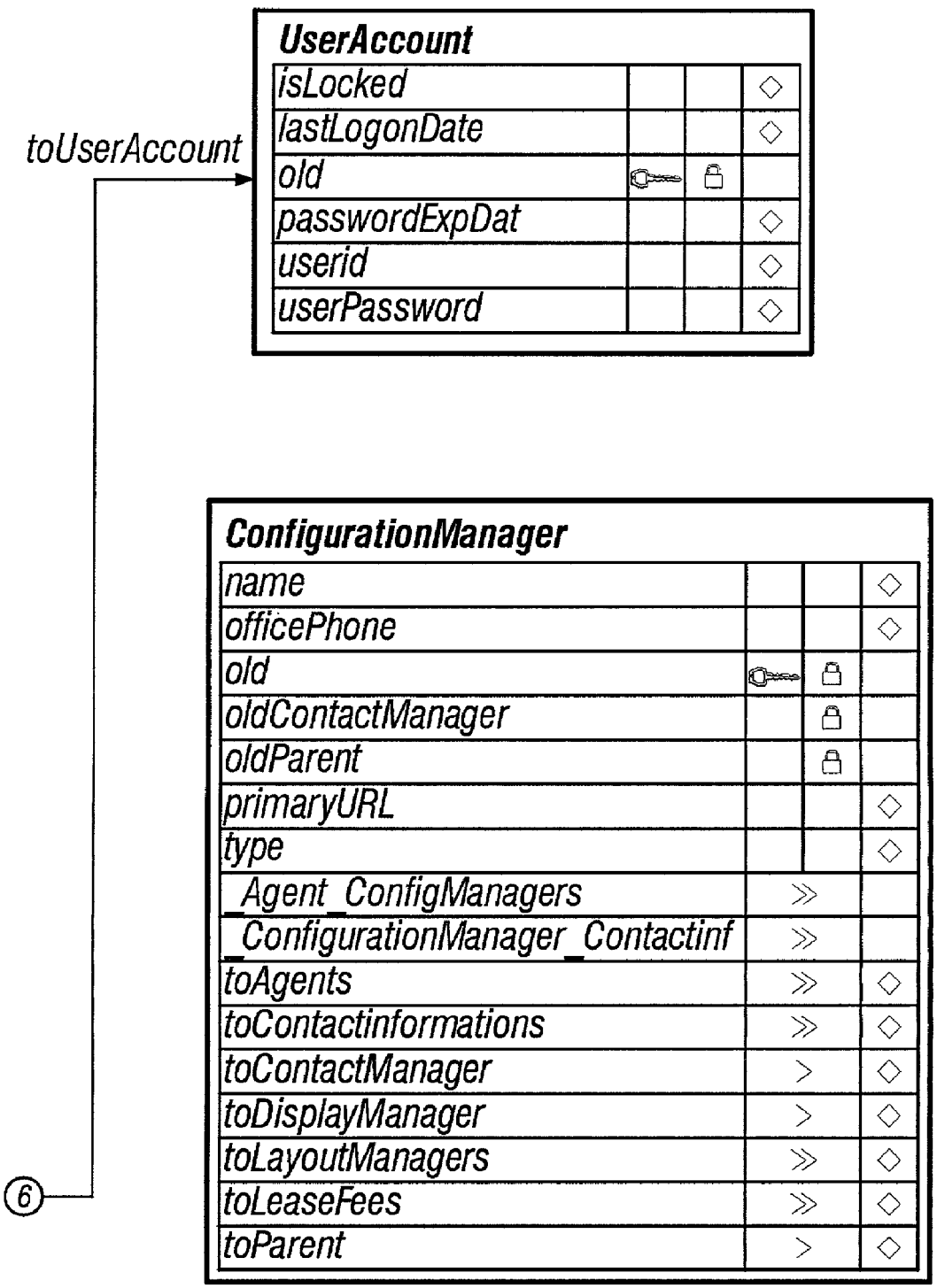
Figure 6D:
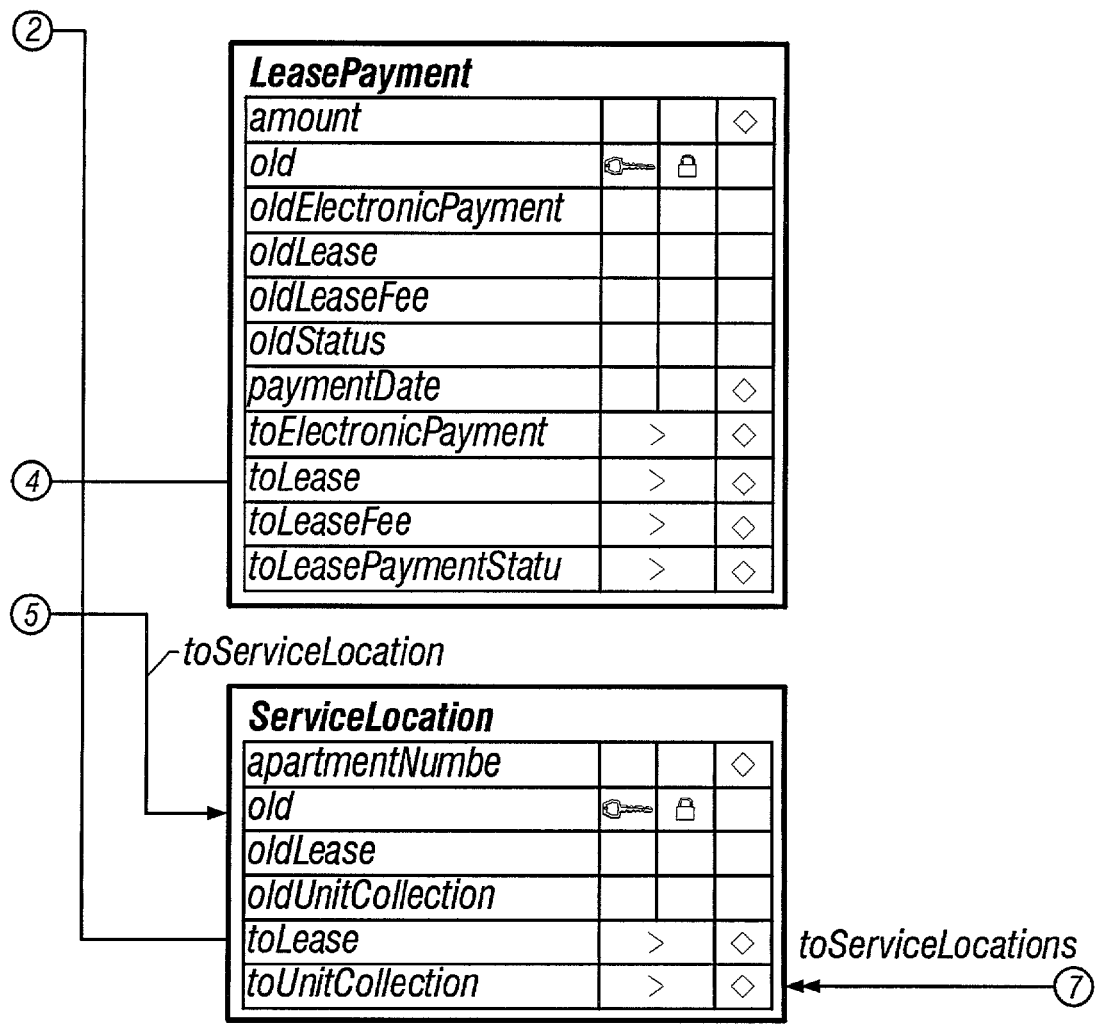
Figure 6E:
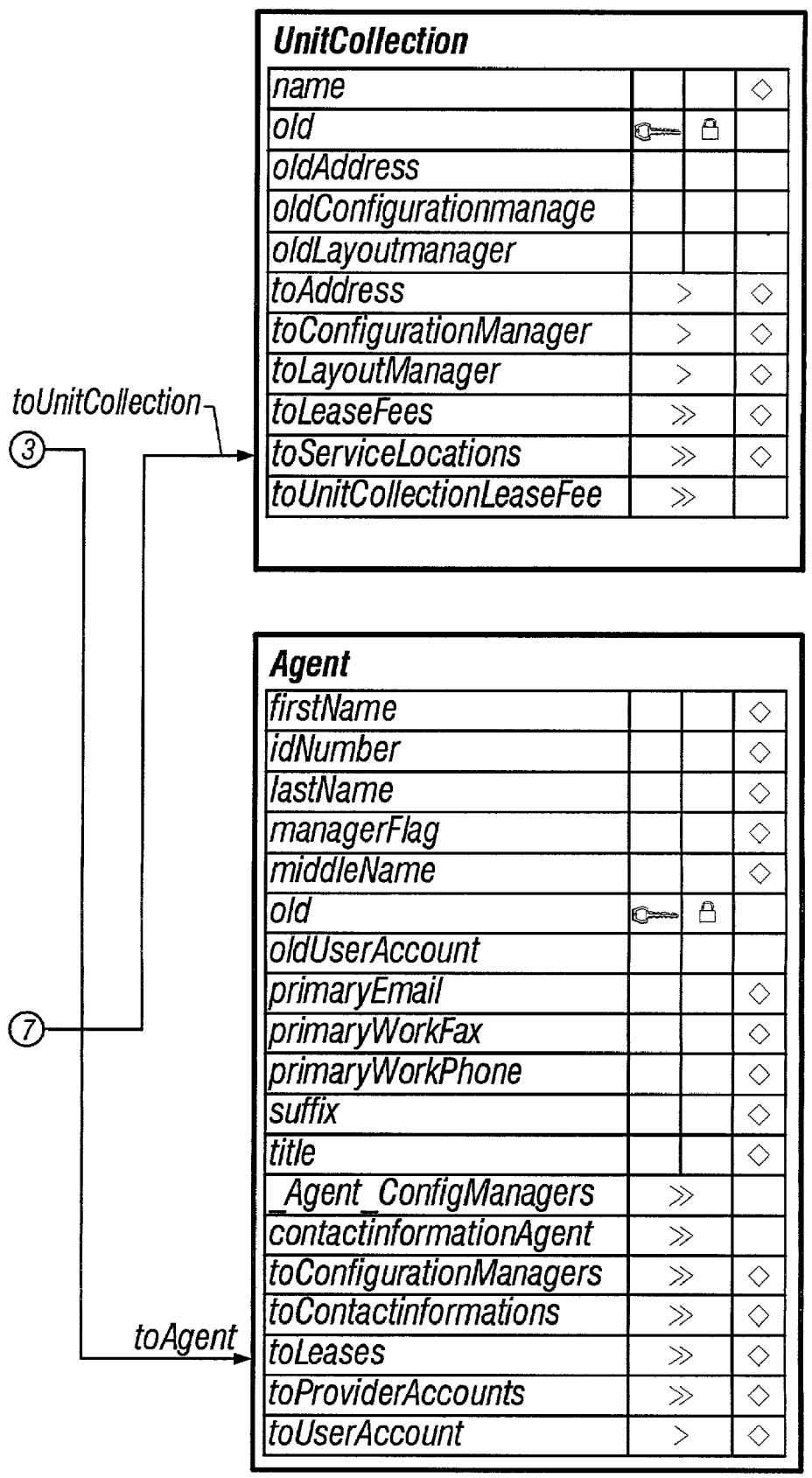

The computer implementation of the brand partner interface 143 is preferably accomplished by writing web-based applications in Java, using the Oracle relational data base management system. The data structures are preferably stored in Oracle relational databases. In the property-manager/tenant example, new brand partner accounts may be made in the form of new account records in the database 142. The account records might be given the data structure shown in FIGS. 4 and 5. In the same example, a new customer record might have the structure shown in FIG. 6. These figures show data type definitions which specify the various data elements of a brand partner record and a customer record, and show the relationships between these data elements in a format that will be understood by one of ordinary skill in the art. Some of the data elements in the records will be populated with the information provided by the brand partner (e.g., resident's first, last and middle names, the apartment number, and service address), others may be populated or modified by the facilitation provider (e.g. credit information, default values for notification options), the customer (e.g., social security number, occupation, previous address), and/or the selected service providers (e.g., provider account information, primary home phone number). The structure of the brand partner account record and customer account record may be customized by the facilitation provider for the particular application of the facilitation service.

As one ordinary skill in the art will also appreciate, computer programs may be easily written to access the relational databases and produce reports 210 which will assist brand partners 120 and others in tracking and analyzing the various transactions and activities described above.

Figure 7:
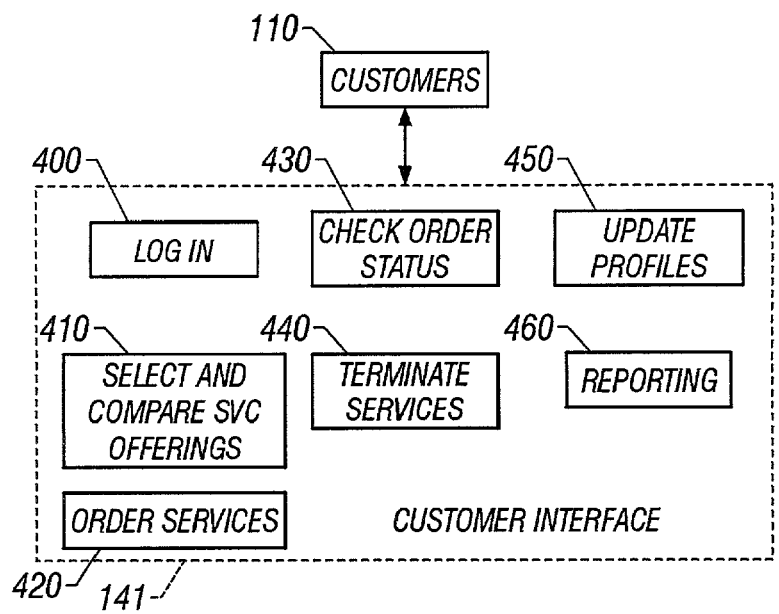
FIG. 7 is a block diagram illustrating the various activities of customers in acquiring and maintaining services via the facilitation provider.
Figure 4A:
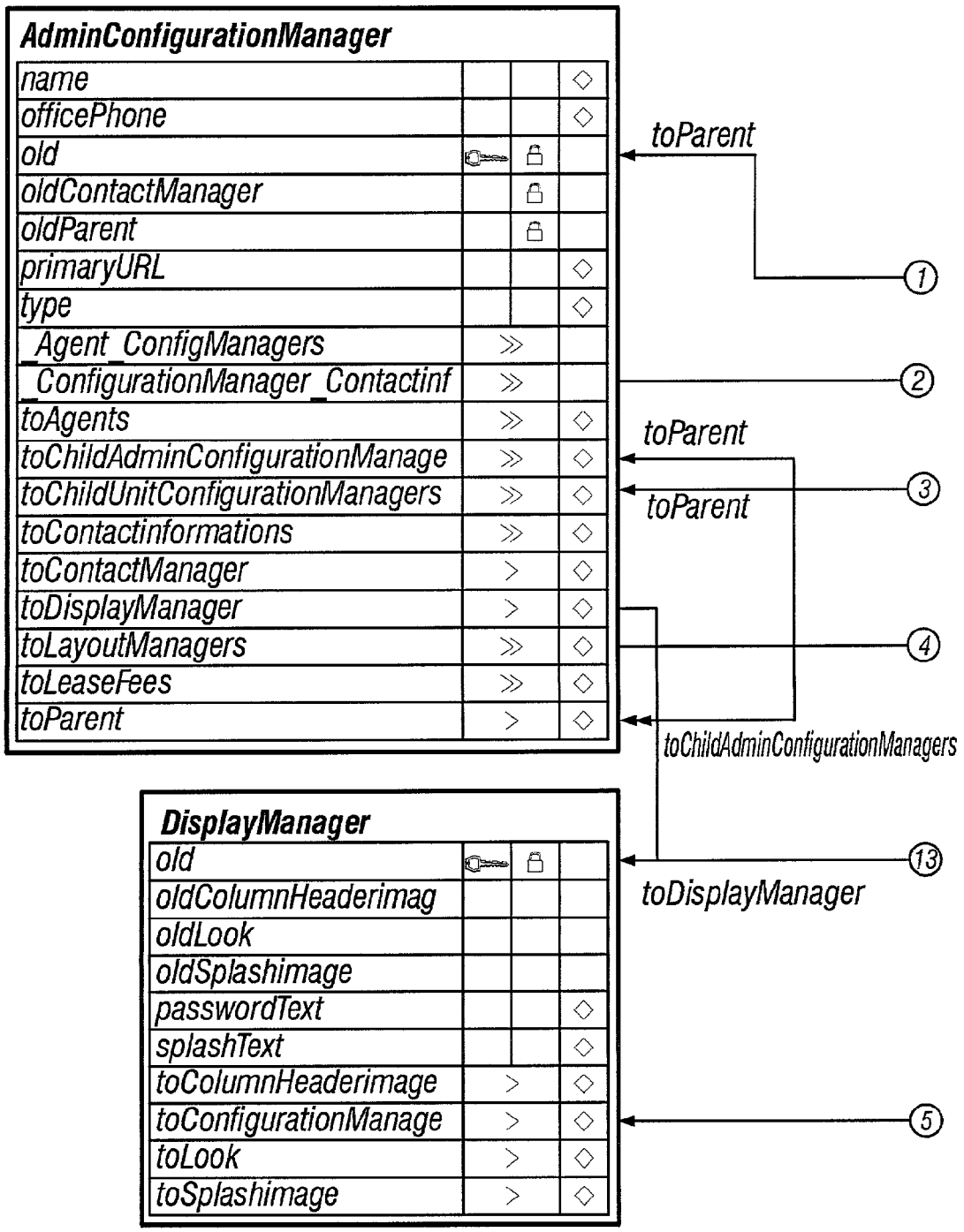
FIGS. 4 and 5 illustrate the data elements and their relationships in a data type definition format as used in the preferred embodiment relating to brand partners.
Figure 4B:
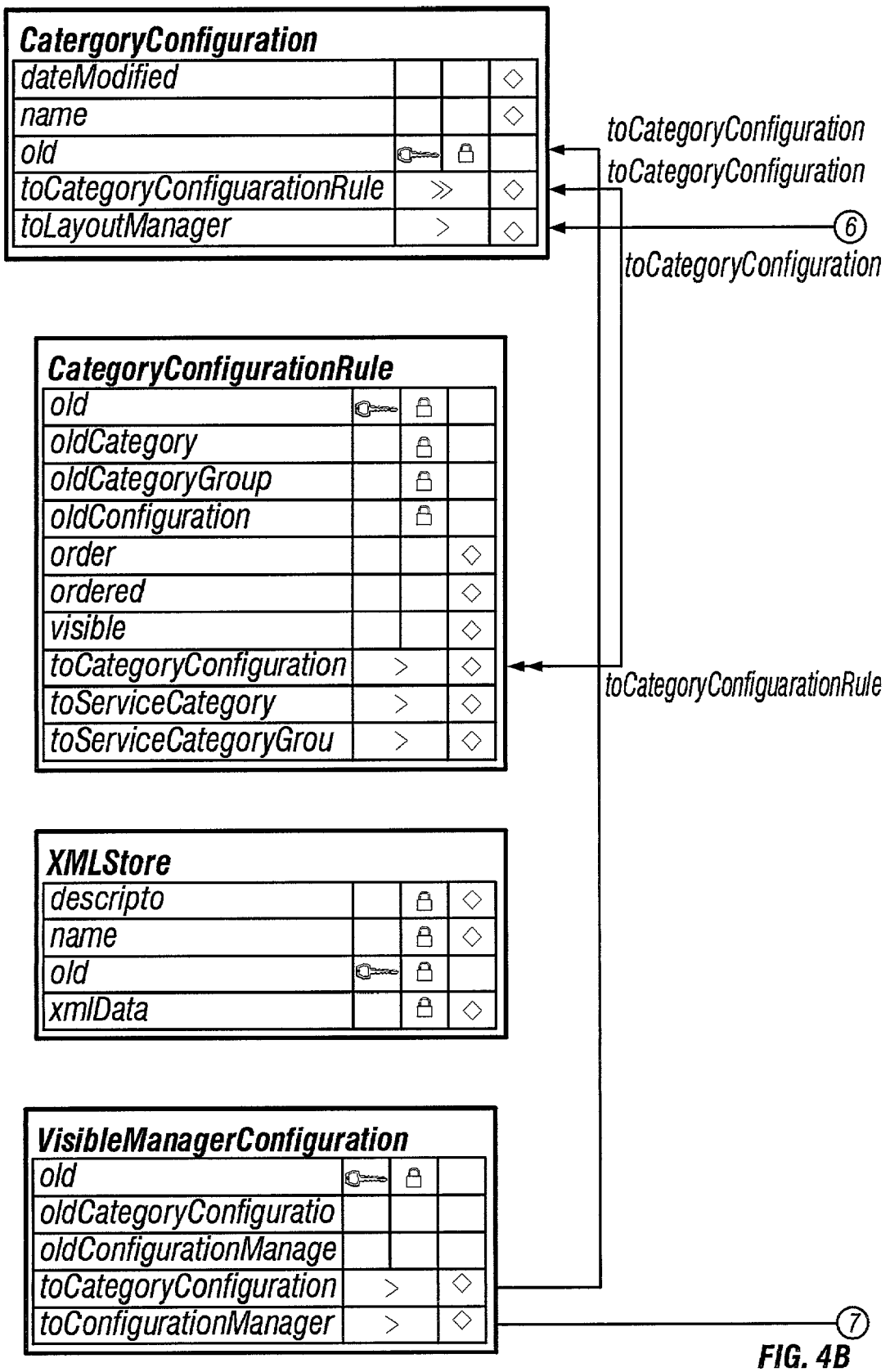
Figure 4C:
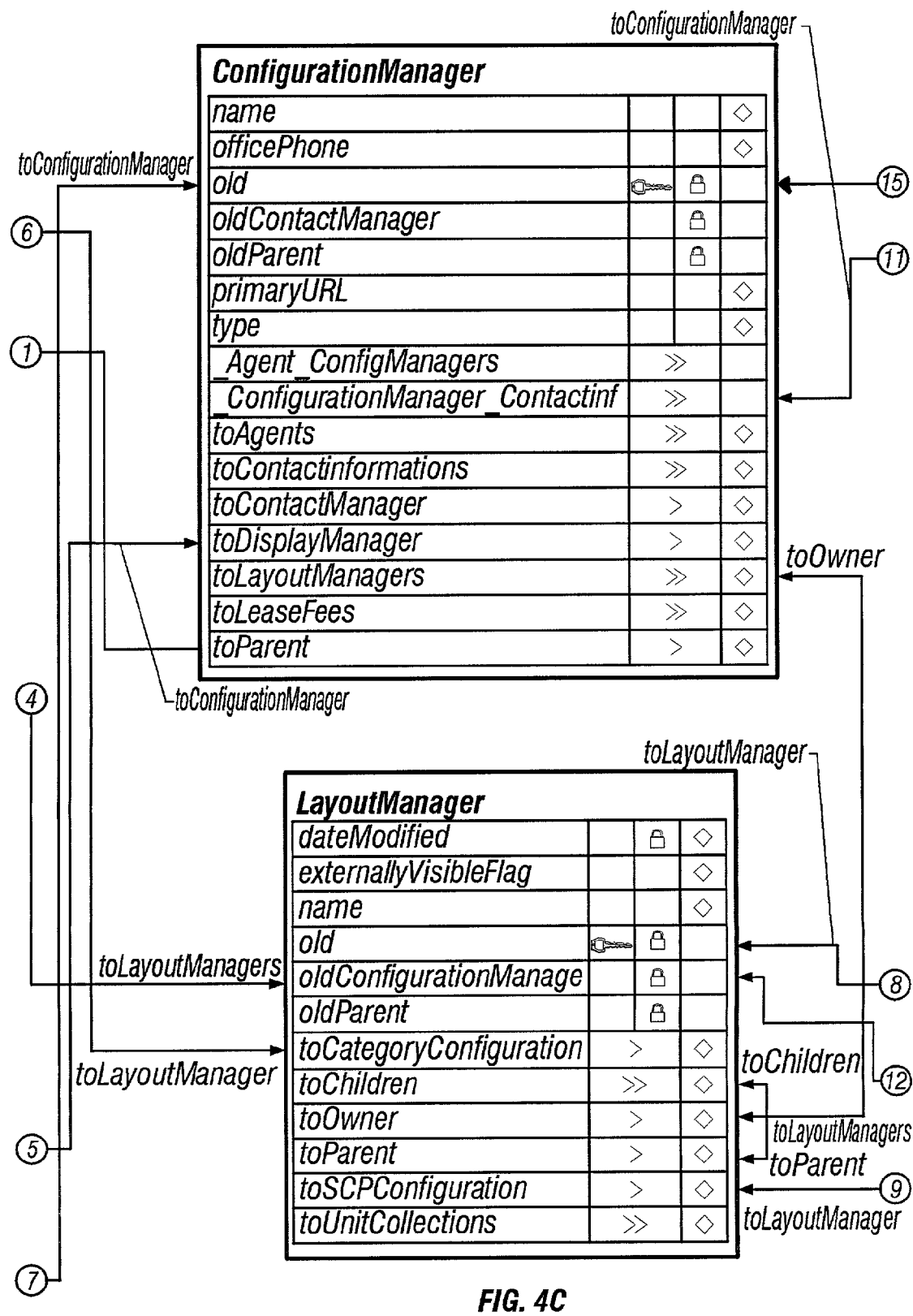
Figure 4D:
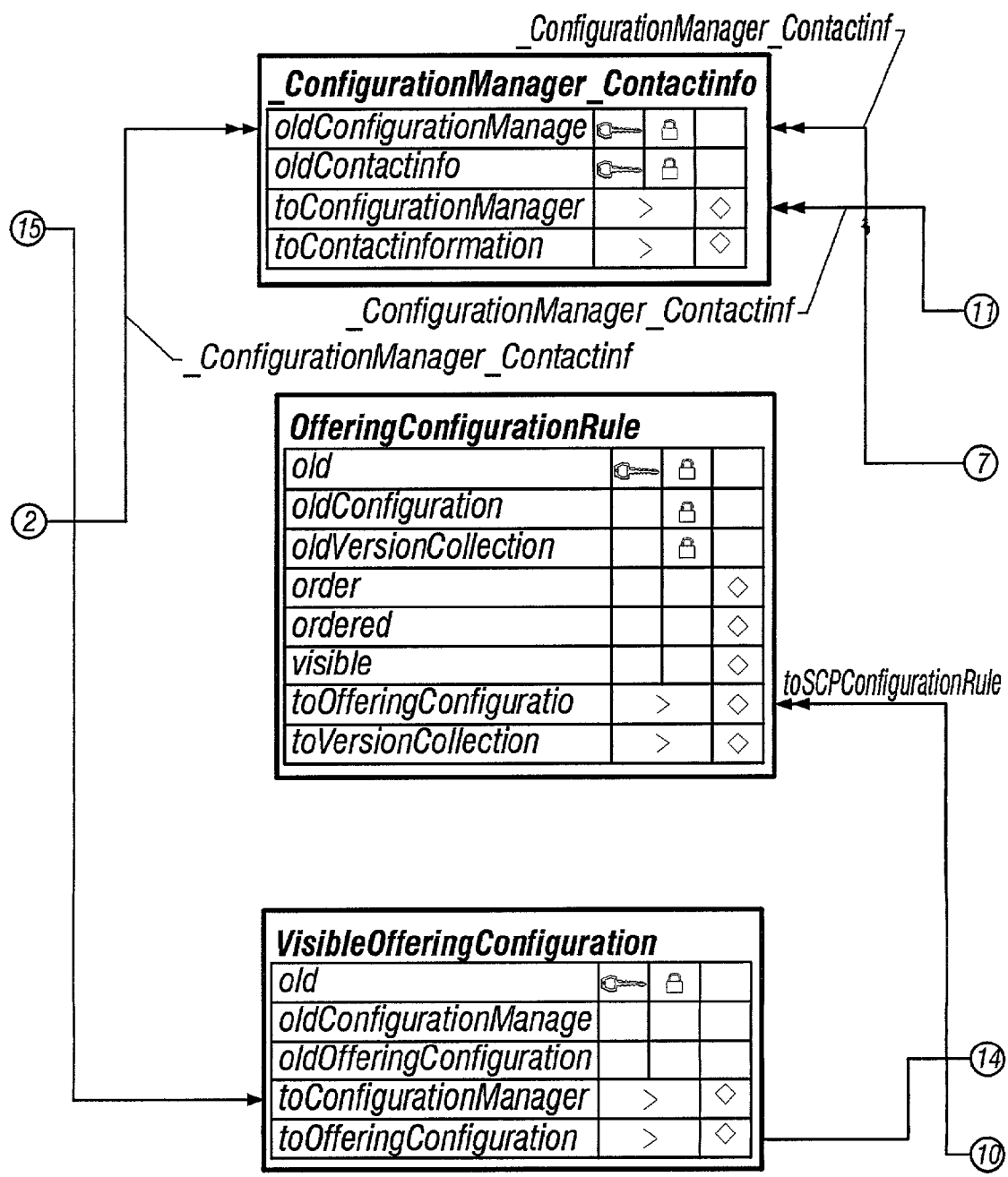
Figure 4E:
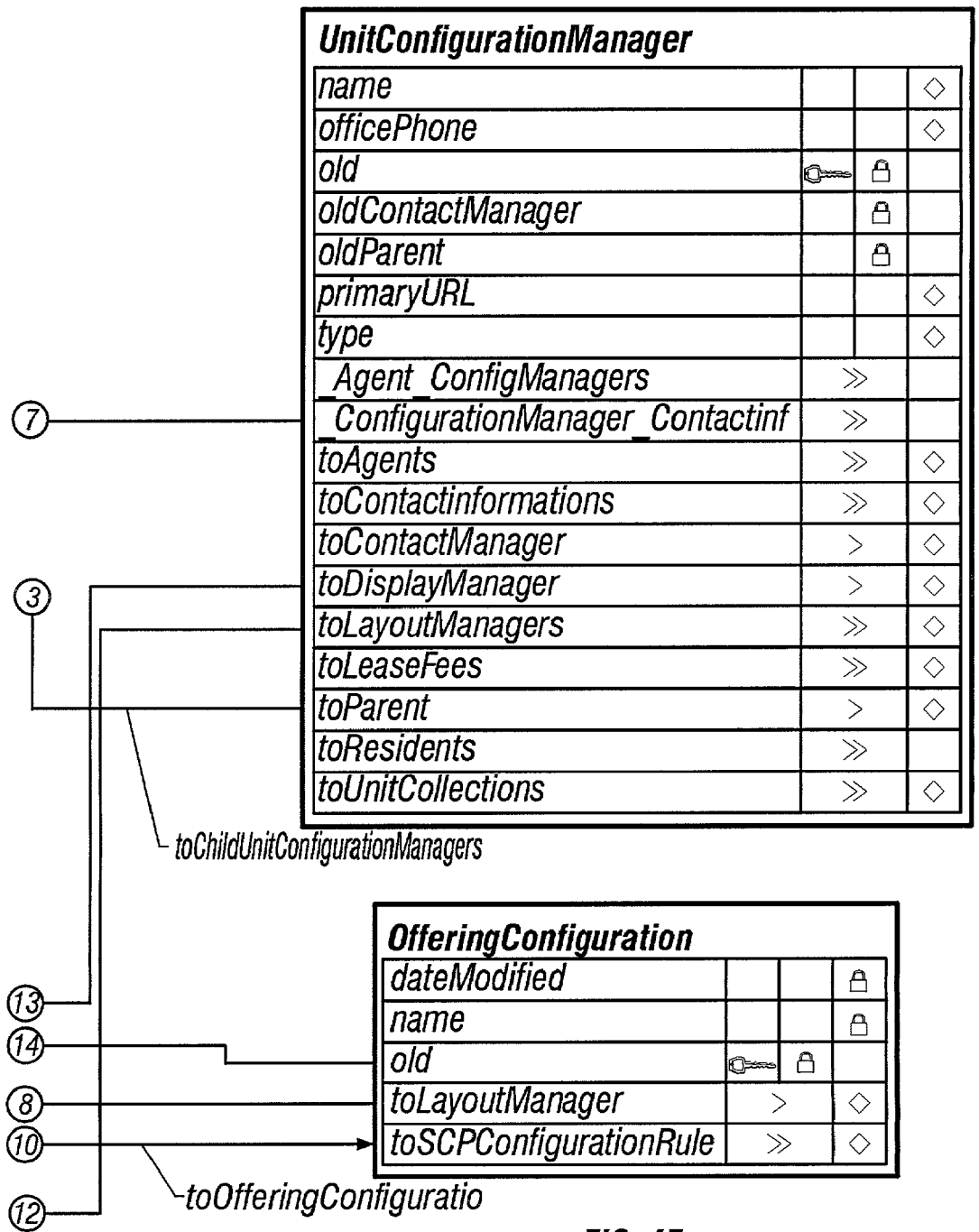
Figure 4F:
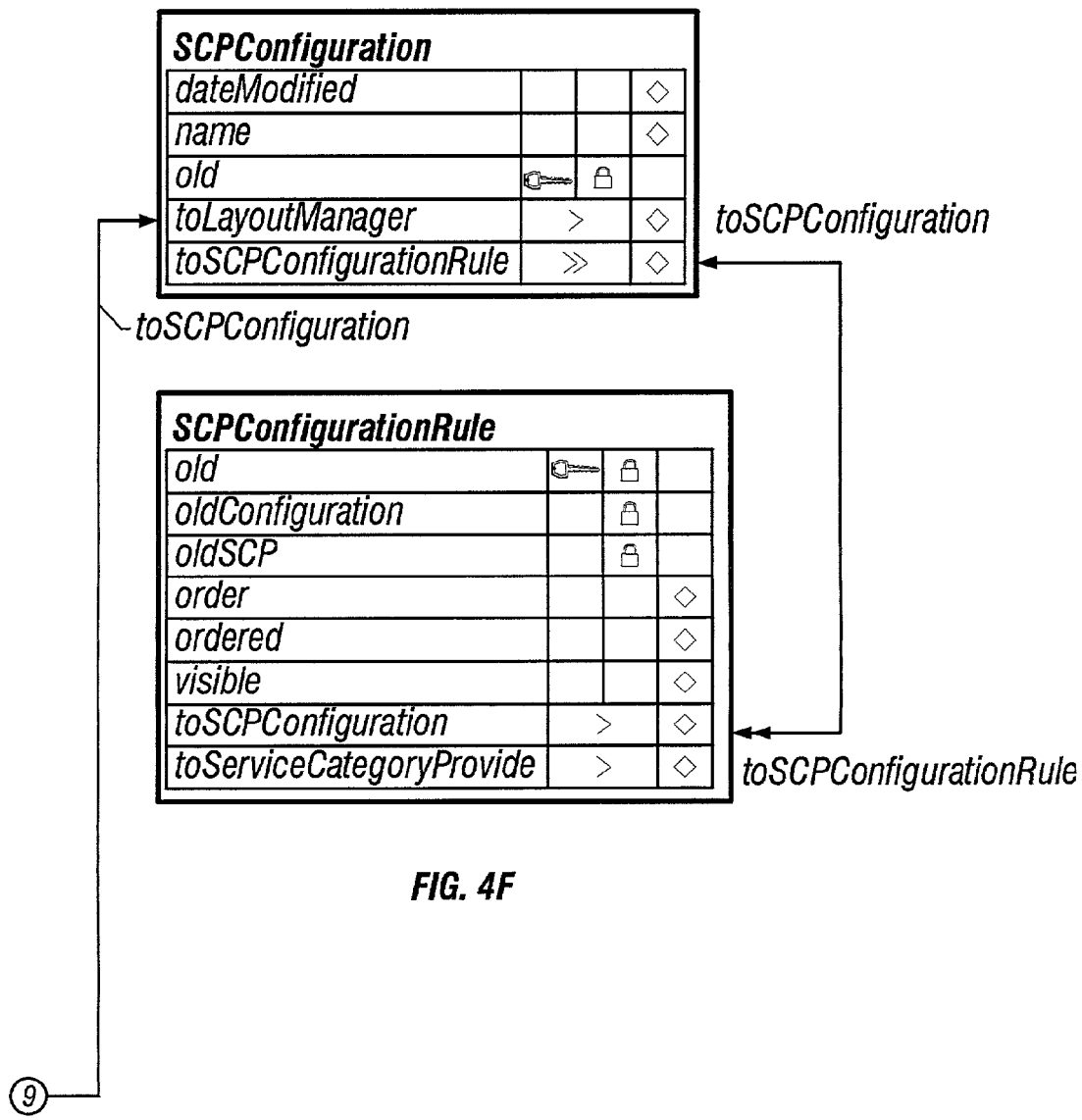

FIG. 7 shows various components of a preferred embodiment of customer interface 141. Each of these components may be in the form of one or more web pages that the customer can access via the Internet to carry out the desired function, generally by entering data and observing the results of their actions. Customers 110 may access login page 400, select and compare service offerings page(s) 410, order services page 420, order status check page 430, terminate services page 440, update profile page 450 or generate reports page 460 via customer interface 141.

Figure 8:
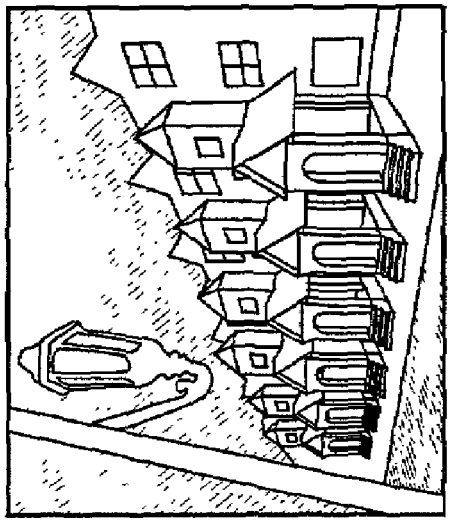
FIG. 8 illustrates the interface customers use to acquire access to the facilitation provider.

As described above, brand partners 120 access facilitation provider 140 to set up access accounts for the customers. The brand partners then provide the customers with account usernames and passwords. Referring now to FIG. 8, a screenshot for the login page 400 is shown. Customers 110 enter their assigned account usernames 510 and passwords 520 to gain access to their account information stored in facilitation provider 140.

Figure 9:
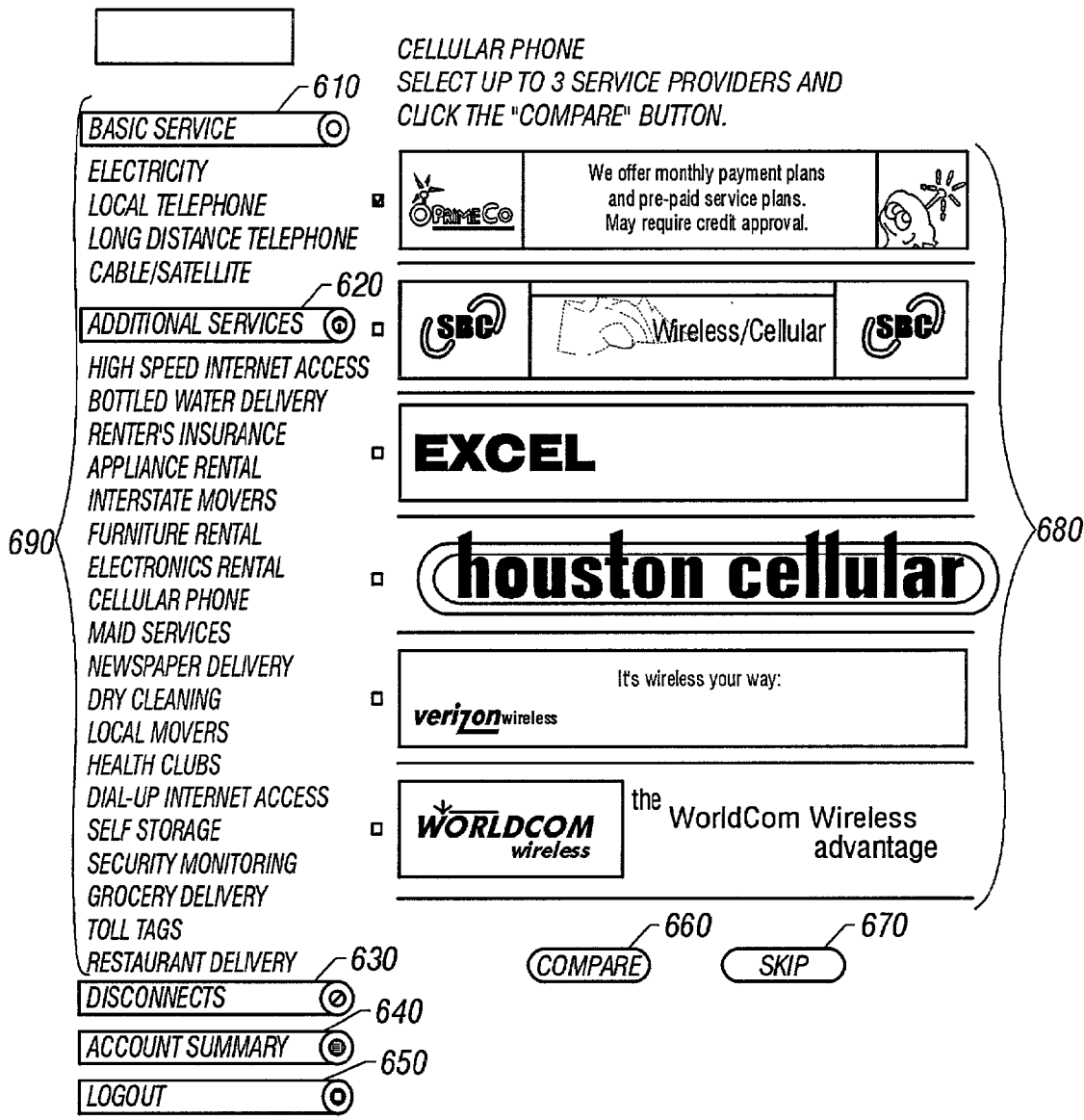
FIG. 9 illustrates the selection of services and service providers by customers.

Referring now to FIG. 9, customers begin the process of shopping for services 410 by selecting a desired service category 690. In the preferred embodiment, there may be two types of service categories 690: basic services 610 and additional services 620. Basic services 610 may include services such as electricity, local telephone, long-distance telephone and cable or satellite television. Additional services 620 include services such as high speed Internet access, bottled water delivery, renter's insurance, appliance rental, interstate movers, furniture rental, electronics rental, cellular phone, maid services, newspaper delivery, dry cleaning, local movers, health clubs, dial-up Internet access, self storage, security monitoring, grocery delivery, toll tags and restaurant delivery. Other basic services 610, additional services 620 and any other kind of service category may be easily added under the preferred embodiment.

The list of service categories 690 is determined by selections previously made by brand partner 120, as described above in relation to brand partner interface 143. Customer 110 selects a service category 690, either from basic services 610 or additional services 620, and based on that selection, the customer is provided with a list of service providers 680. The list of service providers is preferably determined by a real-time search which identifies the offerings available to the customer based on the market that the customer is a part of, and based on service provider selections previously made by the brand partner 120.

For illustrative purposes, FIG. 9 demonstrates the selection of the "Cellular Phone" service category from the additional services list 620 and the corresponding listing of six service providers 680: PrimeCo, SBC, Excel, Houston Cellular, VeriZon, and WorldCom. In the preferred embodiment, customer 110 may select up to 3 service providers 680 to compare. Once the service providers 680 to be compared are selected, the customer initiates the compare process by pressing the compare button 660. Comparisons of selected service providers 680 are done based on the plans provided in the service offerings of the service providers.

Referring now to FIGS. 9 and 10, if any one of the selected service providers 680 have more than one plan 710 in a service offering, then the customer 110 may be provided with the opportunity to select one or more of the plans 710 to be included in the comparison process. If none of the selected service providers 680 have more than one plan in their service offerings, then the screen in FIG. 10 is preferably not presented to customer 110. Once the foregoing selections have been made, customer 110 is provided with a comparison of plans offered by up to three service providers 680.

Referring now to FIGS. 1, 9 and 11, selected service providers 680 in the selected service category 620 and selected service plans 810 are preferably listed in a tabular fashion to facilitate comparison by customer 110. The tabular listing also preferably includes packages 820 and features 830 for comparison. All plans 810, packages 820 and features 830 include descriptions and prices. The tabular arrangement facilitates easy comparison by listing comparable line items horizontally along the same line. For example, the "LD/Min" charge (i.e., long-distance charge per minute of use) under the PrimeCo Calling Plan 812 is listed on the same line as the LD/Min charge under the PrimeCo NOW Plus Calling Plan 814. This makes it easy to quickly compare the two charges and to quickly and easily note that the former plan has an additional line item charge of 7 cents per minute for long distance while the latter plan does not charge for long distance (it is included in the overall price of the plan).

Figure 11B:
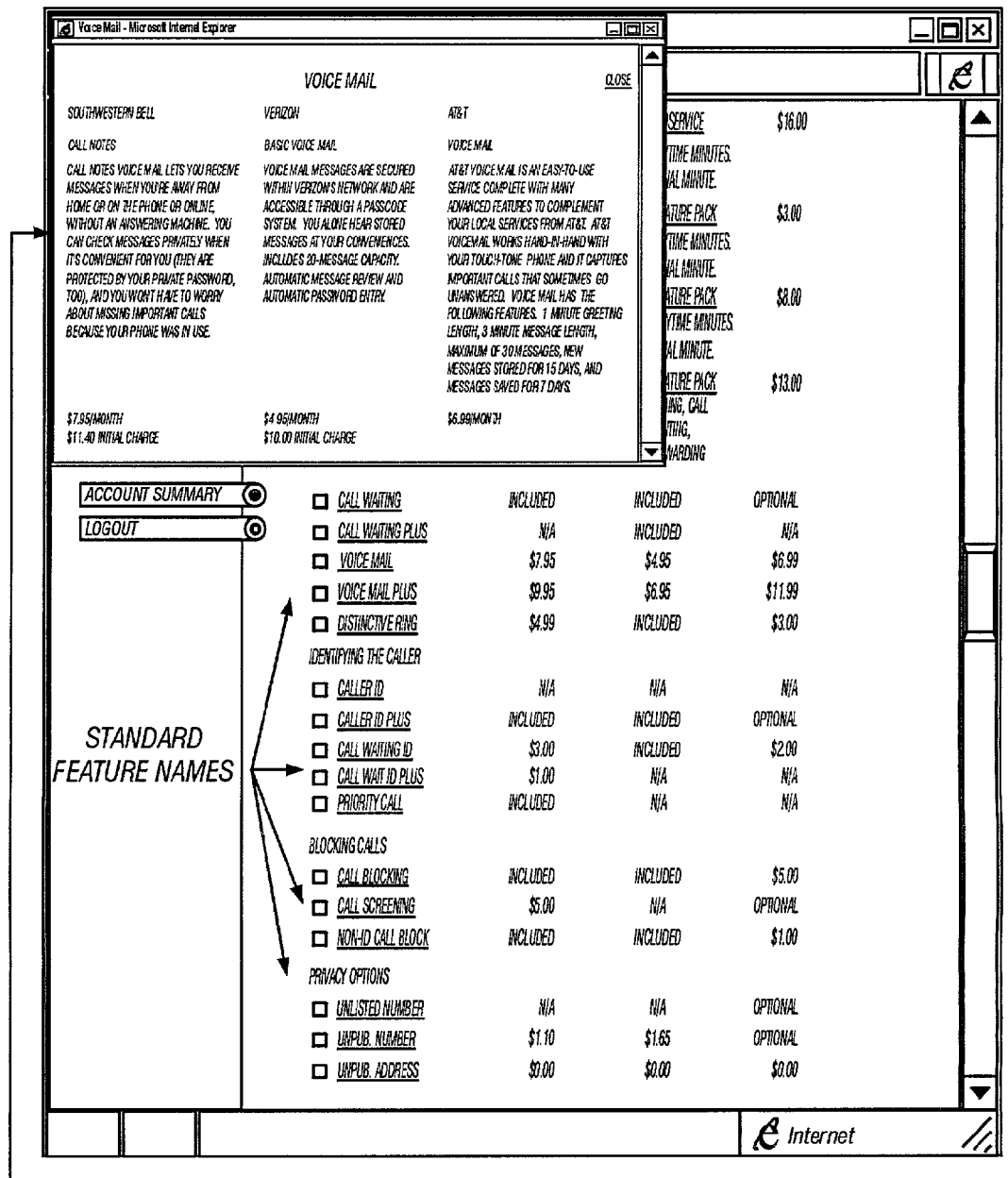
FIG. 11 illustrates the comparison and selection of plans, packages and features in service offerings by customers.

Still referring to FIG. 11(a), the line items under additional features 830 are standardized to facilitate comparison. Many service providers 680 have their own unique descriptions or trademarks for such additional features 830. To facilitate easy comparison, the preferred embodiment of the present invention converts the service providers' unique descriptions and trademarks for additional features 830 into standardized descriptions. This avoids confusion on the part of customer 110 by obviating the need for the customer to figure out, for example, what a particular cellular phone service provider calls its voice mail feature or its text messaging feature. Nevertheless, as shown in FIG. 11(b), the service providers' customized descriptions are preferably made available in a pop-up window when the customer clicks on the label for the standard feature.

Referring now to FIGS. 1, 7 and 11(a), the customer selects any packages 820 or additional features 830 that he or she desires by clicking on selection boxes. Once all selections have been made, charges may be calculated automatically by selecting calculate charges 840. Alternatively, a change in the selections may dynamically regenerate pricing additional plans, packages, and/or features, and dynamically regenerate the indications of which features are included or excluded from selected packages. Total charges are then compared and a decision is made by customer 110 whether to order services 420. This decision includes which plan and 110 which service provider will be selected to provide the particular service. This selection is made by selecting the order 850 button corresponding to the selected service provider.

To further assist customer 110 in his or her decision as to which service provider 680 will be selected, a map may be provided at the top of this page for certain service categories (e.g. dry cleaners, self storage). The map preferably shows the physical proximity or locations of each service provider 680 relative to the customer's home address. This additional information may be beneficial in selecting a service provider when the relative proximity of the provider is a substantial factor in the decision-making process. For example, while the relative physical proximity of an Internet access service provider may not be a very important factor, the proximity of a dry cleaning service provider or a health club will likely be an important factor in the decision making process.

Referring additionally to FIG. 12, after customer 110 selects a particular plan 810 from a service provider 680 using an order button 850, the customer is presented with a recap 910 of his or her order for verification and confirmation. If the recap 910 is incorrect in any manner or the customer changes his or her mind for any reason, the customer returns to the previous screen (FIG. 11(a)) to make appropriate changes. Following the recap 910, the customer is prompted to enter payment information 920 and any other information which the service provider requests during the setup of the service offering. Advantageously, required elements that the customer has entered elsewhere may be pre-populated as default values to eliminate redundant data entry. Further, entry fields are displayed for only those elements which the individual service provider has chosen to require for that offering. Thus the customer is not subjected to entering unnecessary data.

The information which the service provider has selected may include the custom data elements discussed above with respect to the process of setting up service offerings by service providers. Other information also includes, without limitation, customer contact information (telephone, facsimile, email address, other physical addresses, etc.), service start date, and appointment date and time. Once customer 110 verifies his or her order recap 910, provides all required payment information 920 and provides all other requested information, the customer selects the submit button icon 930 to continue processing the order. On the other hand, customer 1110 may elect to save his or her order information with facilitation provider 140 and return to it at a later time by selecting the save button 940. If customer 110 elects to submit his or her order, then the order is communicated by facilitation provider 140 (FIG. 1) to service provider 680 (FIG. 9). Customer 110 may return to customer interface 141 to check the status of orders 430 (FIG. 7) at any time. The processing of the order by the service provider and its response to the customer via the facilitation provider is discussed below.

With respect to date entry fields, the date data element may be defined by the service provider with certain restriction rules. For example, the service may define an appointment date element which requires the customer to enter a date, but restricts the date to a weekday. Thus, dates that fall on a weekend might trigger an error message to the customer, explaining that the date must be a weekday. So one restriction rule is to restrict the date values to certain days of the week. Another restriction rule is to prohibit date values that correspond to specific holidays, e.g. Thanksgiving (a predetermined weekday), and Christmas (a predetermined date). Yet another useful restriction rule is to require a minimum lead time. That is, the date value must be some minimum number of days into the future. Some services may wish to run a credit check before the customer's first appointment, and this may require at most three days. Such services could specify a three-day lead time to guarantee that the credit check is completed before the appointment. Similarly, the service provider may wish to specify a maximum lead time to avoid accumulating orders in the distant future. Such orders may have a higher default rate, for example. These various date restriction rules may preferably be selected independently and jointly.

Figure 32:
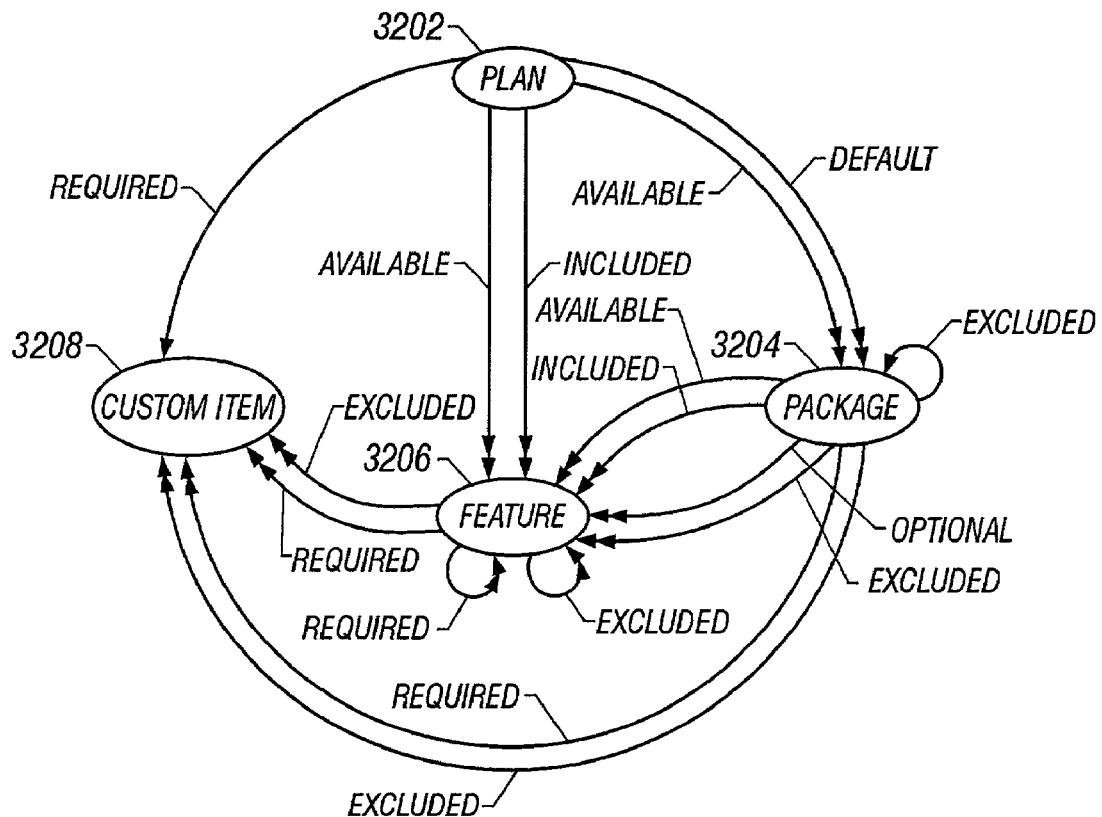
FIG. 32 is a diagrammatic illustration of a data structure used to represent offerings.

It is noted that the above-described ordering process is facilitated by the design of the customer interface 141. In particular, the process flow (i.e., the presentation of service categories, presentation of service providers, interactive comparison of offerings, and customized order information entry with population of default values for previously entered data field information) has been well received during concept testing. This interface design is made possible by a novel data structure contained in the facilitation provider software. This data structure is illustrated in FIG. 32 (described further below).

To further ease the burden on the customer 110, the facilitation provider 140 may detect order inter-dependencies and may offer to establish an order as a "dependent" order. This might occur where a phone number is required, and the customer's order for phone service has not yet been fulfilled. For example, the facilitation provider may generate a "list box" to an entry field for a required data element. A user clicking on an arrow adjacent to the entry field is presented with a list of values which may be selected for automatic entry in the field. The facilitation provider may automatically detect existing orders that could produce the required data element, and present a dependence indicator (such as "to be provided by SW Bell") for each such order as a value in the list. Alternatively, if a required data element for an order is left blank, the customer interface 141 may check to see if an order has been placed that would provide the required data element. If such a dependency is detected, the interface offers to submit the order as a dependent order, that is, an order which will automatically be submitted by the facilitation provider 140 when the outstanding order(s) have been fulfilled by the respective service provider(s). This behavior may preferably be allowed or disallowed by the service providers for individual entries in the order form.

Figure 30:
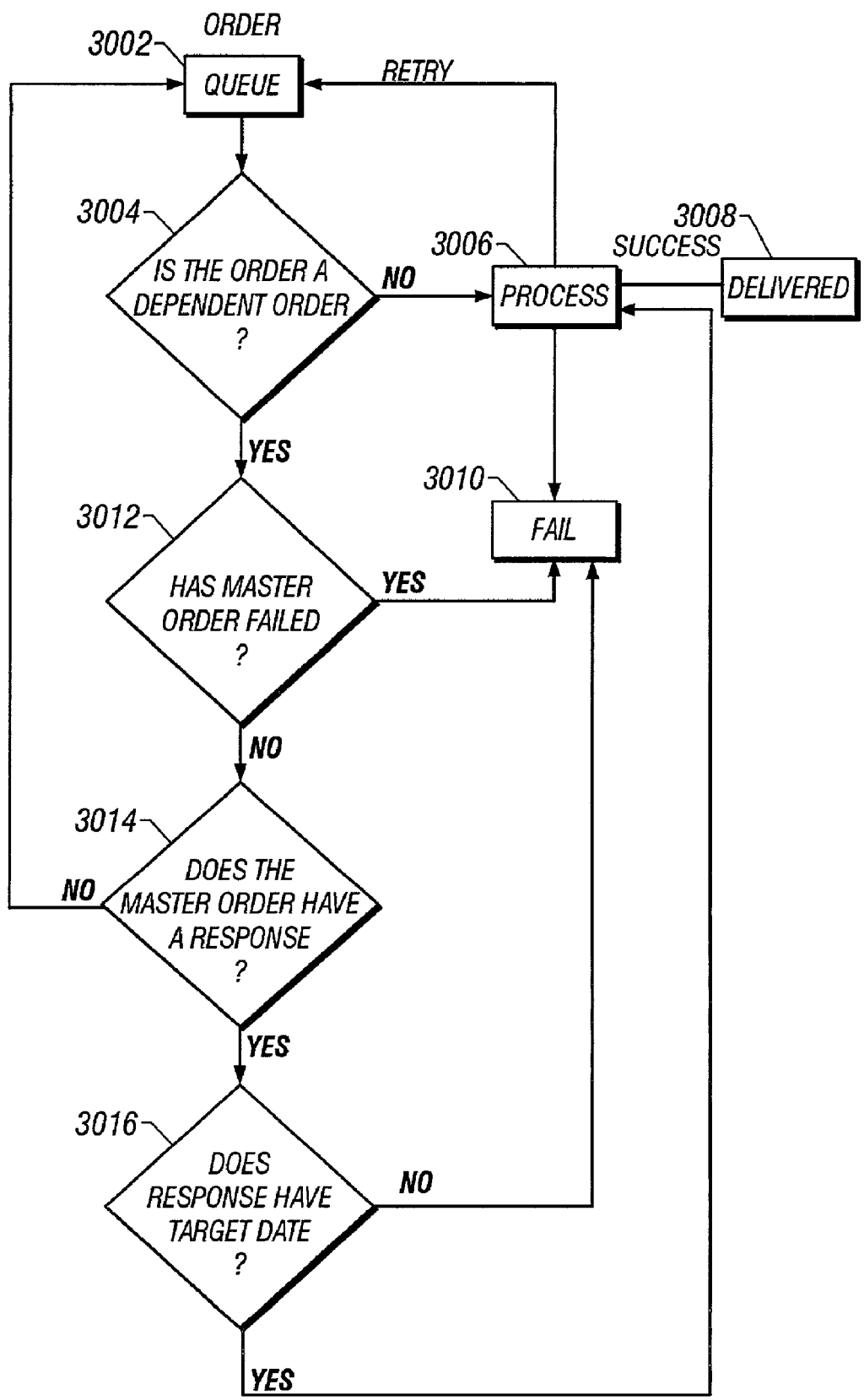
FIG. 30 is a flowchart of the order handling aspect of a preferred embodiment.

FIG. 30 shows the processing of such orders. In block 3002, the customer interface 141 places an order into a delivery queue (in database 142). In block 3004, a check is done to see if the order is a dependent Order. An order is dependent if it relies on data ("Target Data") obtained from the acceptance of another order ("Master Order"). In block 3006, those orders which are not dependent orders are processed, i.e. placed in form for delivery, and notification sent to the service provider. If the service provider acknowledges receipt of the order, then in block 308 the status of the order is marked as "Delivered". If the service provider fails to acknowledge receipt of the order within a predetermined time period, then in block 3010 the status of the order is marked "Fail".

Returning to block 3004, if the order is a dependent order, then in block 3012, a check is made to determine if the Master Order has failed. If so, then in block 3010, the status of the dependent order is marked "Fail". Otherwise, in block 3014, a check is made to see if the service provider has sent a response to the Master order. If not, the dependent order is returned to the queue 3002 for repeated consideration later (preferably a 30 minute delay). If so, then in block 3016, a check is made to determine if the response includes the Target Data. If not, then in block 3010, the dependent order is marked "Fail". If the response includes Target Data, then in block 3006 the Target Data is extracted from the response, and the dependent order is processed.

Referring now to FIGS. 1, 7, 9 and 13, customer 110 may terminate services 440 from service providers 130 by accessing a disconnect facility in interface 141. Customer 110 selects Disconnects 630 which presents the disconnect facility shown in FIG. 13. All service accounts which have been initiated by customer 110 at facilitation provider 140 are listed under Disconnects from accounts 1010 initiated at facilitation provider. Customer 110 selects the desired account to disconnect and provides certain disconnect related information to facilitation provider 140 as requested by service provider 680. The disconnect information is then communicated by the facilitation provider to the service provider for processing.

Customer 110 may also disconnect service accounts 440 that are not initiated 1020 at facilitation provider 140. Based on information about the customer's previous addresses, facilitation provider 140 presents a list of previous residence addresses 1025 of customer 110. Customer elects the particular residence address 1025 at which the account to be disconnected was originally initiated. The customer 110 may then select a service category. Based on these selections, customer 110 is presented with a list of service providers 130 in that service category for the selected address 1025. Customer 110 elects the particular service provider 130 with whom the service account was initiated. The customer is then presented with a list of questions, as previously provided by the particular service provider 130 to facilitation provider 140, relating to the service termination request. Customer completes the questionnaire and the service disconnection data is sent to the service provider 130 by facilitation provider 140. The status of any disconnect requests by customer 110 may be displayed under current disconnects 1030. Alternatively, they may be displayed in the customer account summary along with the status of other customer orders.

Customers 110 maintain information relating to their profile 450 on facilitation provider 140. In the preferred embodiment, customers view and update their profile 450 by selecting the "my profile" 695 which preferably presents customers with six categories of profile information. Referring now to FIG. 14, customer 110 may preferably view and update the following six categories of information: general information 1110 (FIG. 15 presents an example of one such update screen), billing addresses 1120, personal information 1130, identification information 1140, financial institution account information 1150, and credit card information 1160. All of the foregoing information is preferably maintained by customer 110, except customer's name and address information 1115 which preferably can only be updated by brand partner 120.

As shown in FIG. 15, the general information update screen preferably allows a customer to enter information such as prior address(es), contact information, and account preferences (e.g. email notification of changes in order status, etc.). The personal information may include such things as social security number, birth date, mother's maiden name, etc. The identification information may include such things as drivers license numbers, passport information, etc. The financial institution account information may include such things as checking account names and numbers.

Referring to FIGS. 1 and 7, the present invention contemplates that customer 110 has the ability to produce various reports 460 relating to all of the transactions and activities covering the use of the systems and methods covered by this invention. Referring additionally to FIGS. 16 and 17, in the preferred embodiment of the present invention, the account summary report 640 lists all of the service orders and disconnect orders initiated by customer 110. This account summary advantageously provides a single integrated display where customers can monitor the status of their orders from multiple service providers in multiple service categories. As one ordinary skill in the art will appreciate, other reports may be generated to provide a hard copy of any transaction or activity.

As discussed above, customers 110 shop and compare services offered by service providers 130 via facilitation provider 140. Once customer 100 decides to place an order with a service provider 130, facilitation provider 140 may provide an electronic notification of the order to the service provider, or may simply queue the order for periodic retrieval by the service provider. Service provider 130 processes the order and may send an electronic response back to facilitation provider 140. Customer 110 may later access facilitation provider 140 to review any such response from the service provider. Service provider 130 may also contact customer 110 directly via traditional mechanisms, such as in person, by telephone, or by mail, in response to a service order.

Figure 18:
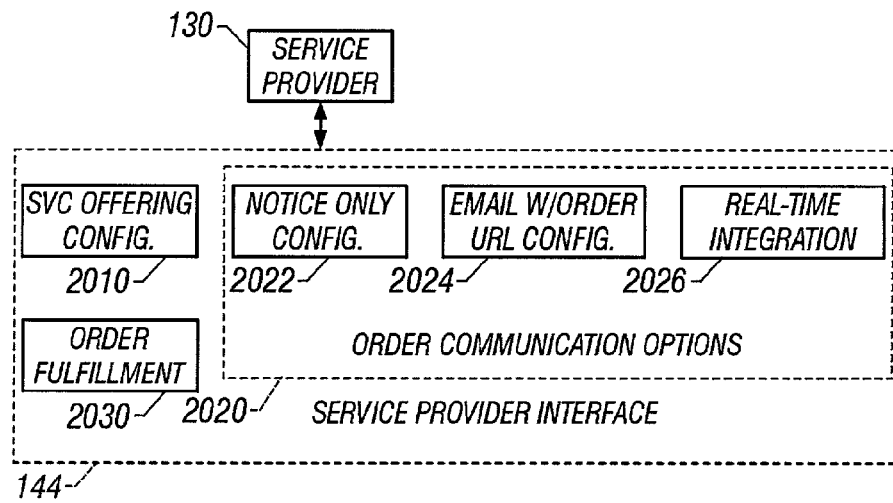
FIG. 18 is a block diagram illustrating the various activities of service providers with respect to the facilitation provider.

Referring now to FIGS. 1 and 18, service providers 130 access facilitation provider 140 to set up and register service offerings 2010. Offerings are herein defined in terms of plans, packages, features, and rules. A plan is a base set of products or services offered by a provider, e.g. "Basic Local Phone" or "Digital Cable". A package is a collection of additional features that may be purchased as a single unit, e.g. a "movie package" having several premium cable channels. A feature is an individual item that can be ordered in addition to a plan and/or package, e.g. individual premium channels, or "call waiting". A rule is a restriction on the combination of plans, packages, and features that may be selected by a customer, e.g. two packages may be mutually exclusive, or a feature may only be available if a given package is selected. As the service provider specifies the plans, packages, features, and rules of an offering, the service provider also specifies prices associated with each offering component (plans, packages, features), and may further specify pricing rules that vary the associated prices based on what other components have been selected.

The plan and package restriction rules are preferably limited to two types: exclusion, and available. In the description of each plan (package), the service provider is able to specify for each of the other plans and packages whether they are unavailable (i.e., excluded) if the subject plan (package) is selected, or whether they are available (i.e. so that both could be chosen if the customer desires). The feature restriction rules may be of the above types, but preferably may alternatively be of two other types: included, and optionally included. When describing a plan or package, the service provider may indicate that a feature is excluded, available, included (i.e. required), or optionally included. Here, optionally included is defined to mean that a predetermined number of features are included, and the customer can select those features from a list of the optionally included features. Generally, the predetermined number is less than the number of optionally included features, so the customer can pick and choose.

Referring momentarily to FIGS. 10 and 11(*a*), the service or product (generally: "offering") from the service provider is shown represented in terms of plans, packages, and features. FIG. 32 represents the internal structure of a preferred offering representation. Within an offering, service providers can define plans 3202, packages 3204, features 3206, custom items 3208, and the relationships between them. Each of these may be represented by corresponding data records in a relational database.

Each plan 3202 can specify a list of included features and a list of features that are optionally available. A plan 3202 can further specify a list of available packages, packages selected by default, and required custom items.

Each package 3204 can specify lists of available, included, optional, and excluded features. Optional features are used to define packages in which the customer is asked to choose some number of features from a defined set. Packages 3204 can additionally specify additional custom items that are required, and custom items that are not required. Each package 3204 can also specify other packages that are excluded; i.e., the customer will not be able to order two packages if one excludes the other.

Each feature 3206 can specify a list of other features that are required and excluded. As with packages, a customer cannot select two features if one excludes the other. If one feature requires another, the customer is prevented from ordering that feature unless he also orders the required feature. Features 3208 can also specify custom items that are to be additionally included or excluded.

Figure 33:
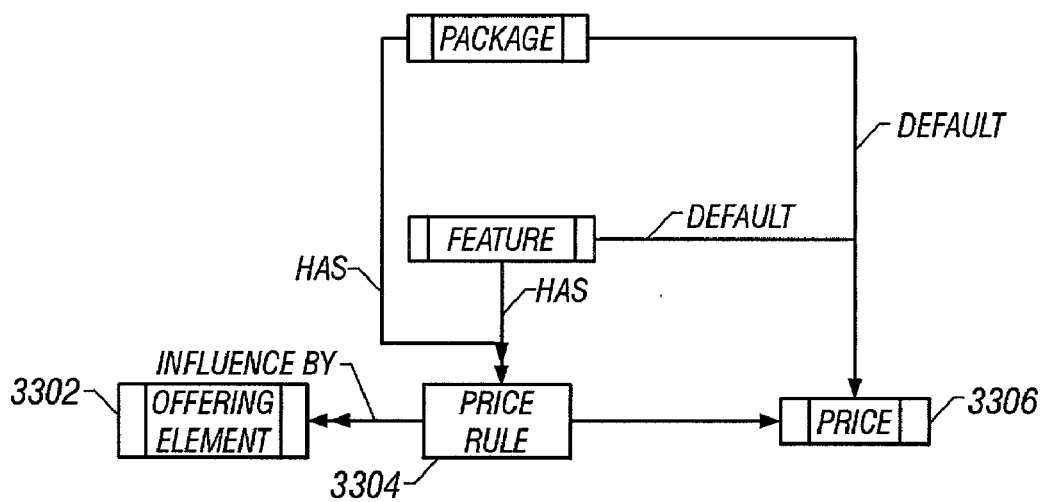
FIG. 33 further illustrates aspects of the preferred data structure.
Figure 35A:
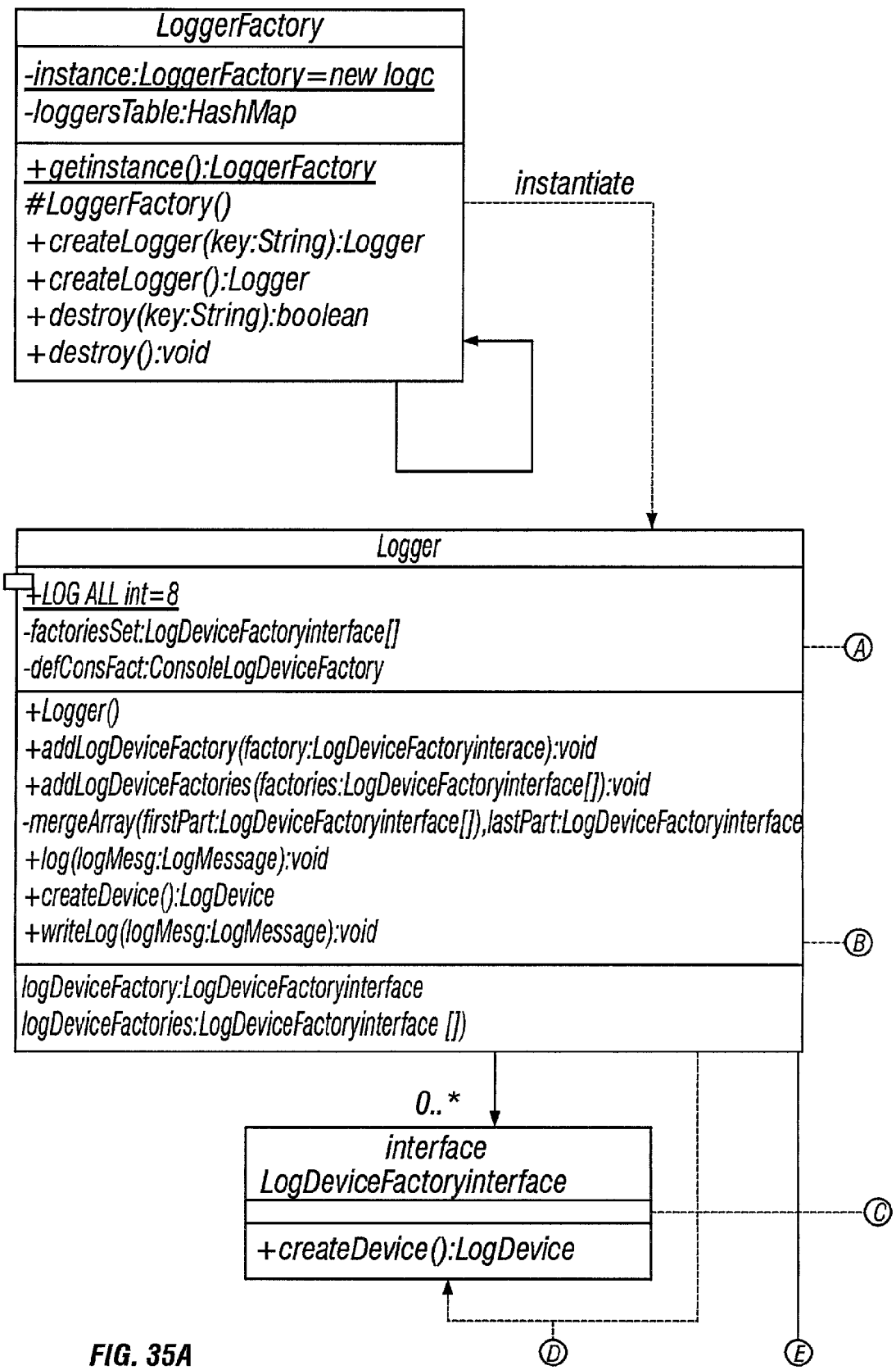
FIG. 35 shows a class diagram of the communicator's logging component.
Figure 35B:
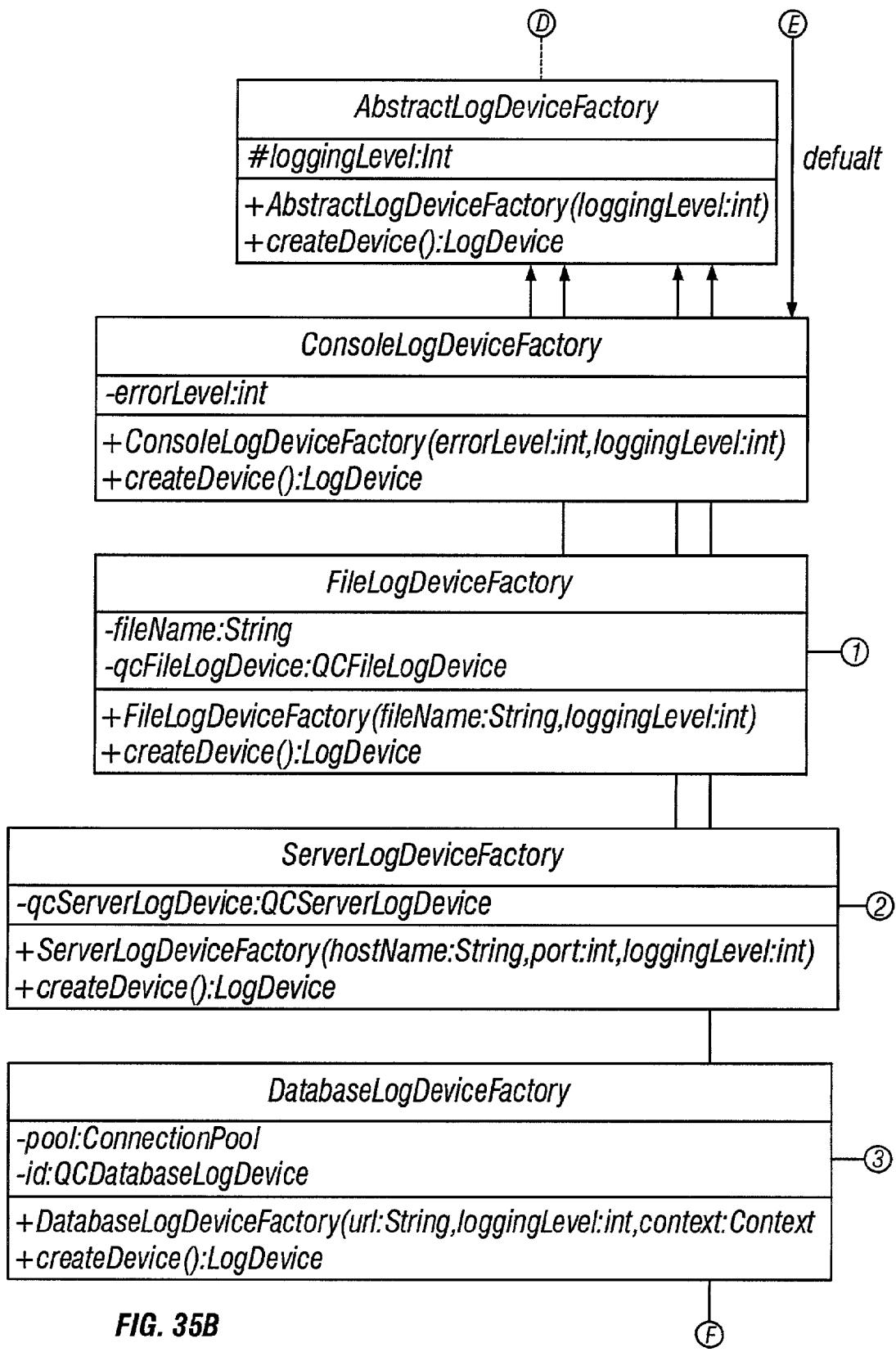
Figure 35C:
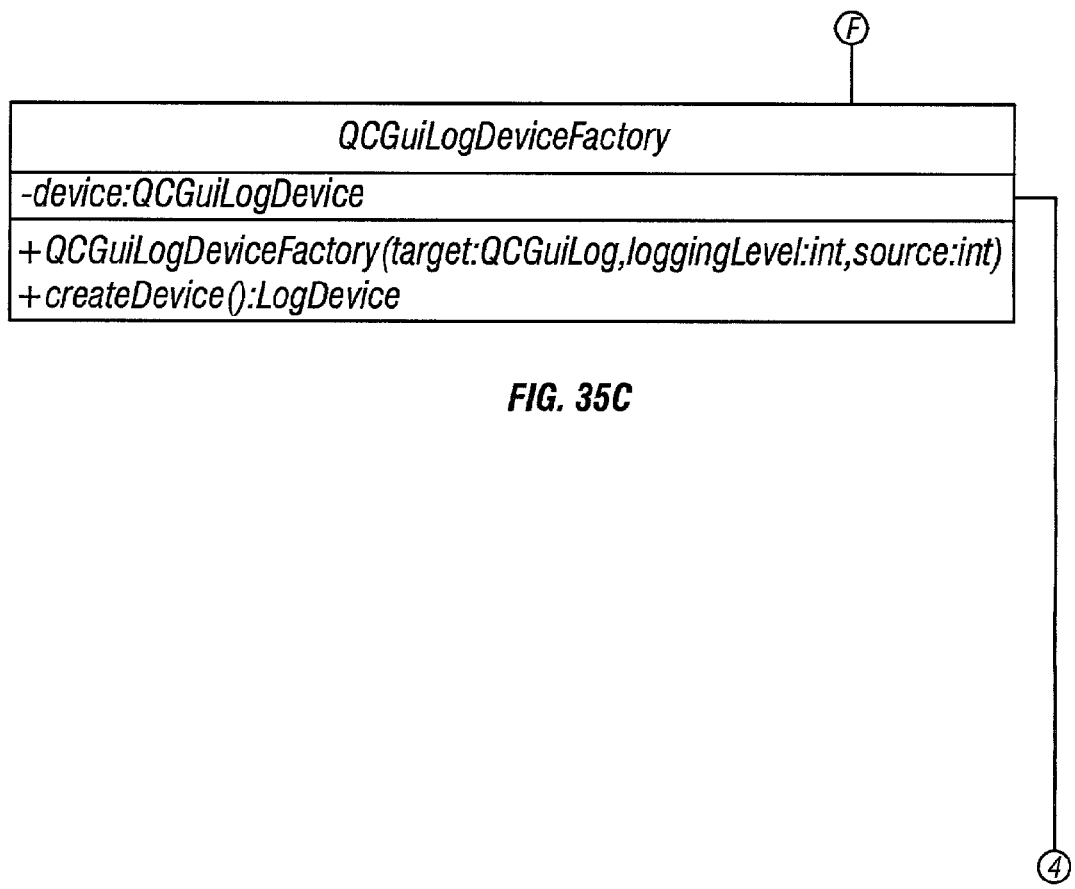
Figure 35D:
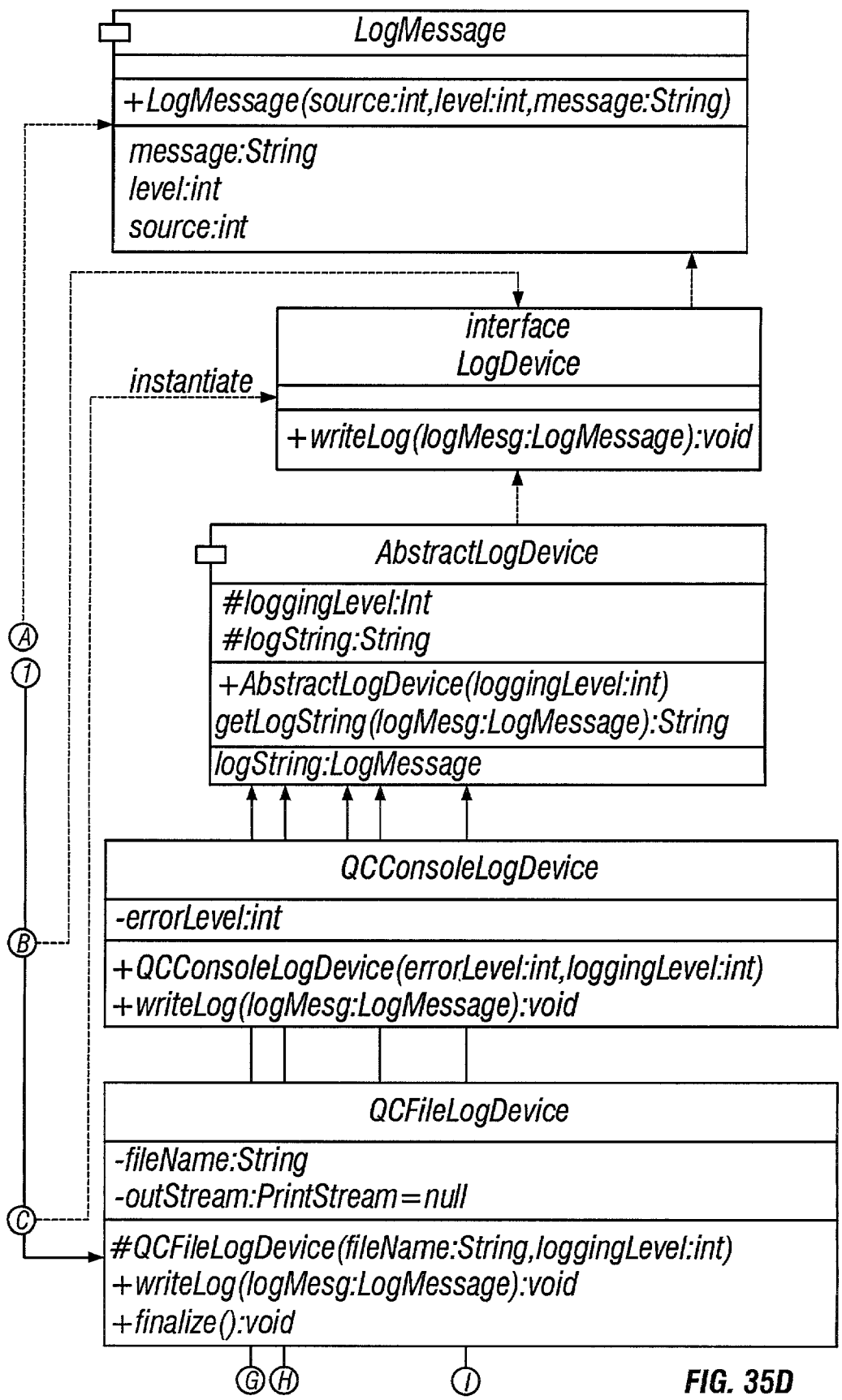
Figure 35E:
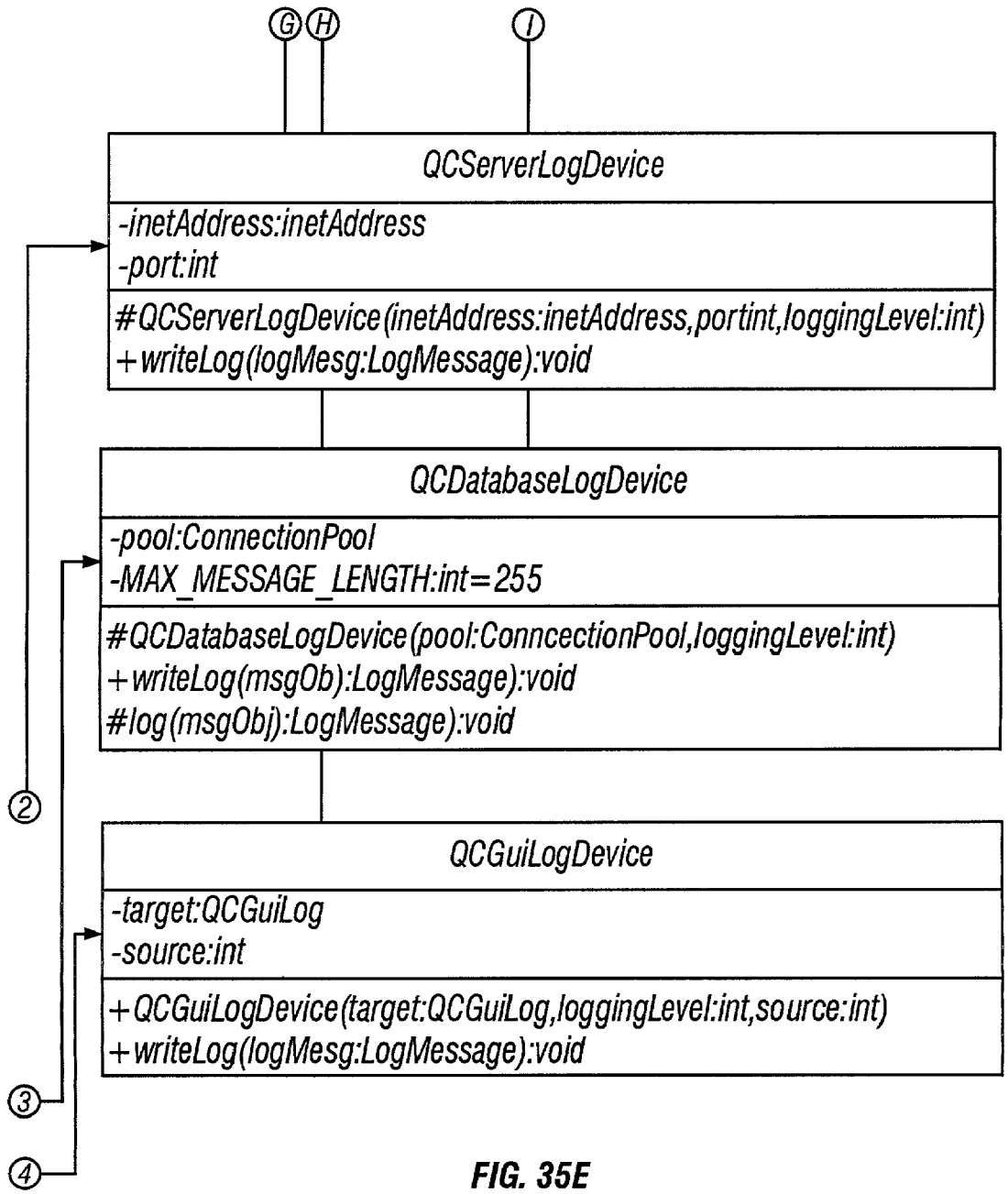

Offerings also include Price Rules 3304 (FIG. 33). When a customer places an order, the price 3306 of each package and feature is determined by examining the selected offering elements 3302 (i.e., the combination of Plan, Package(s) and Feature(s) selected). A Price Rule 3304 establishes a Price 3306 to be used for the specified combination of Offering Elements 3302 that exists in the order. The set of Price Rules 3304 for a Package or Feature is preferably ordered so that if multiple Price Rules apply to an order for that Package or Feature, the 'first' applicable one is used. If there is no Price Rule applicable to an order, the Feature or Package 'default' Price is used.

Attached Appendix "A" shows an example of the offering data structure in XML format and Appendix "B" provides an example of this data structure with populated data values.

In the preferred embodiment of the present invention, each offering is associated with a market. The definition of the market in which a service provider makes its offerings available is a broad and flexible one. A market may be defined in terms of states, counties, zip codes, and individual properties. FIG. 19(*a*) shows an illustrative screen which might be provided by the configuration portion 2010 of interface 144. A text entry field 1902 is provided for naming the market being defined. Another entry field 1904 is provided for selecting one of several possible statuses, such as "Open" to indicate that the market definition may be associated with an offering, or "Closed" to indicate that the market definition is not yet available for other purposes.

Selecting one of the links 1906, 1908, 1910, 1912 allows the user to add states, counties, zip codes, and properties, respectively, to the coverage of the market. Selecting the state link 1906 allows the user to select from a list of states. Selecting county link 1908 allows the user to enter a list of counties. Selecting the zip code link 1910 allows the user to enter a list of zip codes. Selecting the property link 1912 takes the user to a search page such as the one shown in FIG. 19(b), where the user can enter search criteria in entry fields 1920 and generate 1922 a list of properties with corresponding selection boxes 1924. The user can actuate the selection boxes next to the desired properties and click Save button 1930 to return to the previous screen (FIG. 19(a)). Similar Save buttons may exist within the state, county and zip code selection screens.

For convenience, entry fields 1914 and 1916 may be provided for direct entry of zip code ranges. Finally, a Save button 1918 is provided to complete the market definition. Note that a market may include selections from the state selection page, the county selection page, the zip code selection page, and the property selection page. These selections are additive, i.e. the market may include Texas, various neighboring counties in Oklahoma and Louisiana, and selected properties in Albuquerque.

Note too that the more specific selections preferably dominate over the more general selections. If, in the above example, a second market is defined for New Mexico, a resident of one of the selected properties in Albuquerque would be in two conflicting markets. Because his property is specifically identified as part of the Texas market, the resident would be presented with the provider offerings in the Texas market. The markets are preferably exclusive, and hence, no two markets can have the same entry in a given column.

In alternative embodiments, the number and type of the location size items can vary. Although the current discussion assumes that the location size options are states, counties, zip codes, and properties, other location size options may be preferred. Thus, e.g., markets could be specified with reference to one or more of; stellar system, planetary system, astronomical body, hemisphere, continent, country, region, state, county, city, zip code, property, floor, unit, etc.

Figure 31:
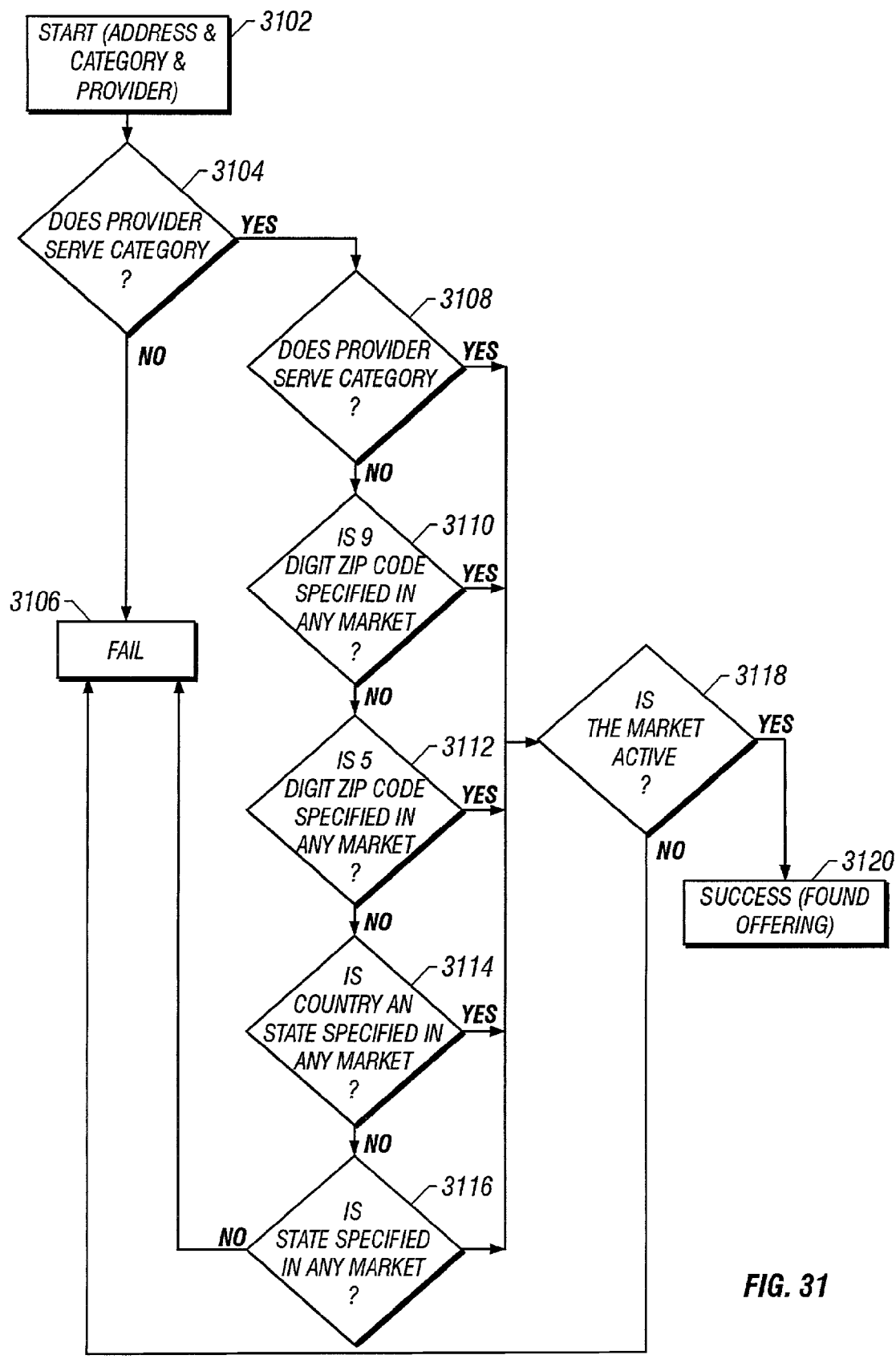
FIG. 31 is a flowchart of the service provider market determination aspect of a preferred embodiment.

The market definition information discussed above is stored in an Oracle relational database. When a customer selects a service category, facilitation provider 140 determines which service providers serve the market for that the customer. FIG. 31 shows a flowchart of one such determination process, given an address and a service category.

The process is a search over all providers contained in the facilitation provider's database. Each provider defines one or more markets, each of which contains one or more specific properties, zip codes, counties, and states. When attempting to match a provider to an address, the provider's markets are checked in the order of most specific to least specific.

An iteration of the loop begins in block 3102 and terminates in either block 3106 (provider does not serve address) or block 3120 (provider does serve address). In block 3104, a check is made to determine if the service provider has an offering in the selected service category. If not, iteration terminates in block 3106. The facilitation provider's software then performs the next iteration of the loop with another service provider.

If the service provider has an offering in the service category, then in block 3108, each of the provider's markets is checked to see if one of them contains the exact property at the given address. If so, that market will be the one used for the determining the offering details of this service provider, and in block 3118, a check is made to verify that the market is active. If so, the iteration terminates successfully at block 3120. If not, then the iteration terminates unsuccessfully at block 3106. In either case, the next iteration is performed for the next service provider.

Returning to block 3108, if the property is not found, then in block 3110, each market is checked to see if it contains the 9-digit zip code of the service location. If so, the matching market is used in block 3118. If not, the search continues by 5-digit zip code (block 3112), then county (block 3114), and state (block 3116), providing a matching market to block 3118 as soon as one is found. If no matching market is found in block 3116, then the iteration terminates unsuccessfully in block 3106. After the completion of all loop iterations, the list of service providers compiled in block 3120 (those having a matching market) is then presented to the customer.

Each service provider is preferably limited to one active offering per market. The service provider may have authored various offerings for each market, but these offerings preferably have a status value associated with them. Of the offerings, only one is allowed to have an "Active" status. Other status values may be "Draft", "To Be Active", and "Archived". To avoid having any downtime caused by mistakes, the service provider interface attempts to maintain an Active offering once one has been established. The service provider wishing to replace the Active offering may simply designate one of his Draft offerings as "To Be Active". At the next available opportunity (or alternatively, at a time specified by the service provider), the facilitation provider will simultaneously designate the Active offering as Archived, and the To Be Active as Active. Of course, the service provider can also specifically Archive an Active offering, but this would only be done when the service provider wishes to discontinue any offering in that market for at least some time period.

In an alternative embodiment, a two-database approach is used. The service provider's changes are made to a "staging" database, whereas the customer's interactions are with a separate "production" database. At periodic intervals, the service provider's changes are migrated (copied) to the production database.

In yet another alternative embodiment, each offering has associated with it one or more date ranges specifying when the offering is active. Each day, the facilitation provider's system determines which offering is active for each market by examining the date ranges. If the current date is within the data ranges for more than one offering, the offering with the most recent start date is designated as the active offering.

Each offering must have at least one service plan. It is not unusual for an offering to have multiple plans. However, there may be zero or one or more packages and features in each offering.

Figure 20A:
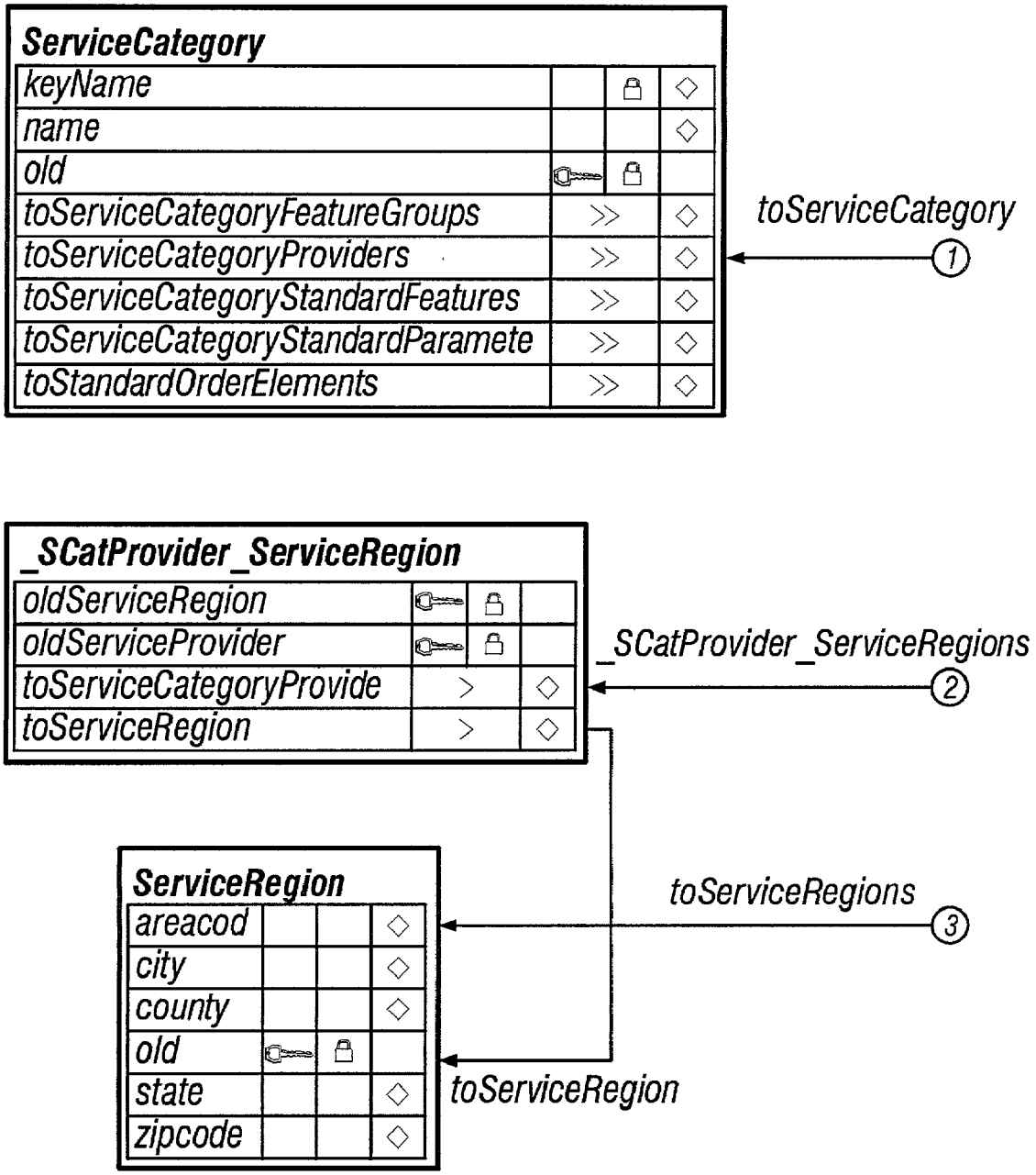
FIG. 20 illustrates the data elements and their relationships in a data type definition format as used in the preferred embodiment relating to customers.
Figure 20B:
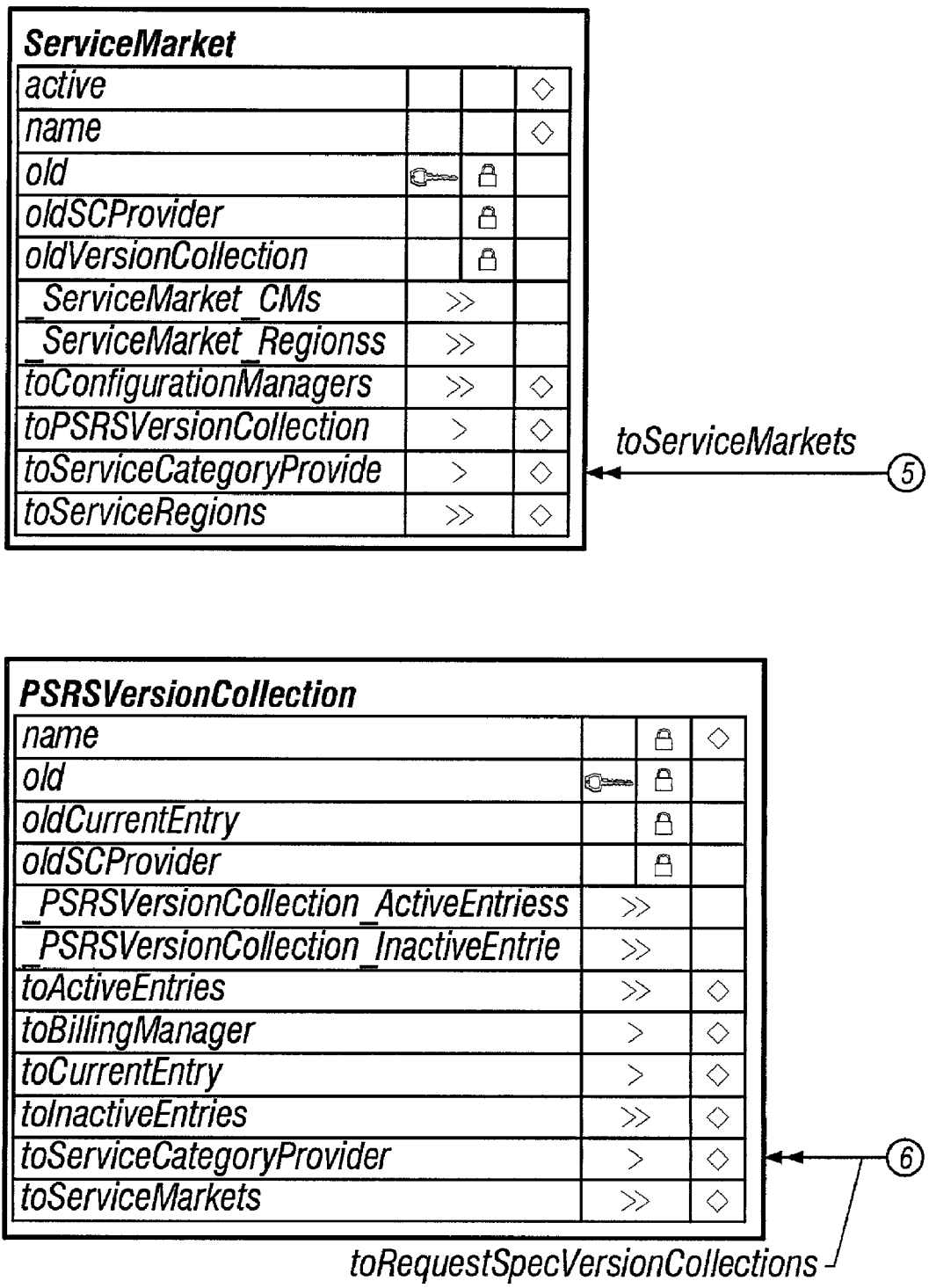
Figure 20C:
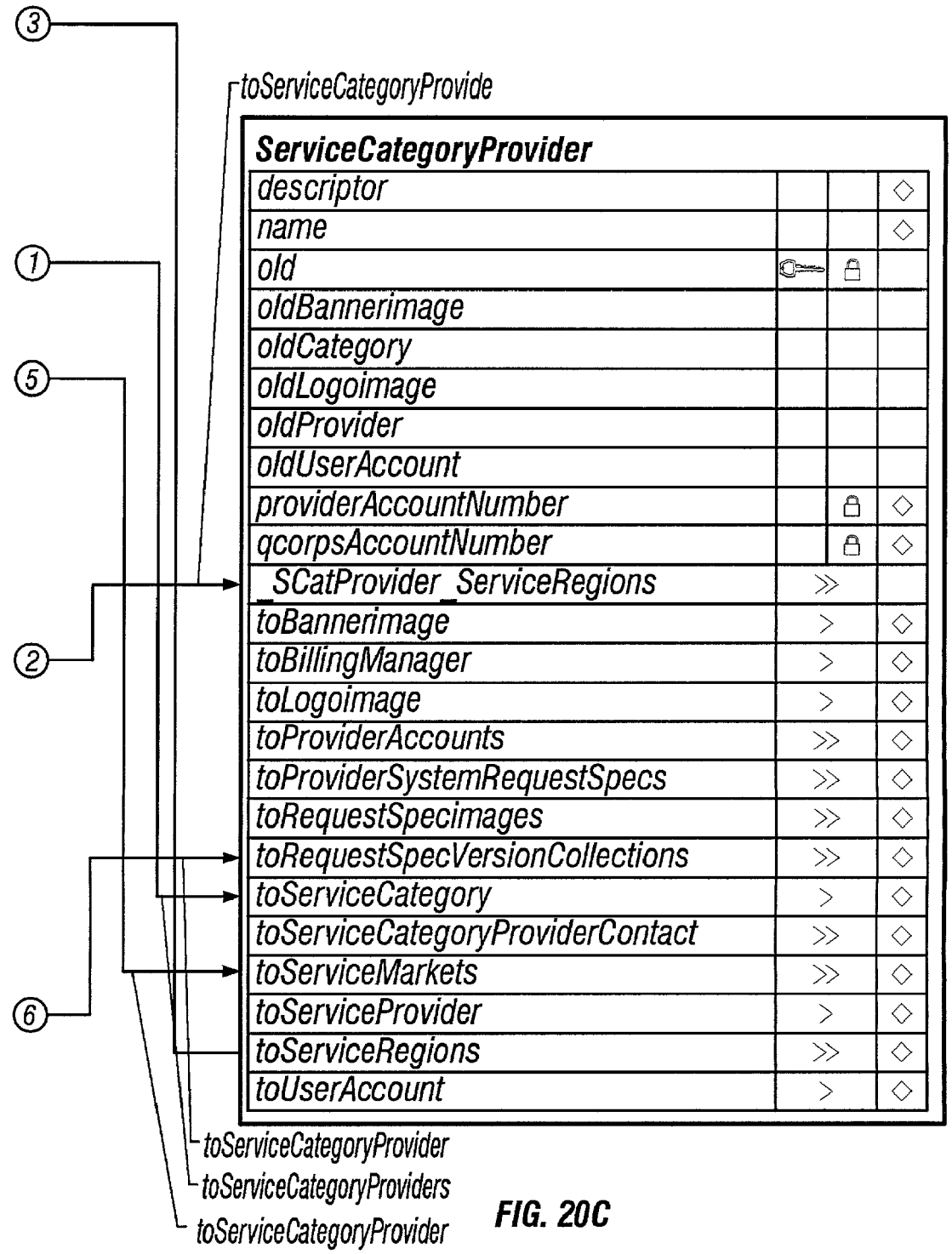

Relational database records are preferably created for the various service categories and service provider within each category. These records may, for example, take on the structure shown in FIG. 20. FIG. 20 uses the data type definition (DTD) format previously mentioned in relation to FIGS. 4, 5 and 6.

As part of the setup and registration process for service offerings 2010, service providers 130 provide detailed information regarding utilities, products, services and anything else that may be offered to customers 110 by the service providers. In the preferred embodiment of the present invention, service providers 130 provide details such as prices, descriptions, features, packages, internal codes used by service providers for features and packages, acceptable payment methods, billing methods, standard legal terms and conditions, and physical locations of service providers. A service provider may request that any customer selecting its service be required to provide to the service provider certain custom data elements.

Custom data elements requested by service providers are generally specific to the particular service provided by the service provider. For example, a pet grooming service may request custom data elements which include pet's name, pet's date of birth, and pet breed. An Internet access service provider may request the customer's chosen username and password. Custom data elements are implemented in the preferred embodiment of the present invention by asking the service provider to provide certain information regarding each custom data element.

As an illustration, the pet grooming service in the previous example may ask for a pet's name to be a custom data element that is completed by a customer requesting a pet grooming service. In order to implement this custom data element, the service provider provides the following information about the custom data element to the facilitation provider: custom data element name, element identification code, element data type, display text, long description, image, and criticality. The service provider's response to each of the foregoing fields might be: "pet_name," "PN01," "generic text," "What is your pet's name," "Please enter the name of your pet in the field provided," "nametag.gif", "optional".

The custom data element name "pet_name" may represent the name of the custom field in the service provider's internal computer system. The element identification code "PN01" may be a code that is only meaningful to the service provider's internal computer system once the order is received from the facilitation provider. The element data type "generic text" is a selection made by the service provider to indicate what data type the service provider is expecting to receive from the facilitation provider. This information permits the facilitation provider to display the appropriate data entry interface to the customer, e.g. a text entry field in this case. The data types available for selection by the service provider for custom data elements may include data types such as boolean, generic text, list, date, telephone, address, provider location, and label. A phone data type might cause the facilitation provider to provide an entry field and also provide a pop-up list of previously entered phone numbers associated with the customer. Of course, other data types may be provided, and service provider customization of data types may be further enhanced.

The display text "What is your pet's name" tells the facilitation provider what the customer will see when this custom data element is presented to the customer for data entry. The long description "Please enter the name of your pet in the field provided" may be used by the facilitation provider to provide further clarification to the customer in the event the customer is unclear what the display text is asking for. The long description may be useful in implementing the well-known tool-tips technology in programming user interfaces on a computer screen. The image field provides the service provider the opportunity to include an image to go along with the requested custom data element. In this above example the service provider chooses to provide an image of a pet name tag. The provider could also choose not to provide an image. Finally, the "optional" criticality indicates that the customer does not have to enter a pet name in order to place the order, i.e. it is not required.

In the preferred embodiment of the present invention, and as one of ordinary skill in the art will appreciate, the above described service offering setup process 2010 is implemented based on applications using the Java programming language on facilitation provider 140. Various user interface screens are written to collect the information contained in each service offering. The data structure used to collect and store the details of each service offering 2010 is preferably maintained using the well-known XML document format. The XML document is preferably stored in an Oracle relational database.

Attached Appendix "A" provides an XML document format that may be used to define data elements used for specifying service provider offerings. Attached Appendix "B" provides a sample XML document with data values for the defined data elements. These data values may be entered via a graphical user interface (GUI) authored in the Java programming language using techniques and tools well known to those of ordinary skill in the art.

In addition to specifying their offerings, service providers can specify their order delivery preferences 2020. The various options may include notification only 2022, email with a link 2024, and real-time integration 2026. A given service provider may not be able to select from all of these options. Certain service categories may only be offered the notification option. Conversely, certain service providers may not have the infrastructure to support real-time integration. Each of these options is discussed in turn.

Order notification 2022 may be accomplished via the transmission of a facsimile or "non-secure" email to the service provider 130, where the order information is processed manually using the service provider's existing order process. The order notification may simply include the customer's name and contact information, along with the custom data elements specified by the service provider. This would enable the service provider to directly contact the customer and collect any other necessary information. This option 2022 may generally be a one-way communication from the facilitation provider to service provider 130, and consequently, the service provider would typically not send any response to the facilitation provider 140. This option might be particularly suitable for communicating with a technologically unsophisticated service provider 130, or where the service provider may not have the technical and/or other financial resources to put in place a computerized order processing system. A service provider 130 in such a scenario need only have access to a facsimile machine or the ability to pick up email messages from the Internet, in order to receive orders from facilitation provider 140.

Figure 21:
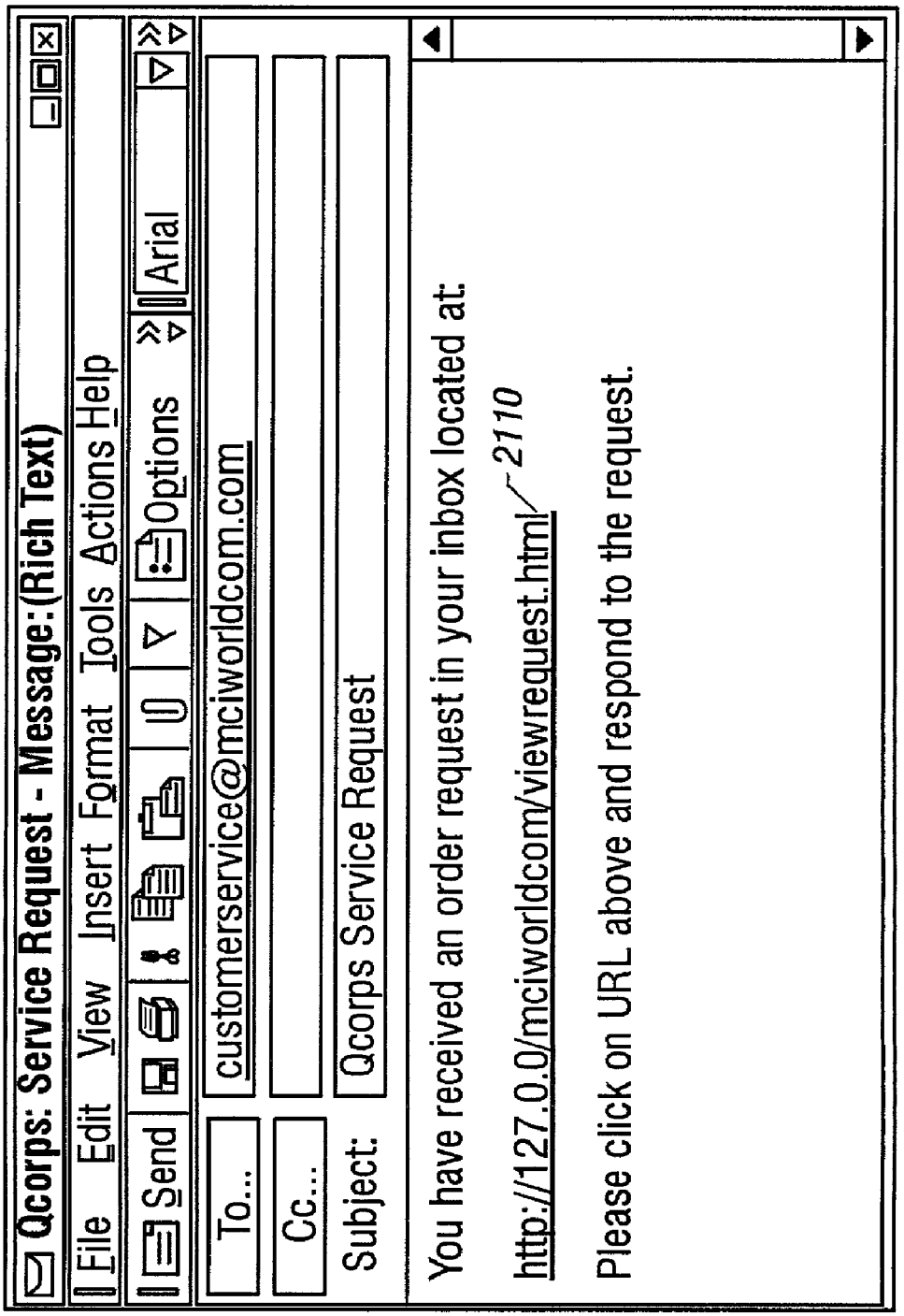
FIG. 21 illustrates a sample email with an order URL notifying service provider that an order has been received from a customer.

Still referring to FIG. 18, in the email with an order URL 2024 notification option, service provider 130 receives an email containing a URL (uniform resource locator) link to a computer file which contains the details of order 420. FIG. 21 illustrates a sample email with an order URL 2024. The computer file containing order 420 may exist in one of many different formats, including, without limitation, HTML format, XML format, plain text format, or comma delimited format. Preferably, the file exists in XML format and may be converted to any other format based on the service provider selections during service offering setup 2010. Service provider 130 receives the order file in their selected format. Typically, under this order communication method, the service provider clicks on URL link 2110 and a human representative enters the assigned username and password to gain secure access to the fulfillment portion 2030 of the service provider interface 144.

For illustrative purposes, FIG. 22 shows a hypothetical order as it might be displayed by service provider interface 144. After gaining access to the facilitation provider 140, the human representative may then read the order 420 information and manually re-type (or cut and paste) the order 420 data into the service provider's legacy or internal order processing system. Alternatively, the URL link may lead the service provider's representative to a web based application that allows the service provider to download the order data in a file format designated by the service provider. Once the service provider's legacy or internal system completes processing the order, the service provider generates a response 2210 with its approval, denial, or other action (e.g. a request for additional information) of the received order 420.

Figure 23:
FIG. 23 illustrates a sample response screen used by a service provider to respond to a customer's service order.

FIG. 23 illustrates a sample response screen that might be used by the service provider 130 to respond to customer 110. Various entry fields may be provided for entry of the customer's new service account information (for example), or for entry of reasons for denial. This information is transmitted to the service provider 130 and added to the customer's account record. Customer 110 may then view the service provider's response through the customer interface 141.

In the real-time integration 2026 communication method, service provider 130 preferably retrieves orders 420 from facilitation provider 140 using a fully automated process (i.e., with little or no human intervention), and automatically enters the order information into the service provider's database or other electronic order processing system. Under the preferred implementation of this option, service provider 130 periodically polls facilitation provider 140, using HTTPS (secure hyper text transfer protocol) requests to check for queued orders. Of course other protocols may be employed, e.g. FTP (file transfer protocol), HTTP (hyper text transfer protocol), and other file handler protocols which support data transport. As one of ordinary skill in the art will appreciate, service provider's polling of facilitation provider 140 may preferably be accomplished by use of standard API's (application programming interfaces).

The fully automated process may be facilitated through the use of an adapter layer (identified as communicator application 134 in FIG. 1). The adapter layer is a software application that interfaces between the service providers' legacy internal order processing systems and databases, and the facilitation provider's software and databases containing the customer orders. Because each service provider 130 has its own internal order processing system, each service provider has its own, potentially unique, requirements for data formatting and communication protocol. The adapter layer acts as a liaison. In this architecture, the facilitation provider's core applications and databases need not be modified to work with each service provider's legacy system. Instead, the adapter layer intercepts each service provider's request for orders (or proactively initiates requests to supply the service provider's order queue) and converts the request and order formats to enable communication between the service provider's internal systems and the facilitation provider. Requests are converted to a form understandable by facilitation provider's order databases and applications. Similarly, responses (orders) from facilitation provider are intercepted and converted into a format understandable by the service providers' legacy system.

In a preferred implementation, communicator 134 is a pure Java data-exchange software application. It may take order data in XML format from the facilitation provider 140 and transform order data into a service provider specific format (e.g., XML, HTML, delimited file, fixed file, named pair file, or database table). Similarly, communicator 134 allows the service provider 130 to provide responses to the facilitation provider 140. The response can originate from many different service provider file formats (delimited, fixed, XML, etc.). The communicator 134 translates the service provider response file into a valid XML response.

The communicator 134 is preferably a multi-threaded application. That is, it performs various tasks in parallel. In particular, the communicator 134 may preferably be split into receiving and responding portions that run independently.

Figures 24, 25:
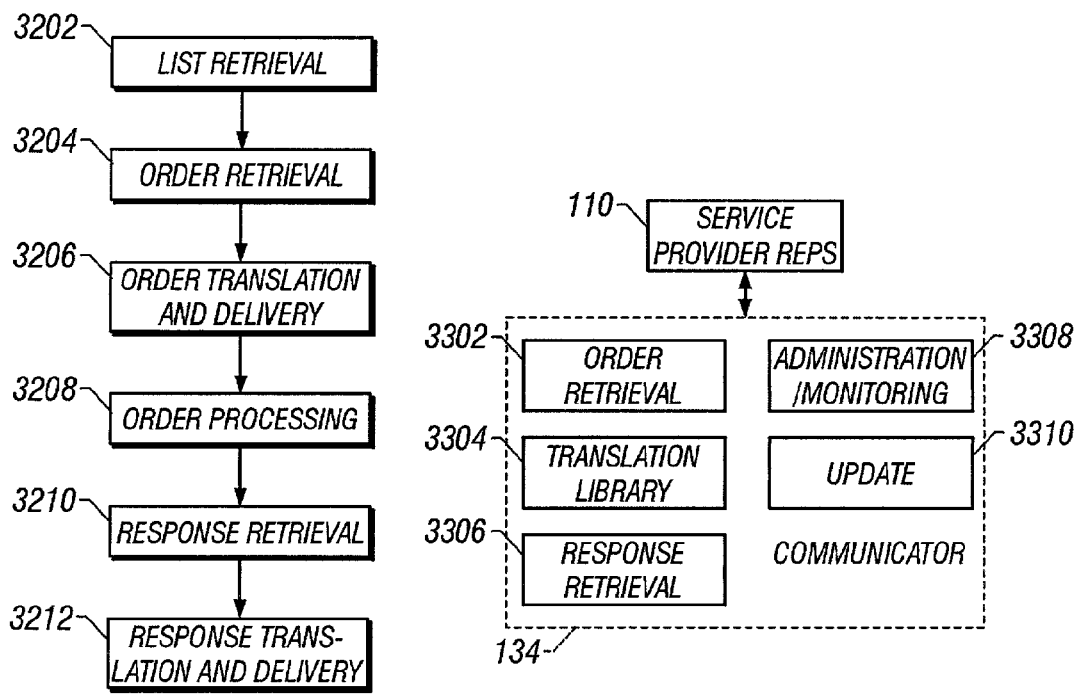
FIG. 24 shows an illustrative order communication process.
FIG. 25 shows a block diagram of a preferred communicator application embodiment.

As shown in FIG. 24, the communicator 134 takes a typical order through the following stages. In block 3202, the communicator 134 polls each specified service category to retrieve a list of orders in that category intended for service provider 130. In block 3204, the communicator 134 proceeds through the list, individually retrieving the details of each order from the facilitation provider 140 and preparing the order for translation into the specific service provider format. In block 3206, one or more software modules are invoked to convert the data from XML format to the service provider format, and to convey the order to the service provider's internal order processing system. Note that the communicator may be configured to translate into multiple formats and to send the file to multiple systems if desired. In block 3208, the service provider processes the order and generates data for a response. This response data may be dropped off in an "outbox", i.e. a file directory or other form of data container. In block 3210, the communicator invokes another software module to translate the response data into the appropriate XML format used by the facilitation provider, and to convey the translated response to the facilitation provider. The communicator preferably runs on the service provider's site and communicates with the facilitation provider via the Internet using a secure protocol such as https.

FIG. 25 shows the various software components of a preferred embodiment of the communicator 134. These include a retrieval process 3302, a library of translation modules 3304, a response process 3306, a monitoring process 3308, and an update process 3310. We turn first to a detailed description of the interaction of 3302, 3304 and 3306, and postpone describing the monitoring process and update process until afterward.

Figure 26:
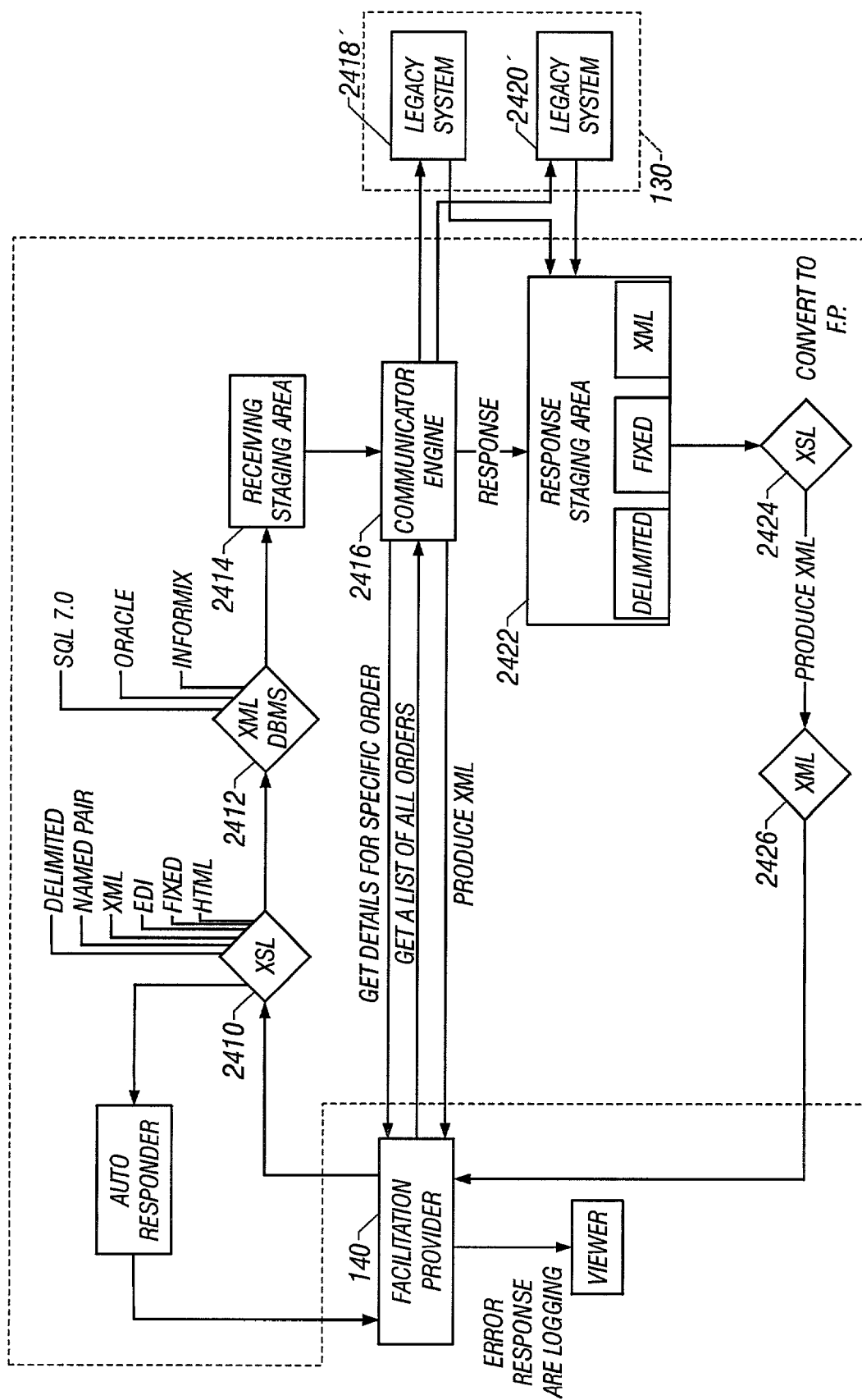
FIG. 26 illustrates the process of the real-time integration communication method between the facilitation provider and service providers' legacy systems.

Referring now to FIG. 26, the one specific implementation of the real-time integration 2040 communication method between facilitation provider 140 and service providers' 130 legacy systems 2418 and 2420 is illustrated. Internal Communicator Engine (ICE) 2416 is a pure, independent, data exchange software application. Communicator 134 preferably retrieves XML order files from facilitation provider 140 and transforms the order files into a service-provider-specific file format (e.g., XML, HTML, delimited file, fixed file, named pair file, database table). It preferably allows for the service provider 130 to respond back to the facilitation provider 140. The response may be provided to communicator 134 in a service-provider-specific file format and translated by ICE 2416 into the preferred XML response format.

As shown in FIG. 26, an order may typically go through the following stages. ICE 2416 periodically polls the facilitation provider 140 asking for all the orders for the service provider in one service category. The polling rate is preferably configurable by service category. The facilitation provider 140 responds with a list of orders, preferably using the HTTPS protocol. The list may be empty if no orders are currently awaiting delivery. The ICE 2416 preferably merges the list of orders into an internal database.

For each order, the communicator 134 calls XML handlers 2410 and 2412 to obtain the order details. XML handler 2410 sends an order ID and service provider information to facilitation provider 140. The response from facilitation provider 140 is an XML file. In the preferred embodiment, one XML file is created for each order. Handler 2410 converts the file into the service provider specific format. It does this through the use of an XML mapping language specified in the form of a script file. Advantageously, the alteration of a script file does not require a recompilation of the communicator.

Figure 36A:
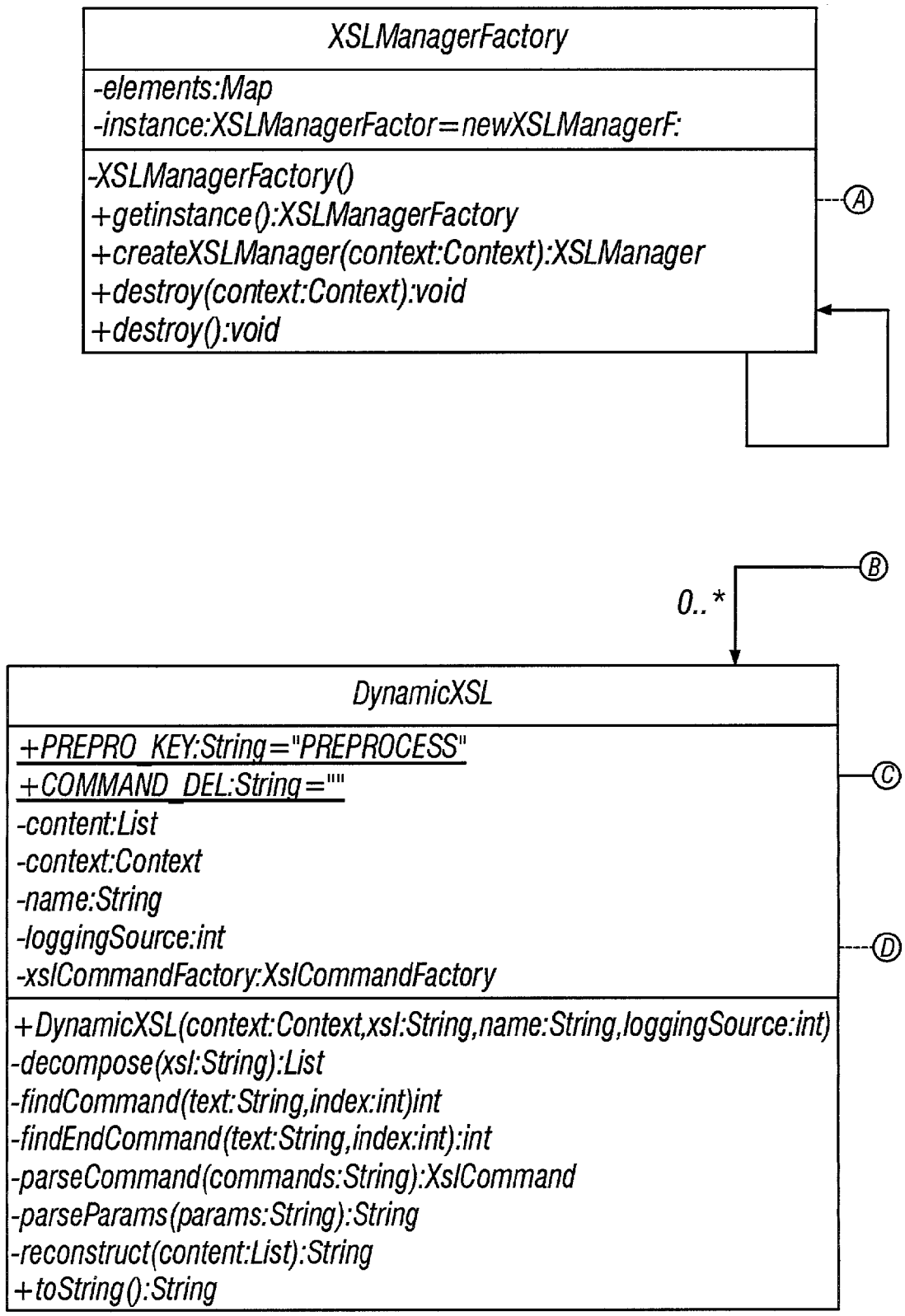
FIG. 36 shows a class diagram of the communicator's transform component.
Figure 36B:
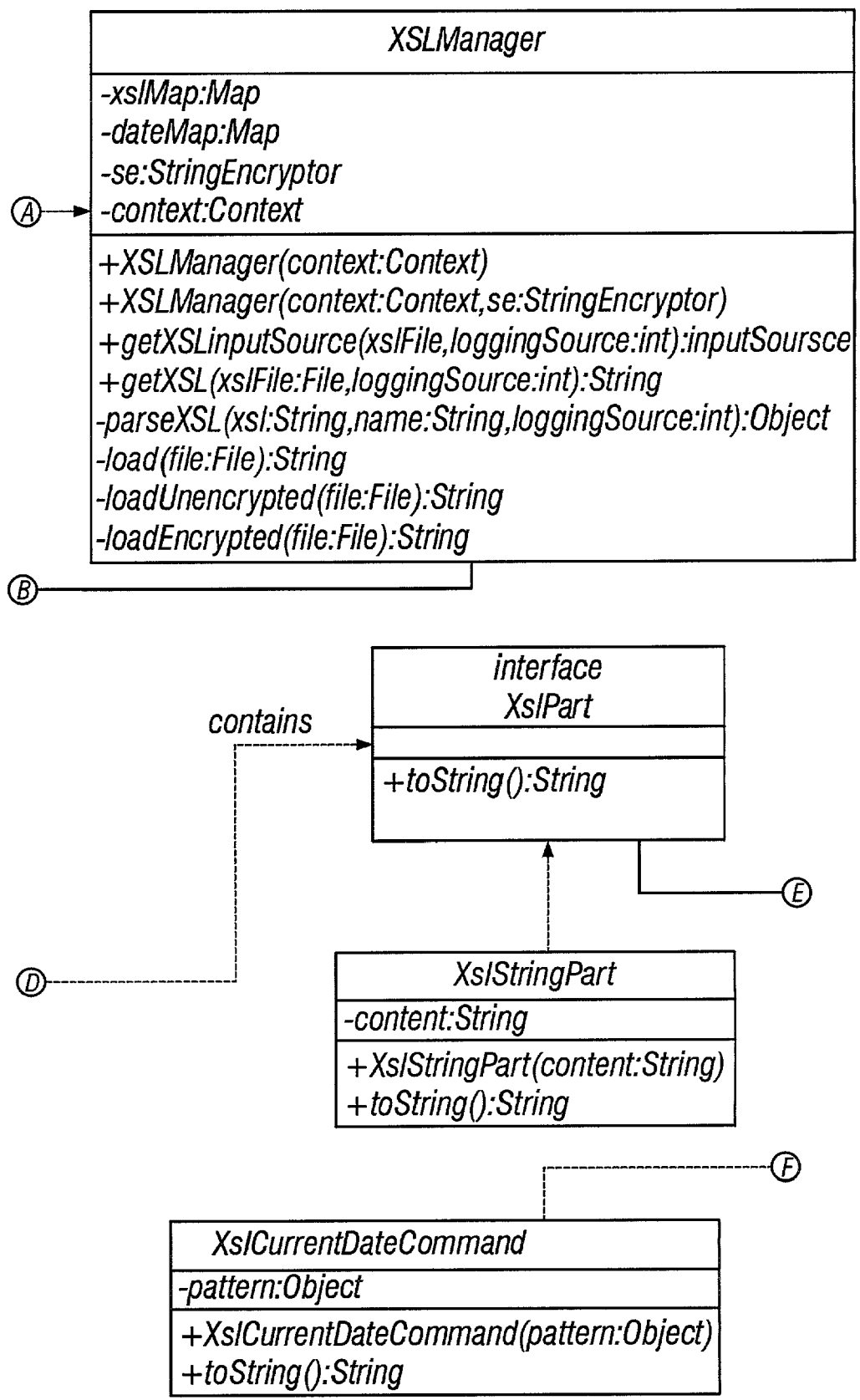
Figure 36C:
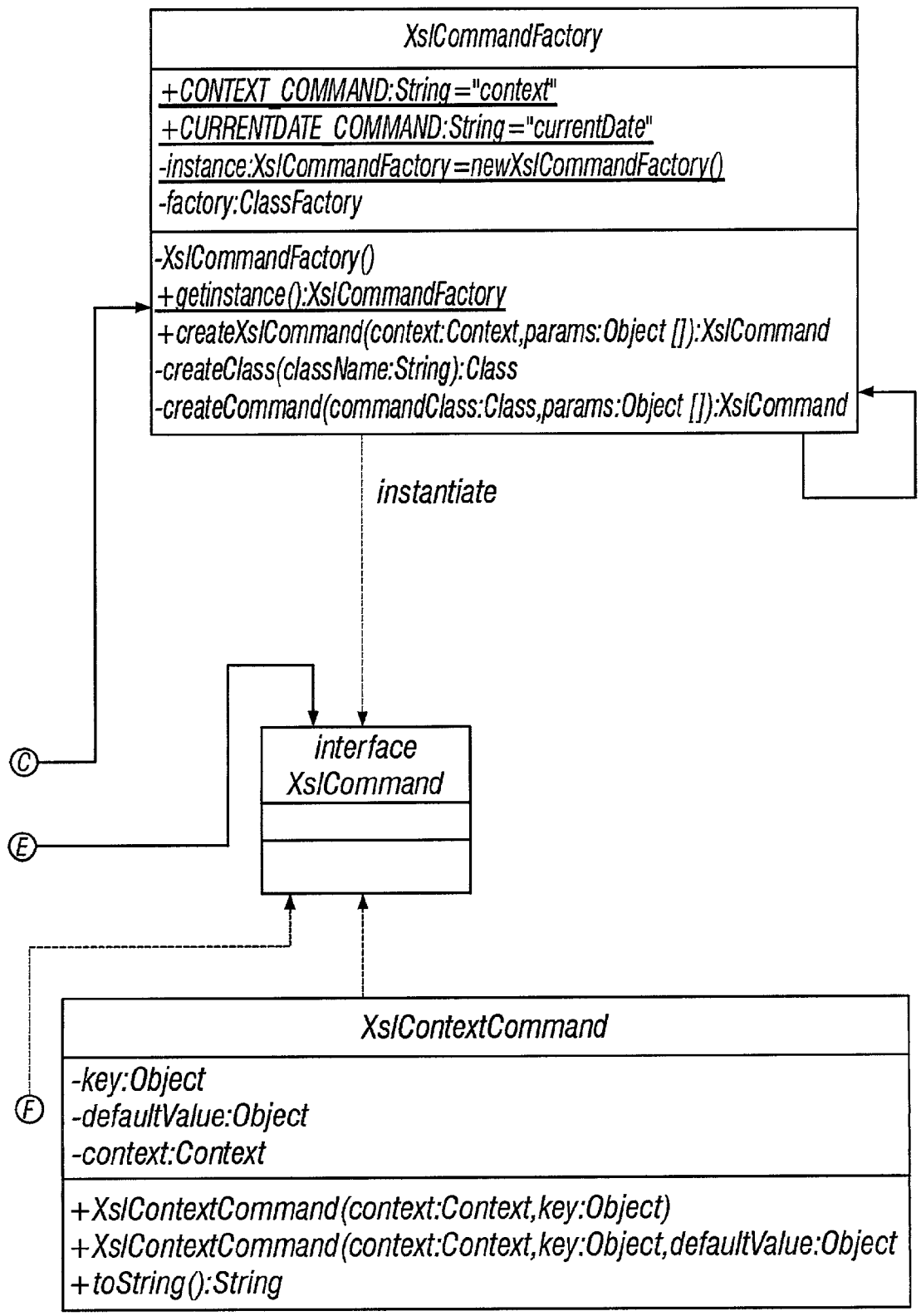

FIG. 36 shows a class definition diagram of handler 2410. Handler 2410 takes a script file that specifies a map (XSL or XMLDBMS map) and a file containing the order information (XML). The order information file is read into memory in a tree-like structure, with each node of the tree containing one element from the information file. The script file is then processed in order, with the element specified by the script file being located in the tree and written to an output file in order in the specified format. Appendix D and Appendix E are two examples of a script file. The script file in Appendix D provides for an XML representation of a semicolon-delimited file transformed to the facilitation provider's XML format. The script file in Appendix E provides for the transformation from an XML file to a database data file (such as would be provided as an input to handler 2412).

Handler 2412 takes the service-provider-specific format and provides any support commands needed to add the order to the service provider's database software (e.g., SQL 7.0, Oracle, Informix). Handler 2412 also uses a script file to map from a data file to a database record. An example of a script file of this type is shown in Appendix F.

Figure 27A:
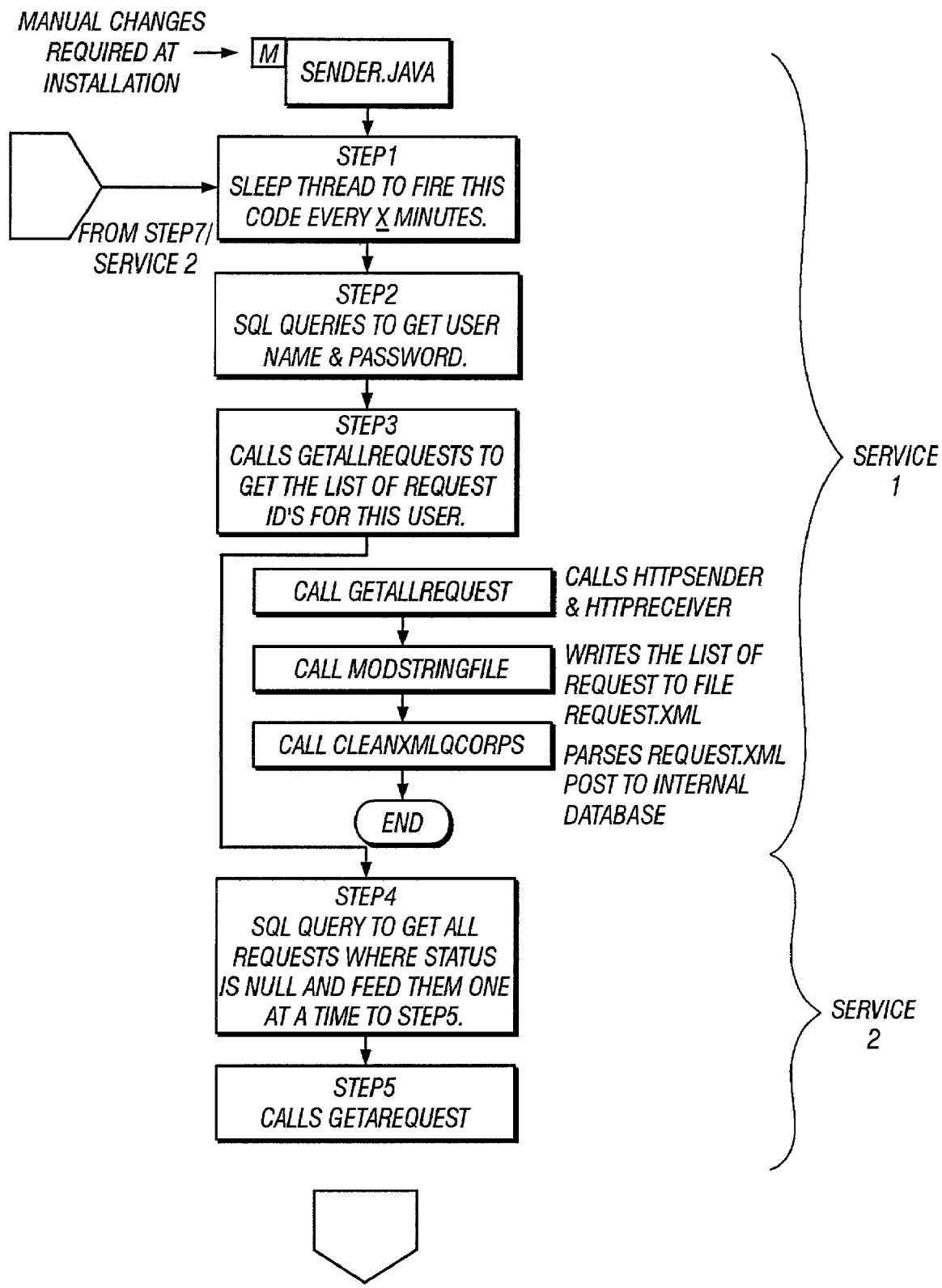
FIGS. 27(a) and 27(b) are flowcharts illustrating the process used by service providers to request orders from the facilitation provider, parse the orders and the XML mapping to the service provider's database or specified file format.
Figure 27B:
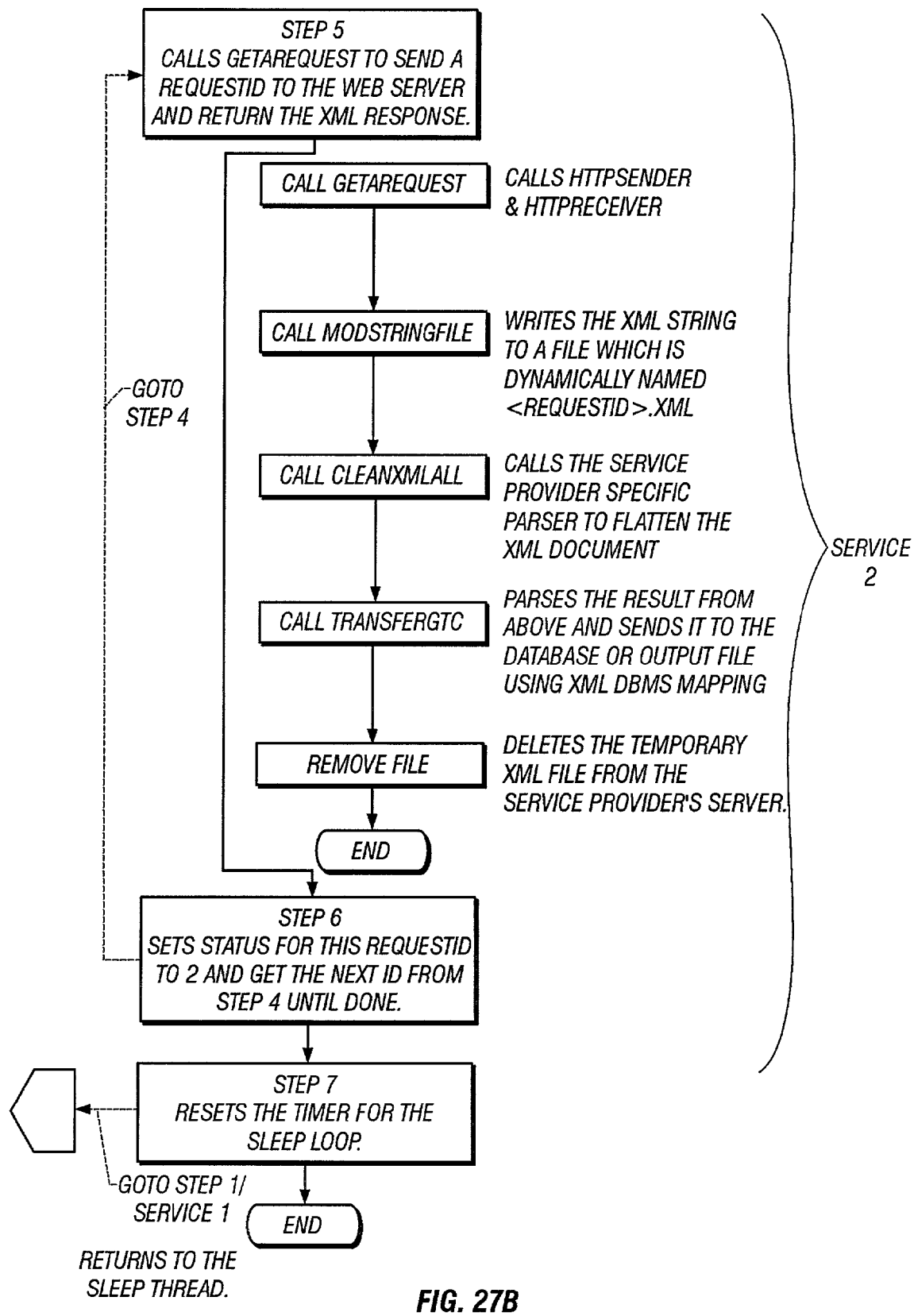

The working area set aside for handlers 2410 and 2412 is the receiving/staging area 2414. ICE 2416 sends the completed results from this area to one or more designated destinations 2418, 2420 specified by the service provider. Note that at the service provider's option, there may be multiple destinations, and that each destination may be provided a different file format. This might prove useful where the service provider has incompatible systems (e.g., an order fulfillment system and a billing system) that each need to be updated to reflect a new account. FIGS. 27(*a*) and 27(*b*) are flowcharts that of one embodiment of this process.

Figure 28:
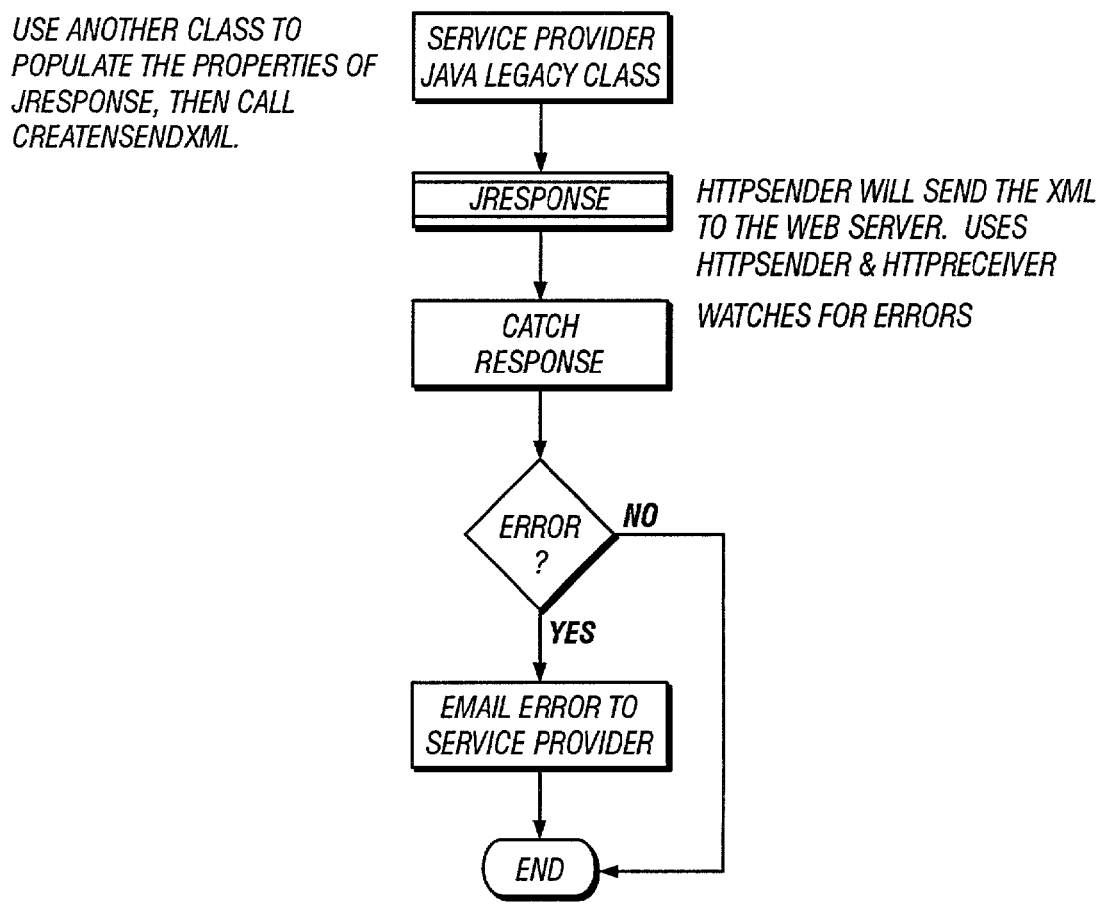
FIG. 28 is a flowchart illustrating the use of Java class by service providers for creating responses to order requests.

The service provider's legacy system 130 processes the order and generates an automated response which is written to response staging area 2422. ICE 2416 will detect the presence of the response in the staging area, and invoke handlers 2424 and 2426 to communicate the response to facilitation provider 140. Handler 2424 converts the response from the service-provider-specific format into an XML format that can be understood by facilitation provider 140. Handler 2426 delivers the XML file to the facilitation provider to notify facilitation provider 140 that order processing is complete for the particular request. FIG. 28 is a flowchart illustrating the function of handler 2426. Any errors in the generation and deliver of the XML response are trapped and an email is sent to service provider 130 detailing the detected errors.

Both internal and external to facilitation provider 140, the messaging language is preferably XML. This includes internal communications (objects to objects) and external communications (server to server). The liaison software may preferably be XML-DBMS for transferring data between XML documents and relational databases. It views the XML document as a tree of data-specific objects in which element types are generally viewed as classes and attributes and PCDATA as properties of those classes. It then uses an object-relational mapping to map these objects to the database. An XML-based mapping language is used to define the view and map it to the database. XML-DBMS is publicly available both as a set of Java packages and as a PERL module. For more information about XML-DBMS, visit the XML-DBMS home page at: "www.rpbourret.com/xmldbms/index.htm".

Monitoring process 3308 (FIG. 25) allows a service provider representative to monitor and control the retrieval process 3302 and/or the response process 3306. It is designed to make the management of all the various data exchanges easier. The brand partner can get a quick summary of all the active data exchanges (services) and whether each service is receiving or responding. This makes the job of administering the exchanges significantly easier and different than most data exchange software.

The process of using the console is simple. Each data exchange gets a separate window on the desktop. Inside that window there are five tabs: a receiving tab, a responding tab, a configuration tab, a log history tab, and a request viewer. When these tabs are taken as a whole they describe the full life cycle of data integration. Each data exchange is treated as a separate service (its receiving and responding mechanism run in separate threads from other services). Within these service windows, changes can be made dynamically through the configuration tab again increasing the ease of use for the administrator. FIG. 35 shows a class definition diagram for a Java implementation of the logging utility and console.

The universal console offers a tremendous amount of flexibility to the administrator. For instance, if data is currently being sent to the order entry application in a delimited format and they need to add another delimited exchange for the accounting system, the administrator can simply add an additional target or could even copy the service and create another service so the data exchange could be monitored separately.

The monitoring process provides an interface that allows the representative to configure the processes, run multiple instances of the processes, start and stop each of the running processes, view the status of orders, and view an event log. The configuration may include setting such parameters as the identity and password of the service provider, selecting the service category, selecting a service provider format, setting polling frequencies, and specifying directories for incoming information, outgoing information, and intermediate work files. The user may wish to run separate retrieval processes for retrieving orders in each of several service categories, and may also wish to run respective response processes. The activities of each of the processes is preferably visible within one instance of the monitoring process, and multiple monitoring processes are preferably allowed. Each active process may preferably be individually suspended and re-awakened. The communication status of orders, i.e. requested, received, pending, completed, may be viewed in the monitoring process interface. Finally, an event log may be viewed for troubleshooting purposes.

Update process 3310 (FIG. 25) offers service providers an easy and flexible way of updating the communicator application 134, and more importantly, their specific provider files. Changes are inherent in every system, e.g., changes in the provider's data storage mechanism for order processing. The update utility allows them to download provider-specific files that will reflect their data storage modifications, and makes them functional instantly.

Figure 29:
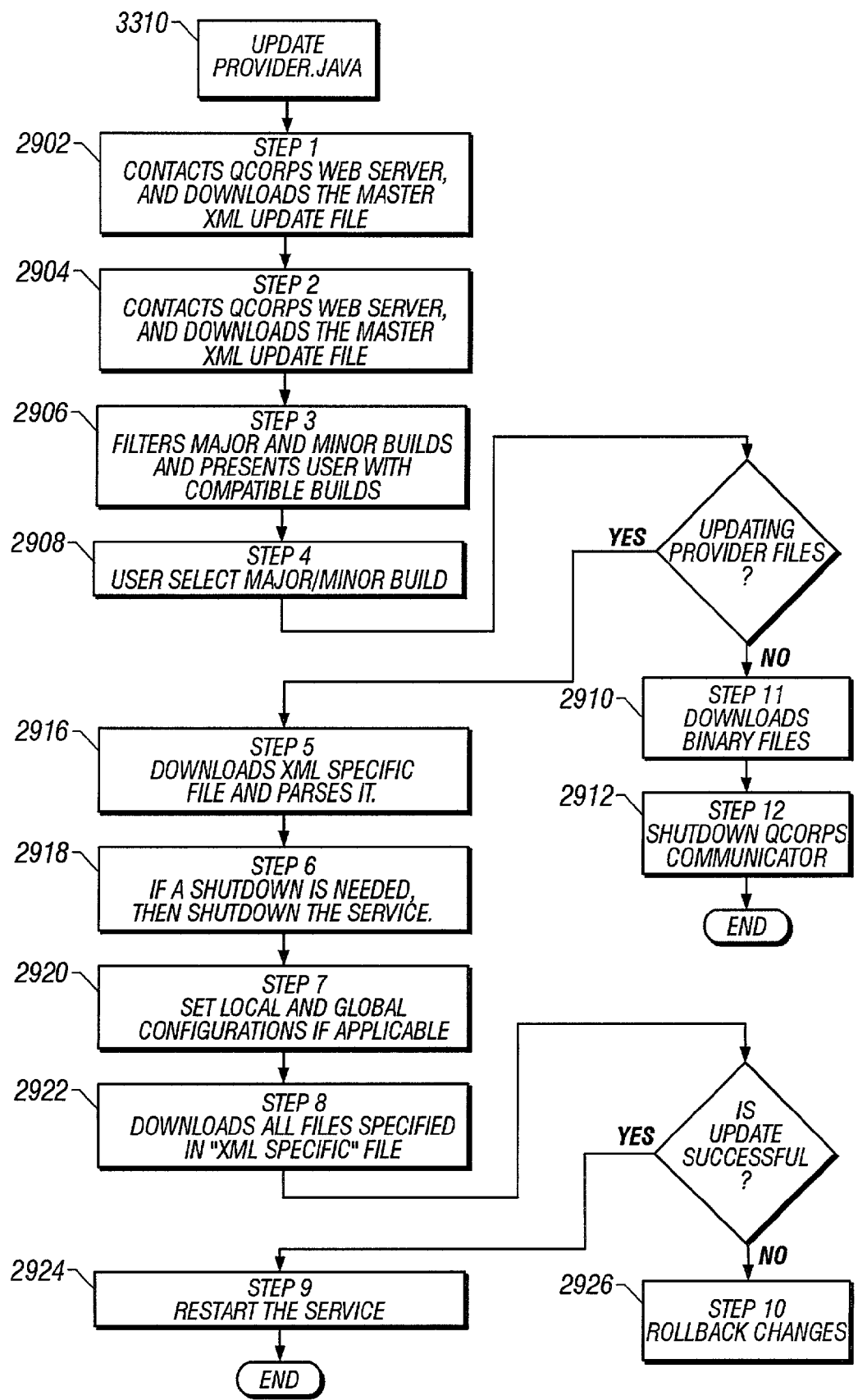
FIG. 29 is a flowchart of the communicator update process.

Referring now to FIG. 29, the update process 3310 is illustrated. In block 2902, the communicator contacts facilitation provider 140 and downloads a specified master XML update file for that service provider. In block 2904 the update communicator parses the XML update file. In block 2906, the communicator filters through all the major and minor builds and presents to the service provider representative the updates that are compatible with the service provider's system. In block 2908, the representative makes a selection which can either be updating the entire application, or more commonly, updating selected provider files. If the service provider chooses to update the entire application, then in block 2910, the corresponding binary files are downloaded from the service provider, the communicator application is shut down in block 2912.

More commonly though, the service provider wants to update specific provider files. After the representative chooses a build number, the communicator downloads and parses (2916) the specific XML file that contains all the needed information to update the provider files. In block 2918, the communicator shuts down service processes if needed. In block 2920, the communicator sets all local configuration properties first and all global configuration properties next. After all configuration properties are set successfully, the communicator in block 2922 downloads every file specified by the XML file from the facilitation provider and saves it on the service provider's system. Finally, in block 2924, the communicator restarts the service if a shutdown was performed. In any case of an error, whether from setting global/local configurations, or from downloading files, the communicator rolls back updates in block 2926 and restores the system to what it was prior to the update. Then, a restart of a service is performed in block 2924.

FIG. 34 shows a diagram of a preferred architecture for the communicator 134. The communicator preferably includes a Graphical User Interface (GUI), an Internal Processing Engine (IPE), and an External Connection Component (ECL). The GUI may include a multi-service desktop component, an integrated help component, a configuration component (for configuring operation of the communicator), a log component, an order management component, and a customization component (for customizing the appearance of the GUI). The IPE preferably includes a database handling component, a security component, a delivery component, a utility component, a log handling component, an event notification component, a secure communications component, a general file handling component, a disk caching component, a parsing component, a file backup component, and a scheduling component. The ECL may include a receiving system and a responding system. The receiving system may include various communication protocol handlers (HTTPS, FTP, HTTP, TCP/IP, etc.) and various transform handlers (RDBMS & JDBC adapters, XML, ASCII, HTML, etc.). The responding system may similarly include various transform handlers.

It is emphasized that the communicator application 134 may have separate utility outside the facilitation provider model. The communicator advantageously has wide applicability as a stand-alone translation and communication application with easily customizable translation scripts.

The preferred embodiment of the present invention is developed using the following software:
1) Java programming language, Java Development Kit (JDK), version 1.1.8 from Sun Microsystems.
(2) JDK versions 1.2.2 and 1.3 from Sun Microsystems.
(3) XALAN version 2.0 from Apache
(4) XERXES version 2.0 from Apache
(5) JSSE version 1.0.2 from Sun Microsystems.
(6) JAXP version 1.0.1 from Sun Microsystems.
(7) XMLDBMS version 1.0 by Ronald Bourret.
(8) UNA2000 version 3.0 by I-Net Software.
(9) Applet Designer version 3.0 by Diamondedge.
(10) InstantDB version 3.2.1 by Lutris Technologies, Inc.
(11) WebObjects, Version 4.5, Apple Computer, Inc.
(12) Oracle Relational Database Management System, Version 8i, from Oracle Corp.
(13) SonicMQ, Version 2000.1, Progress Software Corp.
(14) FrontBase, Version 1.27, FrontBase, Inc.
(15) MapQuest, Version 1.5.2, MapQuest.com, Inc.
(16) Apache Server, Version 1.3, Apache Software Foundation.
(17) JDOM, Beta Version 4, jdom.org.
(18) JMagick and ImageMagick, Version 5.2.1, Eric Yeo.
(19) Log4J, Version 0.9.0.
(20) GNU Regular Expression Package, Version 1.0.8.
(21) OpenSSL, Version 0.95a.
(22) ModSSL, Version 2.6.6.
(23) Adobe Photoshop, Version 5.5, Adobe Systems, Inc.
(24) ReportMill, Version 4.0, ReportMill Software, Inc.
(25) MPW Foundation and XMLKit, August 2000 Release, Metaobject GmbH.
(26) DashoPro, Version 2.0, preEmtive Solutions, Inc.
(27) TogetherJ, Version 4.2, TogetherSoft Corporation.

Any of the foregoing embodiments of the present invention may be implemented by programming a suitable general-purpose machine having appropriate hardware. The machine may comprise a single computer. Alternatively, the machine may comprise a plurality of computers connected by a communications link.

The programming may be accomplished through the use of a program storage device readable by the machine and encoding a program of instructions executable by the machine for performing the operations described above. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions is immaterial.

It will be appreciated by those of ordinary skill having the benefit of this disclosure that the illustrative embodiments described above are capable of numerous variations without departing from the scope and spirit of the invention. Accordingly, the exclusive rights sought to be patented are as described in the claims below.

APPENDICES

Appendix "A" provides an XML document format that may be used to define data elements used for specifying service provider offerings.

Appendix "B" provides a sample XML document with data values for the defined data elements.

Appendix "C" illustrates the format of the XML documents exchanged between service provider 130 in response and facilitation provider 140 to communicate and fulfill a customer order request. Each response includes a fixed set of data, and may include additional information provided by the individual service provider.

Appendix "D" provides an example of a script file for transforming an XML representation of a semicolon-delimited file to an XML file.

Appendix "E" provides an example of a script file for transforming an XML file into a database data file.

Appendix "F" provides an example of a script file for mapping elements of a database data file into a database record.

What is claimed is:

1. An automated method for facilitating a user's selection of residential or business products or services provided to a property having a geographic location, the method comprising the steps of:
   (a) maintaining a database comprising product or service offerings in a plurality of offering categories, wherein each of said product and of service offerings is classified in said database in one or more geographic markets, and wherein each of said markets associated with each said product or service offering are defined independently or with different levels of detail in said database:
      (i) in variable geographic detail, and (ii) as specifically as a street address or a subdivision of a street address, (b) presenting a user with a plurality of said offering categories, wherein each of said offering categories corresponds to a product or service type;

(c) receiving from said user:
(i) said geographic location of said property wherein said geographic location may be identified as specifically as a street address or a subdivision of a street address; and
(ii) user's selection of one or more offering categories;

(d) determining product or service offerings maintained in said database that:
(i) correspond to said offering categories selected by said user, and
(ii) are associated with markets that correspond to said geographic location provided by said user;

(e) generating for each offering category selected by said user, a summary of each said product or service offering associated with markets that correspond to said geographic location provided by said user; and (f) transmitting to said user said summary of offerings.

2. The method of claim 1, further comprising the step of:
(g) receiving from said user an order for one or more product or service offerings in one or more of said offering categories.

3. The method of claim 2, further comprising the step of:
(h) making available to each provider of said product or service offerings ordered by said user each said received order corresponding to said provider's product or service offering.

4. The method of claim 3, further comprising the step of:
(i) providing said user with access to one or more user accounts, each said account corresponding to a product or service offering ordered by said user.

5. The method of claim 4, wherein said one or more user accounts are maintained by said providers of said product or service offerings.

6. The method of claim 4, wherein said user may manage said user account.

7. The method of claim 6, wherein said management of said user account enables said user to perform one or more of the following functions: verify the status of the order related to said product or service offering, update said user's profile related to said account, retrieve reports, pay for said product or service, modify said product or service offering, or terminate said product or service.

8. The method of claim 1, wherein an offering category comprises one or more of electric utility, natural gas, metered water, telephone, television, satellite, cable, internet, security system, change of address, post office, furniture, appliance, storage, moving, pet care, childcare, bottled water, periodical, newspaper, delivery, grocery, parking, club membership, motor vehicle, dry cleaning, prepared food delivery, insurance, housekeeping, driver's license, voter registration, financial, banking, wake-up/reminder, and repair and maintenance products or services.

9. The method of claim 1, further comprising the step of:
(g) establishing one or more relationships with one or more product or service providers in one or more of said offering categories.

10. The method of claim 9, wherein said one or more relationships are by agreement with one or more product or service providers.

11. The method of claim 1, wherein said database has one or more of said product or service offerings for each of said offering categories stored in a standardized data structure.

12. The method of claim 11, wherein said data structure comprises a plan component, a package component, and a feature component, wherein said plan component indicates a base offering, said package component indicates collections of features purchasable as a unit, and said feature component indicates individually purchasable augmentations to the base offering.

13. The method of claim 1, further comprising the step of:
(g) providing brand partners with an account through which said brand partners may provide one or more customization elements or customer accounts.

14. The method of claim 1, further comprising the step of:
(g) providing brand partners with an account through which said brand partners may track usage of said automated method.

15. The method of claim 1, wherein said offering categories comprise a plurality of utilities, products, or services.

16. The method of claim 1, wherein one or more product or service offerings comprise one or more product or service plans.

17. The method of claim 1, wherein said geographic location comprises one or more of a country, a region, a state, a county, a governmental subdivision, a street address, a 5-digit zip code, and a 9-digit zip code.

18. The method of claim 17, wherein said governmental subdivision comprises one or more of a city, town, township, borough and parish.

19. The method of claim 17, wherein said street address comprises one or more of a street name, post office box, rural route number, floor and unit.

20. The method of claim 1, wherein said product and service offerings are intended for residential or business use, or residential and business use.

21. The method of claim 1, wherein said database comprises product and service offerings.

22. An automated method for facilitating a user's selection of residential or business products or services provided to a property having a geographic location, the method comprising the steps of:

(a) maintaining a database comprising product or service plans for one or more offering categories, wherein each of said product and service plans is classified in said database in one or more geographic markets, and wherein each of said markets associated with each said product or service plan are defined independently or with different levels of detail in said database:
(i) in variable geographic detail, and
(ii) as specifically as a street address or a subdivision of a street address;

(b) presenting a user with one or more offering categories, wherein each of said offering categories corresponds to a product or service type;

(c) receiving from said user:
(i) said geographic location of said property wherein said geographic location may be identified as specifically as a street address or subdivision of street address; and
(ii) user's selection of one or more offering categories;

(d) determining product or service plans maintained in said database that:
(i) correspond to said offering categories selected by said user, and
(ii) are associated with markets that correspond to said geographic location provided by said user;

(e) generating for each offering category selected by said user, a summary of each said product or service plan associated with markets that correspond to said geographic location provided by said user; and
(f) transmitting to said user said summary of said product or service plans.

23. The method of claim 22, further comprising the step of:
(g) receiving from said user an order for one or more product or service plans in one or more of said offering categories.

24. The method of claim 23, further comprising the step of:
(h) making available to each provider of said product or service plans ordered by said user each said received order corresponding to said provider's product or service plan.

25. The method of claim 24, further comprising the step of:
(i) providing said user with access to one or more user accounts, each said account corresponding to a product or service plan ordered by said user.

26. The method of claim 25, wherein said one or more user accounts are maintained by said providers of said product or service plans.

27. The method of claim 25, wherein said user may manage said user account.

28. The method of claim 27, wherein said management of said user account enables said user to perform one or more of the following functions: verify the status of the order related to said product or service plan, update said user's profile related to said account, retrieve reports, pay for said product or service, modify said product or service plan, or terminate said product or service.

29. The method of claim 22, wherein an offering category comprises one or more of electric utility, natural gas, metered water, telephone, television, satellite, cable, internet, security system, change of address, post office, furniture, appliance, storage, moving, pet care, childcare, bottled water, periodical, newspaper, delivery, grocery, parking, club membership, motor vehicle, dry cleaning, prepared food delivery, insurance, housekeeping, driver's license, voter registration, financial, banking, wake-up/reminder, and repair and maintenance products or services.

30. The method of claim 22, further comprising the step of:
(g) establishing one or more relationships with one or more product or service providers in one or more of said offering categories.

31. The method of claim 30, wherein said one or more relationships are by agreement with one or more product or service providers.

32. The method of claim 22, further comprising the step) of:
(g) providing brand partners with an account through which said brand partners may provide one or more customization elements or customer accounts.

33. The method of claim 22, further comprising the step of:
(g) providing brand partners with an account through which said brand partners may track usage of said automated method.

34. The method of claim 22, wherein said offering categories comprise a plurality of utilities, products, or services.

35. The method of claim 22, wherein said geographic location comprises one or more of a country, a region, a state, a county, a governmental subdivision, a street address, a 5-digit zip code, and a 9-digit zip code.

36. The method of claim 35, wherein said governmental subdivision comprises one or more of a city, town, township, borough and parish.

37. The method of claim 35, wherein said street address comprises one or more of a street name, post office box, rural route number, floor and unit.

38. The method of claim 22, wherein said markets associated with each said product or service plan comprises one or more of a country, a region, a state, a county, a governmental subdivision, a street address, a 5-digit zip code, and a 9-digit zip code.

39. The method of claim 38, wherein said governmental subdivision comprises one or more of a city, town, township, borough and parish.

40. The method of claim 38, wherein said street address comprises one or more of a street name, post office box, rural route number, floor and unit.

41. The method of claim 1, wherein said markets associated with each said product or service offering comprises one or more of a country, a region, a state, a county, a governmental subdivision, a street address, a 5-digit zip code, and a 9-digit zip code.

42. The method of claim 41, wherein said governmental subdivision comprises one or more of a city, town, township, borough and parish.

43. The method of claim 41, wherein said street address comprises one or more of a street name, post office box, rural route number, floor and unit.

44. The method of claim 22, wherein said product and service plans are intended for residential or business use, or residential and business use.

45. The method of claim 22, wherein said database comprises product and service plans.

46. An automated method for facilitating a user's selection of residential or business products or services provided to a property having a geographic location, the method comprising the steps of:
(a) maintaining a database comprising product and Of service offerings in a plurality of offering categories, wherein each of said product or service offerings is classified in said database in one or more geographic markets, and wherein each of said markets associated with each said product or service offering are defined in said database independently or with different levels of detail by:
(i) accessing said database, and
(ii) selecting more than one geographic category associated with each product or service offering wherein said geographic categories collectively define said market for a particular product or service offering;
(b) presenting a user with a plurality of said offering categories, wherein each of said offering categories corresponds to a product or service type;
(c) receiving from said user:
(i) said geographic location of said property; and
(ii) user's selection of one or more offering categories;
(d) determining product or service offerings maintained in said database that:
(i) correspond to said offering categories selected by said user, and
(ii) are associated with markets that correspond to said geographic location provided by said user.

47. The method of claim 46, further comprising the step of:
(e) generating for each offering category selected by said user, a summary of each said product or service offering associated with markets that correspond to said geographic location provided by said user.

48. The method of claim 47, further comprising the step of:
(f) transmitting to said user said summary of offerings.

49. The method of claim 46, wherein each geographic category selected may comprise a country, a region, a state, a county, a governmental subdivision, a street address, a 5-digit zip code, and a 9-digit zip code.

50. The method of claim 49, wherein said governmental subdivision may comprise one or more of a city, town, township, borough and parish.

51. The method of claim 49, wherein said street address may comprise one or more of a street name, post office box, rural route number, floor and unit.

52. The method of claim 46, wherein said product and service offerings are intended for residential or business use, or residential and business use.

53. The method of claim 46, wherein said database comprises product and service offerings.

\* \* \* \* \*